(12) United States Patent
Nagata et al.

(10) Patent No.: US 8,068,403 B2
(45) Date of Patent: Nov. 29, 2011

(54) OPTICAL HEAD

(75) Inventors: Takayuki Nagata, Osaka (JP); Joji Anzai, Osaka (JP); Hideki Aikoh, Osaka (JP); Eishin Mori, Kyoto (JP); Kousei Sano, Osaka (JP); Yoshiaki Komma, Osaka (JP); Akihiro Arai, Kyoto (JP)

(73) Assignee: Panasonic Corporation, Osaka (JP)

( * ) Notice: Subject to any disclaimer, the term of this patent is extended or adjusted under 35 U.S.C. 154(b) by 694 days.

(21) Appl. No.: 12/090,144

(22) PCT Filed: Oct. 13, 2006

(86) PCT No.: PCT/JP2006/320491
§ 371 (c)(1),
(2), (4) Date: Apr. 14, 2008

(87) PCT Pub. No.: WO2007/043663
PCT Pub. Date: Apr. 19, 2007

(65) Prior Publication Data
US 2009/0257340 A1    Oct. 15, 2009

(30) Foreign Application Priority Data

Oct. 14, 2005   (JP) ................................. 2005-300015
Mar. 7, 2006    (JP) ................................. 2006-060833
Sep. 8, 2006    (JP) ................................. 2006-244789

(51) Int. Cl.
*G11B 7/00* (2006.01)

(52) U.S. Cl. .................. 369/121; 369/44.11; 369/44.14; 369/94; 369/120; 369/44.23

(58) Field of Classification Search ........................ None
See application file for complete search history.

(56) References Cited

U.S. PATENT DOCUMENTS
5,175,736 A * 12/1992 Woodward et al. ............. 372/20
(Continued)

FOREIGN PATENT DOCUMENTS
JP         11-016200         1/1999
(Continued)

OTHER PUBLICATIONS

Japanese Office Action for corresponding application No. 2005-197140 issued Jan. 20, 2009, and English Translation thereof.

(Continued)

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

To provide an optical head to produce good servo and read signals by reducing the influence of interference by light reflected from a non-read layer of a multilayer optical disc. The head includes: a first optical system for converging light from a light source on a first or second storage layer; a second optical system for receiving and transmitting light reflected from the first layer and stray light reflected from the second layer when the light is converged on the first layer; a photodetector; and a calculator. The photosensitive areas of the photodetector output signals representing intensities of the light incident there through the second system. The reflected and stray light incident on the second system interfere with each other, and the first and second groups of areas are arranged so as to be equally affected by a variation in intensity caused by the interference. The calculator calculates the difference between sum of a first group of signals supplied from a first group of areas and that of a second group of signals supplied from a second group of areas, thereby generating a focus error signal.

14 Claims, 33 Drawing Sheets

U.S. PATENT DOCUMENTS

| | | |
|---|---|---|
| 7,016,269 B2 | 3/2006 | Ogasawara et al. |
| 2002/0110053 A1* | 8/2002 | Araki et al. ............. 369/44.23 |
| 2003/0117938 A1* | 6/2003 | Braitberg et al. ........... 369/291 |
| 2004/0021821 A1* | 2/2004 | Tillin et al. ................ 349/177 |
| 2004/0246874 A1 | 12/2004 | Takagi et al. |
| 2005/0237902 A1* | 10/2005 | Nishiwaki et al. ...... 369/112.12 |

FOREIGN PATENT DOCUMENTS

| | | |
|---|---|---|
| JP | 11-219538 | 8/1999 |
| JP | 11-242824 | 9/1999 |
| JP | 2001-027710 | 1/2001 |
| JP | 2002-190132 | 7/2002 |
| JP | 2003-132557 | 5/2003 |
| JP | 2003132557 | * 5/2003 |
| JP | 2004-355790 A | 12/2004 |
| JP | 2005-228436 | 8/2005 |
| WO | 2005/078714 | 8/2005 |

OTHER PUBLICATIONS

International Search Report for corresponding Application No. PCT/JP2006/320491 dated Jan. 23, 2007.

Form PCT/ISA/237 and a concise explanation for corresponding International Application No. PCT/JP2006/320491 dated Jan. 23, 2007.

Notice of Reasons for Rejection for corresponding Japanese Application No. 2007-540217 issued on Sep. 13, 2011 and English translation.

* cited by examiner (A)　　　(B)　　　(C)　　　(D)

(A)　(B)　(C)　(D)

(a)         (b)

POLARIZA-
TION
DIRECTION

POLARIZATION DIRECTION
OF INCOMING LIGHT

POLARIZATION DIRECTION

310

317

317

POLARIZATION DIRECTION

380

DETECTED LIGHT WAVE PLANE (45 DEGREE DIRECTION)

DETECTED LIGHT WAVE PLANE (−45 DEGREE DIRECTION)

LIGHT INTENSITY DISTRIBUTION (+45°)

LIGHT INTENSITY DISTRIBUTION (−45°)

DETECTED LIGHT WAVE PLANE (45 DEGREE DIRECTION)

DETECTED LIGHT WAVE PLANE (−45 DEGREE DIRECTION)

(a)

(b)

(c)

(d)

(e)

(A)  (B)  (C)  (D)

OPTICAL HEAD

TECHNICAL FIELD

The present invention relates to a device for writing information on an optical storage medium such as an optical disc or an optical card and reading or erasing the information stored on such a medium.

More particularly, the present invention relates to an optical head and an optical disc drive that can perform read and/or write operation(s) just as intended on an optical disc with multiple information storage layers.

BACKGROUND ART

Optical discs, on which signals representing a huge amount of information can be stored at high densities, have recently been used more and more extensively in a number of fields of audio, video, computer and other technologies. And yet the storage capacities of those optical discs are required to be further increased, and a lot of people have taken various approaches to achieve that object. One of those approaches that have been adopted so far to further increase the storage capacity is to provide multiple information storage layers.

In such a multilayer optical disc, however, light reflected from a target storage layer to read information from (which will be referred to herein as a "read layer") and light reflected from a storage layer other than the read layer (which will be referred to herein as a "non-read layer") often interfere with each other to threaten the stability of servo control, which is a problem.

For example, if the interval between two information storage layers of a multilayer optical disc is relatively close to the magnitude of focus error represented by the amplitude of the S-curve of a focus error (FE) signal as defined between the maximum and minimum peaks thereof (which amplitude will be referred to herein as an "S-curve amplitude"), then the S-curve signal representing the light reflected from the read layer and the S-curve signal representing the light reflected from the non-read layer will superpose one upon the other. That is to say, the FE signal will be affected by the light reflected from the non-read layer. As a result, the objective lens sometimes cannot be controlled accurately and the light beam spot sometimes cannot be formed on the target storage layer.

In this case, if the S-curve amplitude were sufficiently smaller than the layer-to-layer interval of a multilayer optical disc, this problem could be overcome to a certain degree. However, it would be difficult to shift the focal point of the light to as close to the read layer as to establish a focus controllable state easily. In addition, during a read/write operation, the stability of the focus servo control would be easily endangered when the drive is subjected to some disturbance such as vibrations, which is another problem to solve. Nevertheless, if the S-curve amplitude and the layer-to-layer interval were both increased to some extent, then the distance from the surface of the optical disc to the deepest storage layer would increase so much as to produce an increased spherical aberration in an optical head that uses an objective lens with a large numerical aperture (NA).

To overcome these problems, Patent Document No. 1 discloses a technique that uses both an FE signal with narrow S-curve amplitude detected by an astigmatism method and an FE signal with broad S-curve amplitude detected by a spot size detection (SSD) method in combination. Specifically, the optical disc drive disclosed in Patent Document No. 1 uses an FE signal with broad S-curve amplitude detected by the SSD method to shift the focal point of the light to as close to the read layer as to establish a focus controllable state easily. Thereafter, by using an FE signal with narrow S-curve amplitude that is less likely to be affected by the non-read layer, a focus servo is done on each of those layers.

Patent Document No. 1: Japanese Patent Application Laid-Open Publication No. 2002-190132

DISCLOSURE OF INVENTION

Problems to be Solved by the Invention

However, the optical head disclosed in Patent Document No. 1 does not take the interference between the light reflected from the read layer and the light reflected from the non-read layer into consideration, which is also a problem.

When a multilayer optical disc is irradiated with a laser beam, the light reflected from a read layer and the light reflected from a non-read layer interfere with each other on the photodetector of an optical head, thereby producing a bright and dark light distribution pattern there. That is why if an FE signal is generated by splitting the light beam on the photodetector, then an offset caused by unnecessary stray light will be superposed on that FE signal. In that case, focus servo control cannot be performed with high precision.

Besides, the interval between the respective layers of an optical disc is variable even within the same plane. And therefore, when the optical disc is rotated, the reflected light path will have varying optical lengths. As a result, the phase difference between the light reflected from the read layer and the light reflected from the non-read layer will change to make the bright and dark light distribution pattern on the photodetector inconstant. Consequently, since the offset caused by this interference varies as the optical disc rotates, the stability of the servo control will be shattered.

Hereinafter, these problems of the prior art will be described with reference to the accompanying drawings.

FIG. 68 illustrates a configuration for a normal optical head 51. First, it will be described where the light travels when the optical head 51 reads information from a multilayer optical disc 52.

The light emitted from the semiconductor laser 53 of the optical head 51 passes through a polarization beam splitter 54, a quarter-wave plate 55, a collimator lens 56, a mirror 57 and an objective lens 58 to be converged on a target storage layer of the multilayer optical disc 52. Next, the light reflected from the multilayer optical disc 52 goes through the objective lens 58, the mirror 57, the collimator lens 56 and the quarter-wave plate 55 again to be incident on the polarization beam splitter 54. Then, the light is reflected from the polarization beam splitter 54, guided to, and given astigmatism by, an astigmatism producer 59, and then split by a hologram element 60 into zero-order light and +first-order light.

The light that has been transmitted through the hologram element 60 is received at a quadruple photodetector 61 and subjected to some arithmetic operations, thereby generating an FE signal. In this case, not only the light reflected from the read layer of the optical disc 52 but also the light reflected from the non-read layers thereof are incident on the photosensitive portion of the photodetector 61 through the same path and interfere with each other, thus forming an interference pattern that produces a bright and dark light distribution at the light beam spot. The larger the number of information storage layers stacked in the same optical disc, the more noticeable this phenomenon will get. This is because in that case, not just light that has been reflected from each of the non-read layers only once but also light that has been reflected from each of the non-read layers a number of times will reach the photodetector.

For example, FIGS. 69(a) through 69(e) illustrate exemplary paths of light that interferes with the light that has been reflected from the read layer L2 of a six-layer optical disc. In these drawings, the paths of the light are shown on the supposition that the light comes from the upper left corner of the paper. In FIG. 69(a), the light reflected from the read layer L2 is indicated by the dashed line, while the light reflected from the non-read layers L1 and L3 is indicated by the solid lines. On the other hand, in FIGS. 69(b) through 69(e), the stray light that has been reflected three times is indicated by the solid line, while the light reflected from the read layer is indicated by the dashed line.

The once-reflected stray light shown in FIG. 69(a) forms a defocused light beam spot on the photodetector but has as high light intensity as the light reflected from the read layer. That is why unless there is a sufficient layer-to-layer interval, the once-reflected stray light will be affected by the interference significantly.

On the other hand, the intensity of the thrice-reflected stray light shown in FIGS. 69(b) through 69(e) is just several percents of that of the light reflected from the read layer. However, if there is a little difference in layer-to-layer interval between multiple pairs of layers, the degree of interference between them will be too high to neglect its influence. For example, if the interval between the L2 and L3 layers is close to that between the L3 and L4 layers as shown in FIG. 69(b), then the thrice-reflected stray light will follow almost the same optical path as the light reflected from the read layer. As a result, the stray light will be affected by the interference significantly.

FIG. 70 shows a relation between photosensitive areas 61a through 61d on the photodetector 61 and light beam spots 71 and 72. In this case, the light beam spot 71 is formed by the light reflected from the read layer, while the light beam spot 72 is formed by the light reflected from one of the non-read layers.

The light beam spots 71 and 72 have been given astigmatism in the direction that defines an angle of 45 degrees with respect to the division lines of the photosensitive portion. For example, astigmatism has been given to a focal point with a +45 degree component such that the focal point is formed ahead of the photodetector 61 as viewed from the hologram element 60. On the other hand, astigmatism has been given to a focal point with a −45 degree component such that the focal point is formed beyond the photodetector 61 as viewed from the hologram element 60. As a result, the light beam spot 71 has such a phase distribution that the closer to the edge, the more the phase leads in the +45 degree direction and the more the phase delays in the −45 degree direction.

Meanwhile, the light beam spot 72 is blurred and expanded on the photodetector 61, and therefore, has a substantially uniform phase distribution.

FIGS. 71(A) through 71(D) schematically illustrate interference patterns to be produced when the light beam spots 71 and 72 with such phase distributions interfere with each other. In these drawings, the shadowed portion represents the interference pattern, which is brighter than the rest of the light beam spot.

The difference between any two of the interference patterns shown in FIGS. 71(A) through 71(D) corresponds to a phase difference between the light reflected from the read layer and the light reflected from one of the non-read layers. Specifically, FIG. 71(A) illustrates a bright and dark light distribution in a situation where there is a phase difference of approximately $\pi/2$ between the phase around the center of the light reflected from the read layer and the phase of the light reflected from the non-read layer. FIG. 71(C) illustrates a bright and dark light distribution in a situation where there is a relatively small phase difference around the center of the light. And FIGS. 71(B) and 71(D) illustrate bright and dark light distributions in a situation where the phase of the light reflected from the read layer in the +45 degree direction is relatively close to that of the light reflected from the non-read layer and in a situation where the phase of the light reflected from the read layer in the −45 degree direction is relatively close to that of the light reflected from the non-read layer, respectively.

In FIGS. 70 and 71, the direction of rotation from the photosensitive area 61a toward the photosensitive area 61c optically corresponds to the direction in which the information track is scanned on the optical disc 52. If the intensities are represented by the reference numerals of the photosensitive areas, the FE signal can be given by the following equation.

$$FE = (61a + 61d) - (61b + 61c)$$

If the FE signal is generated in such an interference state, a positive offset will be produced in the state shown in FIG. 71(B) but a negative offset will be produced in the state shown in FIG. 71(D). That is why as the optical disc is rotated, the interval between the respective storage layers varies even within the same plane of the optical disc, thus causing a variation in the phase difference between the light reflected from the read layer and the light reflected from the non-read layer. As a result, the interference patterns and offsets also change, and therefore, the stability of servo control is shattered.

Hereinafter, it will be described on what conditions the layer-to-layer interval varies when the bright and dark light distribution inverts due to the interference. For example, suppose a light beam that has been emitted from a light source, passed by the optical axis, and then reflected from the read layer of a multilayer optical disc and another light beam that has been emitted from the same light source, also passed by the optical axis, but reflected from one of the non-read layers. Considering how these two light beams would interfere with each other on a photodetector, it can be seen that the phase difference between these two light beams following their respective optical paths is determined by the interval between the read layer and the non-read layer.

That is why if the number of light waves going toward, and coming back from, the read layer and that of light waves going toward, and coming back from, the non-read layer become different by just 0.5, then a phase difference of $\pi/2$ will be produced and the bright and light states will invert.

For example, supposing the light source has a wavelength of 0.4 μm and an intermediate layer between the read layer and the non-read layer has a refractive index of 1.6, the bright and dark states will invert if the interval between the read layer and the non-read layer shifts only by 0.0625 μm, which should be produced rather often as an inplane variation on any optical disc. For that reason, as the optical disc is rotated, the layer-to-layer interval will vary within the same plane of the optical disc, thus causing a variation in the interference pattern and in the offsets of an RF signal and the FE signal and shattering the stability of the servo control. In addition, such a variation in bright and dark light distribution will directly affect the read signal, which is the sum of the signals representing the intensities of the light that has been received at the respective photosensitive areas 61a through 61d. That is why no good read signal can be obtained anymore.

This phenomenon becomes particularly noticeable in an optical head that would achieve high storage density by using an objective lens with an NA of 0.8 or more and a light source with a wavelength of around 405 nm.

Meanwhile, a method for increasing the accuracy of a focus error signal by defining multiple areas on the hologram element 60 and designing the hologram element 60 such that the light to be diffracted changes its phases one area after another was also proposed in Japanese Patent Application Laid-Open Publication No. 2001-27710, for example. If such a hologram element is used, light beams with multiple different phases will superpose one upon the other on the photodetector and the interference will become more uniform by multiplexing those different phases with each other.

However, such a hologram element just has the function of averaging the fluctuations of the focus error signal by reducing the influence of the interference between the diffracted light beams. Considering that not only the focus error signal but also a tracking error signal and a read signal need to be detected, it is normally not efficient to detect all of those signals with the light diffracted by the hologram element. For example, supposing a normal hologram element can produce ±first-order diffracted light at an efficiency of at most approximately 30% each, only about 60% of the light that has been incident on the hologram element can be used for detecting those signals.

An object of the present invention is to provide an optical head that can produce good servo signals (such as a focus error signal and a tracking error signal) and a good read signal by reducing the influence of interference caused by the light that has been reflected from a non-read layer when a read/write operation is performed on a multilayer optical disc. Another object of the present invention is to provide an optical head that can also be used for light that has been transmitted through a hologram element and that ensures light intensity that is high enough to detect the servo signals and the read signal.

Means for Solving the Problems

An optical head according to the present invention performs reading and/or writing on an optical disc that has a plurality of storage layers including a first storage layer and a second storage layer. The optical head includes: a light source; a first optical system for converging light emitted from the light source on either the first storage layer or the second storage layer; a second optical system for receiving and transmitting light reflected from the first storage layer and stray light reflected from the second storage layer when the light is converged on the first storage layer; a photodetector that has a plurality of photosensitive areas, which output respective signals representing intensities of the light that has been incident there by way of the second optical system; and a calculating section for calculating the difference between sum of a first group of signals that have been supplied from a first group of photosensitive areas among the plurality of photosensitive areas and that of a second group of signals that have been supplied from a second group, thereby generating a focus error signal. The reflected light and the stray light that have been incident on the second optical system interfere with each other, and the first and second groups of photosensitive areas are arranged so as to be equally affected by a variation in light intensity caused by the interference.

The second optical system may include an astigmatism element. The astigmatism element may give the reflected light and the stray light astigmatism in a predetermined direction on a photosensitive plane of the photodetector. The photosensitive areas may be arranged asymmetrically with respect to the predetermined direction. The first group of photosensitive areas may consist of at least two photosensitive areas that are arranged in the predetermined direction, while the second group of photosensitive areas may consist of at least two photosensitive areas that are arranged perpendicularly to the predetermined direction.

The second optical system may include a polarization converter. The polarization converter may have a plurality of areas to transmit the reflected light and the stray light, and two adjacent ones of the areas may have the optical property of changing the polarization directions of the transmitted light into a different direction.

The second optical system may further include an astigmatism element. The astigmatism element may give the reflected light and the stray light astigmatism in a predetermined direction on a photosensitive plane of the photodetector. The plurality of areas may be arranged so as to have a plurality of division lines that are symmetrical with respect to the predetermined direction.

The division lines may be arranged so as to intersect with an optical axis.

The plurality of areas may include at least two areas, which are arranged such that the polarization directions of the light transmitted through the areas are perpendicular to each other, and an area interposed between the at least two areas. The interposed area may be arranged so as to change continuously polarization directions of the light transmitted through that area.

The two adjacent areas may be arranged in a ring around an optical axis.

The areas may have the optical property of changing the polarization directions of the transmitted light into an arbitrary direction.

The second optical system may include an interference suppressor, which may have a first optical path that passes through a center portion including the respective optical axes of the reflected light and the stray light and a second optical path that passes through a peripheral portion surrounding the center portion. The first and second optical paths may have mutually different optical path lengths.

The interference suppressor may have an optical thickness difference on its plane to receive the reflected light and the stray light. The optical path lengths of the first and second optical paths may be different from each other due to the optical thickness difference.

The second optical system may include an optical branching element, which may split a center portion, including the respective optical axes of the reflected light and the stray light, into at least two light beams. The first and second groups of photosensitive areas may receive the at least two light beams, thereby outputting the first and second groups of signals, respectively.

An optical disc drive according to the present invention includes an optical head according to any of the preferred embodiments of the present invention described above, a motor for rotating an optical disc, and a control section for controlling the optical head and the motor. In response to the focus error signal supplied from the optical head, the control section controls the optical head such that the light is continuously converged on the first storage layer of the optical disc.

Effects of the Invention

In an optical head according to the present invention and in an optical disc drive including such an optical head, when a read/write operation is being performed on a multilayer optical disc, it is possible to reduce an offset that would be produced when the focus error (FE) signal generated from a target storage layer of the read/write operation is affected, and interfered with, by the light reflected from another storage layer.

Figure 1:
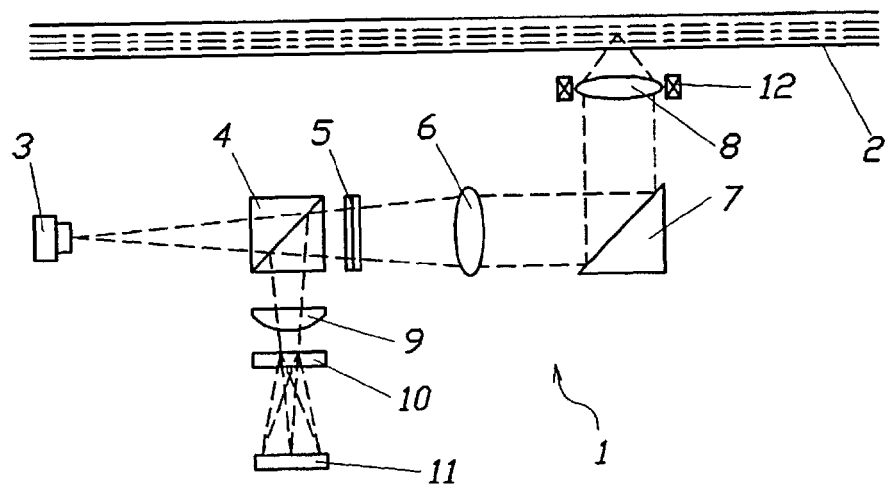
FIG. 1 illustrates an arrangement for an optical head 1 according to a first preferred embodiment of the present invention.

DESCRIPTION OF REFERENCE NUMERALS 11 quadruple photodetector
11a through 11d photosensitive area
28, 29 boundary
31, 32 virtual line
21 light beam spot

BEST MODE FOR CARRYING OUT THE INVENTION

First, an optical head according to the present invention will be outlined.

An optical head according to the present invention performs reading and/or writing on an optical disc that has a plurality of information storage layers. Suppose the optical disc includes a first storage layer and a second storage layer.

The optical head includes a first optical system for converging light emitted from a light source on either the first storage layer or the second storage layer, a second optical system for receiving and transmitting light reflected from the first storage layer and stray light reflected from the second storage layer when the light is converged on the first storage layer, a photodetector, and a calculating section.

The photodetector has a plurality of photosensitive areas, which output respective signals representing intensities of the light that has been incident there by way of the second optical system. The reflected light and the stray light that have been incident on the second optical system interfere with each other, and the first and second groups of photosensitive areas are arranged so as to be equally affected by a variation in light intensity caused by the interference.

The calculating section calculates the difference between the sum of a first group of signals that have been supplied from at least two of the photosensitive areas forming a first group and that of a second group of signals that have been supplied from at least two more of the photosensitive areas forming a second group, thereby generating a focus error signal. This calculating section may be implemented as either a circuit independent of the photodetector or a circuit forming an integral part of the photodetector.

There are roughly the following two methods for arranging the first and second groups of photosensitive areas.

According to one of the two methods, the shapes and arrangements of the respective photosensitive areas forming the first and second groups are adjusted. If the respective photosensitive areas are arranged in view of the bright and dark distribution of the light that has been received by way of the second optical system, the influence of the bright and dark distribution is canceled by making a differential calculation when the FE signal is generated. As a result, the offset that would have been produced by the FE signal can be eliminated. This method can also be used effectively to detect an FE signal by the so-called spot size detection method.

The other is a method for controlling the bright and dark distribution of the light that has been received by way of the second optical system in view of the shapes and arrangements of the respective photosensitive areas forming the first and second groups.

For example, the second optical system may include an optical element for changing the polarization directions of the reflected light and the stray light described above. If an optical element that makes the polarization directions of the reflected light and the stray light perpendicular to each other is provided, no bright and dark distribution will be produced. On the other hand, if an optical element that changes the polarization directions of the reflected light and the stray light either arbitrarily or following a predetermined rule is provided, the bright and dark distribution will be produced to a lesser degree.

Alternatively, the second optical system may include an optical element with an optical thickness difference to change the optical path lengths. The degree of interference between the reflected light and the stray light would increase if the wavefronts at the respective centers of these two types of light agreed with each other. For that reason, if the wavefronts at the respective centers of these two types of light are shifted from each other by making an optical thickness difference, the variation in intensity distribution after the interference can be reduced.

As a result, the first and second groups of photosensitive areas are arranged so as to be equally affected by a variation in light intensity due to the interference.

Hereinafter, preferred embodiments of the present invention will be described with reference to the accompanying drawings.

Embodiment 1

FIG. 1 illustrates an arrangement for an optical head 1 according to a first preferred embodiment of the present invention. This optical head is built in an optical disc drive and used to perform a read or write operation.

The optical head 1 includes a semiconductor laser 3, a polarization beam splitter 4, a quarter wave plate 5, a collimator lens 6, a mirror 7, an objective lens 8, an astigmatism producer 9, a hologram element 10, a quadruple photodetector 11 and an actuator 12.

FIG. 1 illustrates a multilayer optical disc 2 with two or more information storage layers just for the sake of convenience of description. The optical disc 2 does not form part of the optical head 1 but may be a DVD or a Blu-ray Disc (BD), for example. In the following example, the optical disc 2 is supposed to be a BD.

The semiconductor laser 3 is a light source and may emit a laser beam with a wavelength of 0.4 μm, for example.

The astigmatism producer 9 may be a cylindrical lens made of a light transmitting material. Also, the astigmatism producer 9 is arranged so as to produce astigmatism in a direction that defines an angle of 45 degrees with respect to the direction in the optical head 1 corresponding optically to the information track on the optical disc 2.

The hologram element 10 splits the light into two light beams on the right- and left-hand sides with respect to the direction corresponding to the information track and diffracts those light beams in mutually different directions. The quadruple photodetector 11 is arranged so as to receive the zero-order part of the light that has been transmitted through the hologram element 10.

The other elements of the optical head will not be described in detail because their functions and configurations are known by their names themselves.

Figure 2:
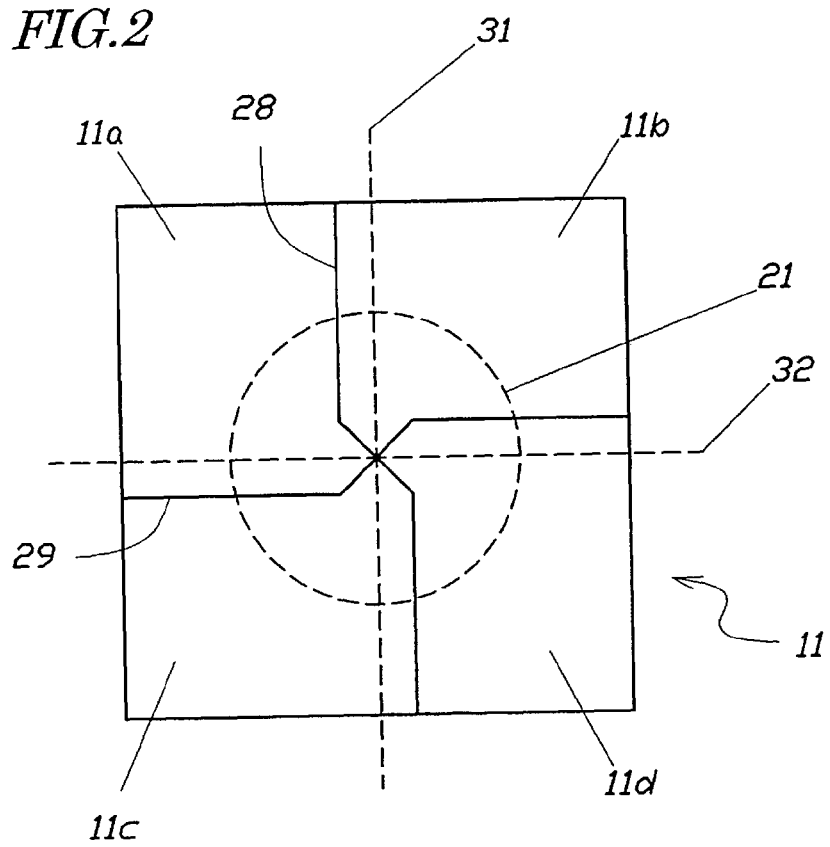
FIG. 2 shows the configuration of the quadruple photodetector 11.
Figure 3:
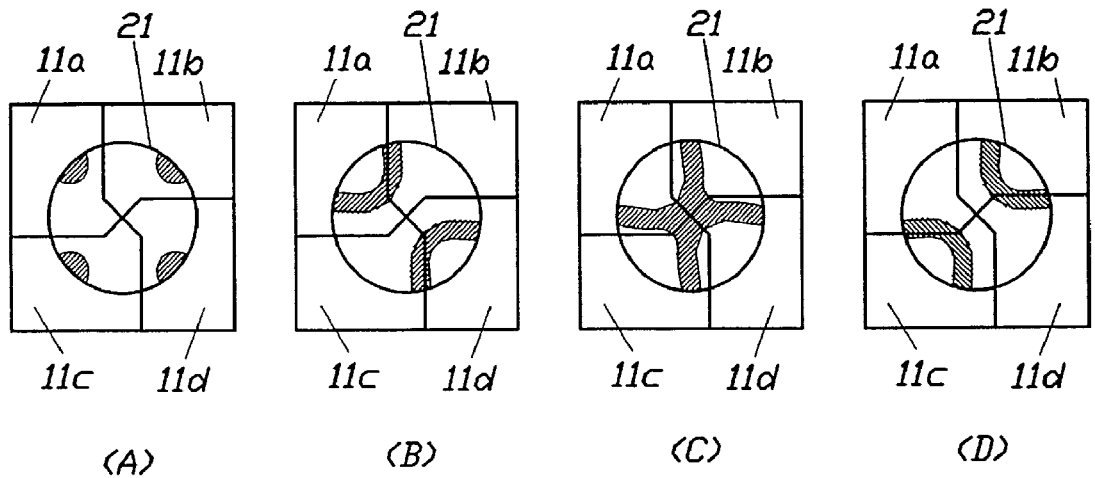
FIGS. 3(A) through 3(D) illustrate bright and dark light distributions on the photodetector 11 that change according to the phase difference between the light reflected from the read layer and the light reflected from a non-read layer.

FIG. 2 shows the configuration of the quadruple photodetector 11, which has photosensitive areas 11a through 11d. These areas 11a through 11d are defined by boundaries 28 and 29. In FIG. 2, the light beam spot 21 is indicated by the dashed circle and dashed lines 31 and 32 are shown just for reference. Specifically, the dashed line 31 is drawn so as to pass the center of the light beam spot 21 and optically correspond to the information track on the optical disc 2. The other dashed line 32 crosses the line 31 at right angles at the center of the light beam spot 21.

Also, in FIG. 2, the boundary 28 between the photosensitive areas 11a and 11b is located on the left-hand side of the line 31. The boundary 28 between the photosensitive areas 11c and 11d is located on the right-hand side of the line 31. The boundary 29 between the photosensitive areas 11a and 11c is located under the line 32. And the boundary 29 between the photosensitive areas 11b and 11d is located over the line 32.

Hereinafter, it will be described with reference to FIG. 1 again where the light passes when the optical head 1 with such a configuration is reading information from the multilayer optical disc 2.

The light emitted from the semiconductor laser 3 passes through the polarization beam splitter 4, the quarter-wave plate 5, the collimator lens 6, the mirror 7 and the objective lens 8 to be converged on a target information storage layer of the multilayer optical disc 2. Next, the light reflected from the multilayer optical disc 2 goes through the objective lens 8, the mirror 7, the collimator lens 6 and the quarter-wave plate 5 again to be incident on the polarization beam splitter 4. At this point in time, the polarization direction of the reflected light defines an angle of 90 degrees with respect to that of the light emitted from the semiconductor laser 3. That is why the reflected light is reflected from the polarization beam splitter 4 toward the astigmatism producer 9. Then, the light that has been given astigmatism by the astigmatism producer 9 is incident on, and split by, the hologram element 10 into zero-order light and ±first-order light. A tracking error signal will be generated based on these ±first-order light. However, detailed description thereof will be omitted herein.

Also, the light that has been transmitted through the hologram element 10 is received at the quadruple photodetector 11 and subjected to an arithmetic calculation there, thereby generating an FE signal. In this case, as in the normal optical head described above, the light beam spot will have a bright and dark light distribution due to the interference between the reflected light and the light reflected from one of the non-read layers. The FE signal is figured out by a calculator by the following equation.

$$FE=(11a+11d)-(11b+11c)$$

Where 11a, 11d and so on denote the signals representing the intensities of the light that has been received at the respective photosensitive areas 11a, 11d, etc. The calculator may be a differential calculator connected to the photosensitive areas 511a through 511d shown in FIG. 57, for example. The calculator may be implemented either as a circuit independent of the photodetector or as a circuit forming an integral part of the photodetector. The same statement will apply to any of the calculators that will be mentioned in the rest of the description.

FIGS. 3(A) through 3(D) schematically illustrate bright and dark light distributions on the photodetector 11 that change according to the phase difference between the light reflected from the read layer and the light reflected from a non-read layer. In these drawings, the shadowed portion represents the interference pattern, which is brighter than the rest of the light beam spot. It should be noted that the light beam spot formed by the light reflected from the non-read layer is not illustrated in these drawings.

Specifically, FIG. 3(A) illustrates a bright and dark light distribution in a situation where there is a phase difference of approximately π/2 between the phase around the center of the light reflected from the read layer and the phase of the light reflected from the non-read layer. FIG. 3(C) illustrates a bright and dark light distribution in a situation where there is a relatively small phase difference around the center of the light. And FIGS. 3(B) and 3(D) illustrate bright and dark light distributions in a situation where the phase of the light reflected from the read layer in the +45 degree direction is relatively close to that of the light reflected from the non-read layer and in a situation where the phase of the light reflected from the read layer in the −45 degree direction is relatively close to that of the light reflected from the non-read layer, respectively.

Let us consider how to generate an FE signal based on the light beam spot with such bright and dark light distributions. Specifically, in the states shown in FIGS. 3(A) and 3(C), one pair of photosensitive areas 11a and 11d and the other pair of photosensitive areas 11b and 11c are substantially equally affected by the bright and dark light distributions represented by the interference patterns. As a result, no offset will be produced in the FE signal.

In the state shown in FIG. 3(B), the interference patterns produced at the upper left and lower right corners of the light beam spot not only cover the photosensitive areas 11a and 11d but also partially enter the other photosensitive areas 11b and 11c. That is why when an FE signal is figured out, the influence of the bright and dark light distribution is canceled and the offset can be substantially eliminated. Likewise, even in the state shown in FIG. 3(D), the bright portion is included in each of the four photosensitive areas, and therefore, the influence can also be canceled and the offset can also be substantially eliminated by figuring out the FE signal.

That is to say, as far as the photodetector 11 shown in FIG. 2 is concerned, these two pairs of photosensitive areas 11a, 11d and 11b, 11c can be regarded as being arranged so as to be equally affected by a variation in light intensity due to the interference. For that reason, the influence of the bright and dark light distribution can be canceled by performing a differential calculation to generate an FE signal. As a result, a good FE signal can be obtained with the offset, which would have been produced due to interference with variation components, cut down.

By getting the objective lens 8 moved perpendicularly to the optical disc 2 (i.e., along the optical axis) by the actuator 12 according to the level and polarity of this FE signal, a focus servo control can be performed so as to get the light emitted from the semiconductor laser 3 converged on the target storage layer.

In this manner, the optical head of the present invention can reduce not only the offset that would have been produced in the FE signal if the light reflected from a non-read layer entered a photodetector and interfered with the light reflected from the read-layer when a read operation is performed on a multilayer optical disc but also a variation in that offset.

This preferred embodiment is characterized in that the photosensitive areas are shaped asymmetrically with respect to the axes of symmetry in ±45 degree directions with a special attention paid to the fact that the interference pattern appears symmetrically with respect to the ±45 degree directions, i.e., the direction in which the astigmatism has been given and the direction that intersects with the former direction at right angles. That is why the same effect will be achieved even if the respective photosensitive areas are reversed with respect to the axes of symmetry in the ±45 degree directions.

For example, suppose the −45 degree direction is defined by the line running from the upper left corner of the photodetector 11 shown in FIG. 2 toward the lower right corner thereof and the +45 degree direction is defined by the line running from the upper right corner of the photodetector 11 shown in FIG. 2 toward the lower left corner thereof. In that case, if the photosensitive areas 11a and 11d are reversed with respect to the axis of symmetry in the −45 degree direction and if the photosensitive areas 11b and 11c are reversed with respect to the axis of symmetry in the +45 degree direction, then the resultant shape will be the same as that obtained by reversing the photodetector with respect to the line 31. The effect described above is achieved by such a photodetector, too.

Figure 4:
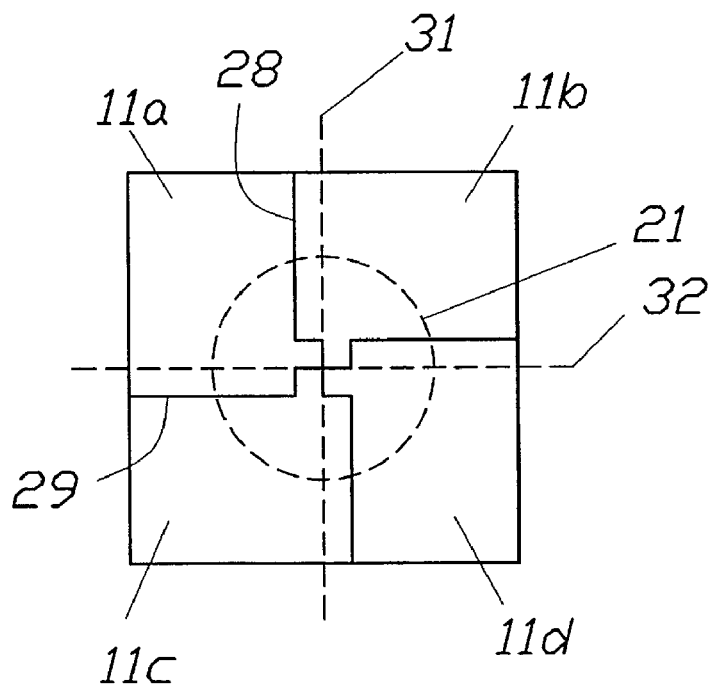
FIG. 4 shows another exemplary arrangement of the boundaries 28 and 29.
Figure 5:
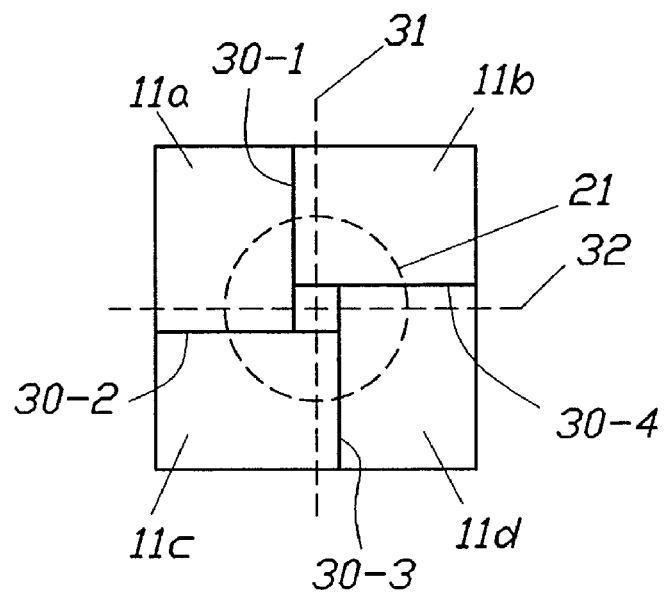
FIG. 5 shows still another exemplary arrangement of boundaries 30-1 through 30-4.

It should be noted that the arrangements and shapes of the boundaries 28 and 29 between the respective photosensitive areas are just examples. Thus, the effect described above is also achieved even if the boundaries 28 and 29 have any of various other arrangements or shapes. In other words, the arrangements and shapes of the respective photosensitive areas to be defined by the boundaries may have be any of various other ones. FIG. 4 shows another exemplary arrangement of the boundaries 28 and 29. Alternatively, the boundaries 30-1 through 30-4 shown in FIG. 5 may also be adopted. Still alternatively, the boundaries may also be curved. In any case, the same effect will be achieved even when the photosensitive areas defined by any of these alternative pairs of boundaries are used.

Embodiment 2

The only difference between a second preferred embodiment of the present invention and the first preferred embodiment described above lies in the arrangement of photosensitive areas in the photodetector 11. Every other element is quite the same in these two preferred embodiments, and will be identified by the same reference numeral and the description thereof will be omitted herein.

Figure 6:
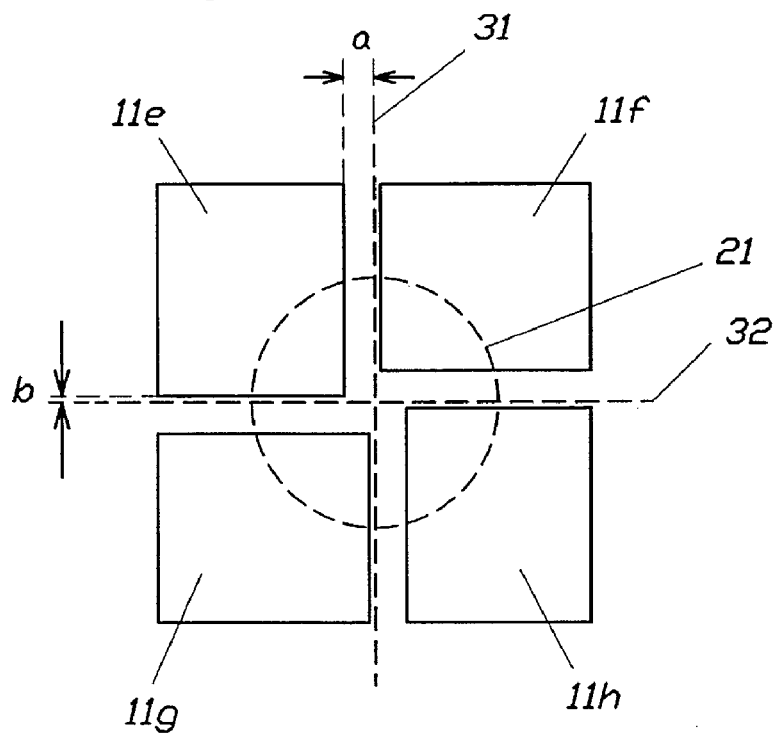
FIG. 6 shows a configuration for a quadruple photodetector according to a second preferred embodiment of the present invention.
Figure 7:
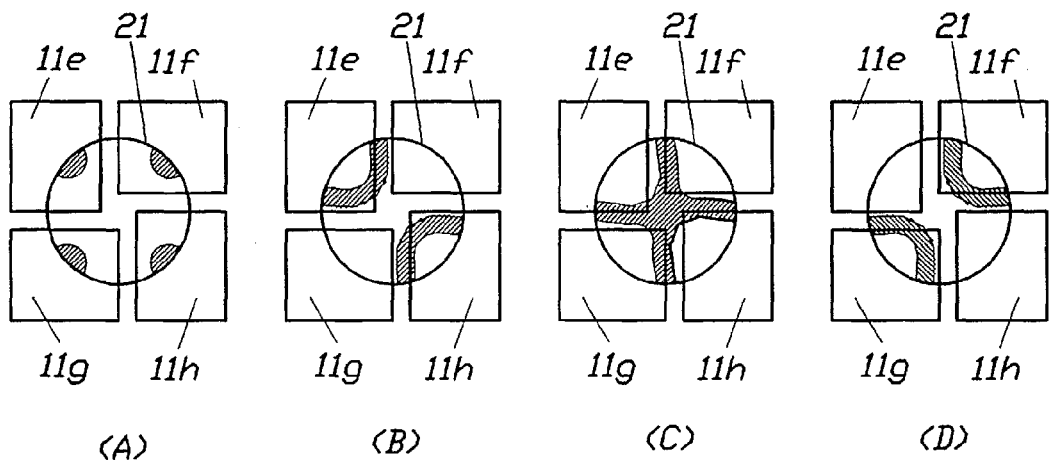
FIGS. 7(A) through 7(D) illustrate bright and dark light distributions on the photodetector 11 that change according to the phase difference between the light reflected from the read layer and the light reflected from a non-read layer.

FIG. 6 illustrates a configuration for a quadruple photodetector according to this second preferred embodiment. The quadruple photodetector has photosensitive areas 11e through 11h. The photodetector 11 is connected to a calculator (not shown) for generating an FE signal by calculating FE=(11e+11h)−(11f+11g).

Each of these photosensitive areas 11e through 11h is arranged one by one in an associated one of the four areas defined by the lines 31 and 32. More specifically, each of these photosensitive areas 11e through 11h is arranged such that the gap between the photosensitive area and the line 31 is not equal to that between the same photosensitive area and the line 32.

For example, if the gap between the right side of the photosensitive area 11e and the line 31 is identified by "a" and if the gap between the lower side of the photosensitive area 11e and the line 32 is identified by "b", this photosensitive area 11e is arranged unevenly such that the gap a is greater than the gap b. In the same way, each of the other photosensitive areas f through h is also arranged unevenly.

FIGS. 7(A) through 7(D) schematically illustrate bright and dark light distributions on the photodetector 11 that change according to the phase difference between the light reflected from the read layer and the light reflected from a non-read layer. In FIG. 7, the signs and figures means the same as in FIG. 3.

Specifically, FIG. 7(A) illustrates a bright and dark light distribution in a situation where there is a phase difference of approximately π/2 between the phase around the center of the light reflected from the read layer and the phase of the light reflected from the non-read layer. FIG. 7(C) illustrates a bright and dark light distribution in a situation where there is a relatively small phase difference around the center of the light. And FIGS. 7(B) and 7(D) illustrate bright and dark light distributions in a situation where the phase of the light reflected from the read layer in the +45 degree direction is relatively close to that of the light reflected from the non-read layer and in a situation where the phase of the light reflected from the read layer in the −45 degree direction is relatively close to that of the light reflected from the non-read layer, respectively.

Let us consider how to generate an FE signal based on the light beam spot with such bright and dark light distributions. Specifically, in the states shown in FIGS. 7(A) and 7(C), one pair of photosensitive areas 11e and 11h and the other pair of photosensitive areas 11f and 11g are substantially equally affected by the bright and dark light distributions represented by the interference patterns. As a result, no offset will be produced in the FE signal.

In the state shown in FIG. 7(B), portions of the interference patterns produced at the upper left and lower right corners of the light beam spot are outside of the photosensitive areas 11e and 11h, and therefore, the offset that would have been produced due to the influence of the bright and dark light distributions can be reduced. Likewise, in the state shown in FIG. 7(D), as bright portions are partially outside of the photosensitive areas, the offset can also be reduced.

As a result, a good FE signal can be obtained with the offset, which would have been produced due to interference with variation components, cut down. By getting the objective lens 8 moved perpendicularly to the optical disc 2 (i.e., along the optical axis) by the actuator 12 according to the level and polarity of this FE signal, a focus servo control can be performed so as to get the light emitted from the semiconductor laser 3 converged on the target storage layer.

According to the configuration of the first preferred embodiment, an FE signal of the opposite phase is generated in a portion of the photosensitive area 11a under the line 32, a portion of the photosensitive area 11b on the left-hand side of the line 31, a portion of the photosensitive area 11c on the right-hand side of the line 31, and a portion of the photosensitive area 11d under the line 32, thus causing a decrease in the amplitude of the FE signal as a side effect. On the other hand, in this preferred embodiment, those portions are present as dead zones that do not receive light. As a result, not just can the effects of the first preferred embodiment be all achieved but also can the decrease in the amplitude of the FE signal be minimized as well.

Besides, the all sum signal of the photosensitive areas 11e through 11h for use to adjust the gain of the light detection signal would normally vary significantly if the interference shown in FIG. 7(A) or 7(C) were produced. By adopting the arrangement of this preferred embodiment, however, the magnitude of the variation of that all sum signal can also be reduced.

The present inventors discovered that the present invention was effective if the distance W between the line 31 and the photosensitive area 11e, 11h or between the line 32 and the photosensitive area 11f, 11g and the diameter D of the light beam spot 21 on the photodetector 11 satisfy:

$$0.05 < W/D < 0.2$$

The reason is that if W were too large, then the amplitude of the S-curve of the FE signal would decrease. On the other hand, if W were too small, the effect of the present invention would not be achieved.

Figure 8:
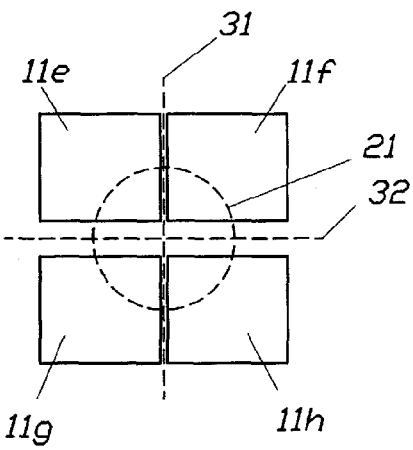
FIG. 8 illustrates another exemplary arrangement of photosensitive areas.

In this preferred embodiment, the same effect can also be achieved even if the respective photosensitive areas are reversed with respect to the axes of symmetry in the ±45 degree directions. FIG. 8 illustrates another exemplary arrangement of photosensitive areas. This arrangement of photosensitive areas shown in FIG. 8 can be obtained by reversing the photosensitive areas 11e and 11h with respect to the axis of symmetry in the −45 degree direction that is defined by the line running from the upper left corner of the photodetector shown in FIG. 6 toward the lower right corner thereof.

The present inventors further discovered that the present invention was effective if the width W of the gap between the photosensitive areas 11e, 11f or between the photosensitive areas 11g, 11h satisfied:

$$0.1 < W/D < 0.4$$

Furthermore, a lot of modified examples can be provided by taking advantage of the fact that the interference patterns appear symmetrically with respect to the axes of symmetry in the ±45 degree directions.

Figure 9:
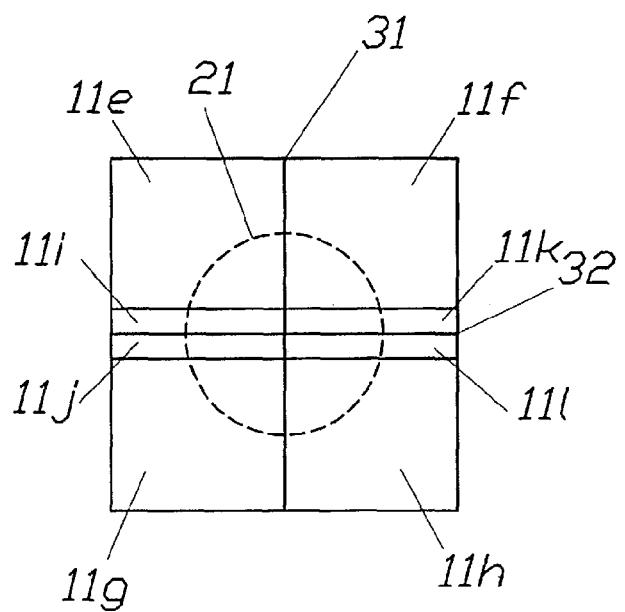
FIG. 9 illustrates a photodetector in which photosensitive areas 11i through 11l are newly defined in the dead zone at the center of the photodetector shown in FIG. 8 by dividing the dead zone into four by the lines 31 and 32.

FIG. 9 illustrates a photodetector in which photosensitive areas 11i through 11l are newly defined in the dead zone at the center of the photodetector shown in FIG. 8 by dividing the dead zone into four by the lines 31 and 32. Since the bright and dark light distributions due to the interference patterns appear symmetrically with respect to the axes of symmetry in the ±45 degree directions, the photosensitive areas 11i and 11l will have the same bright and dark light distribution. So do the photosensitive areas 11j and 11k. For that reason, even if (11i-11l) and (11j-11k) are added to the equation to calculate the FE signal, the offset of the FE signal can also be reduced no less effectively. That is to say, the FE signal can be calculated by the following equation.

$$FE = (11e + 11h + 11i + 11j) - (11f + 11g + 11l + 11k)$$

Figure 10:
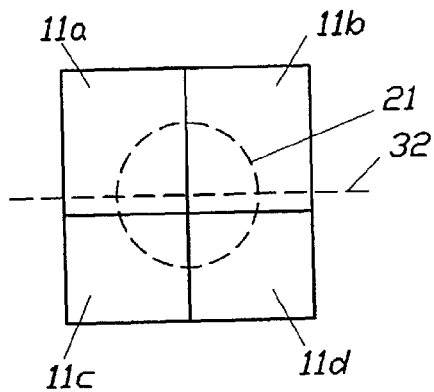
FIG. 10 illustrates a photodetector that has photosensitive areas 11a through 11d.

This means that the same effect can also be achieved even if a group of photosensitive areas, corresponding to the group of photosensitive areas defined by this equation, is provided. For example, FIG. 10 illustrates a photodetector that has photosensitive areas 11a through 11d. Specifically, the photosensitive area 11a corresponds to the photosensitive areas 11e, 11i and 11j shown in FIG. 9. Even the photodetector shown in FIG. 10 can reduce the offset of the FE signal no less effectively.

Figure 11:
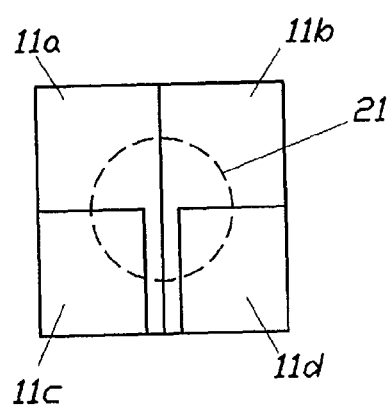
FIG. 11 illustrates a modified example of the photodetector shown in FIG. 9.

FIG. 11 shows a modified example of the photodetector shown in FIG. 9. The photodetector shown in FIG. 11 can be obtained by reversing the photosensitive areas 11g, 11j and the photosensitive areas 11h, 11l of the photodetector shown in FIG. 9 with respect to the axes of symmetry in the ±45 degree directions. The photodetector shown in FIG. 11 can also achieve the same effect as what has been described above.

Figure 12:
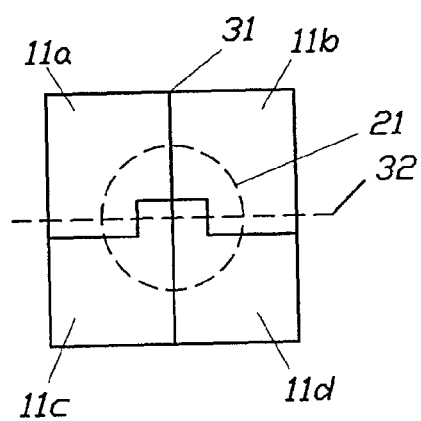
FIG. 12 illustrates another modified example of the photodetector shown in FIG. 9.

Optionally, the photosensitive areas 11i through 11l shown in FIG. 9 may be divided further finely. In any case, those photosensitive areas may be arranged in any pattern as long as subtraction is done between two areas that are located symmetrically with respect to the center of the light beam spot. Still alternatively, the arrangement shown in FIG. 12 may also be adopted. FIG. 12 shows another modified example of the photodetector shown in FIG. 9.

According to the modified examples shown in FIGS. 10 to 12, the effect of minimizing the variation in the all sum signal can no longer be achieved but the light beam can be received entirely. For that reason, these arrangements are advantageous when an RF signal and other signals also need to be detected.

As described above, the optical head of the present invention can reduce the offset that would have been produced in the FE signal if the light reflected from a non-read layer entered a photodetector and interfered with the light reflected from the read-layer when a read operation is performed on a multilayer optical disc.

Thus, the present invention provides an optical head that can perform a servo operation with good stability even if there is a narrow interval between multiple layers of a multilayer optical disc.

Embodiment 3

Figure 13:
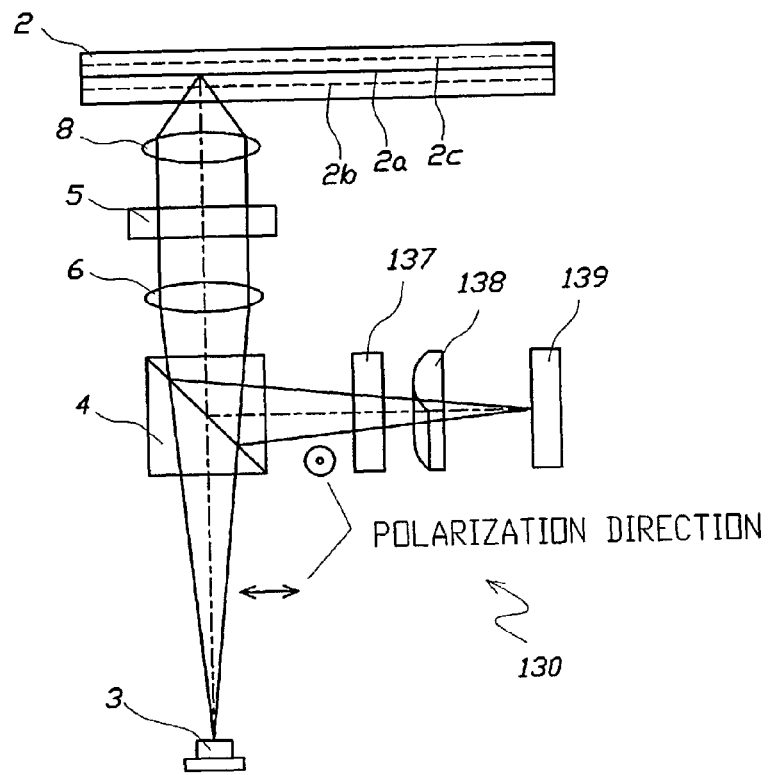
FIG. 13 illustrates an arrangement for an optical head 130 according to a third preferred embodiment of the present invention.

FIG. 13 illustrates an arrangement for an optical head 130 according to a third preferred embodiment of the present invention. This optical head can also be built in an optical disc drive and used to perform a read/write operation. In FIG. 13, any component of the optical head 130 having substantially the same function as the counterpart of the optical head 1 shown in FIG. 1 is identified by the same reference numeral and the description thereof will be omitted herein.

The optical head 130 includes a polarization converter 137, a cylindrical lens 138, and a quadruple photodetector 139. The polarization converter 137 rotates the polarization direction of a part of the light transmitted there through.

Figure 14:
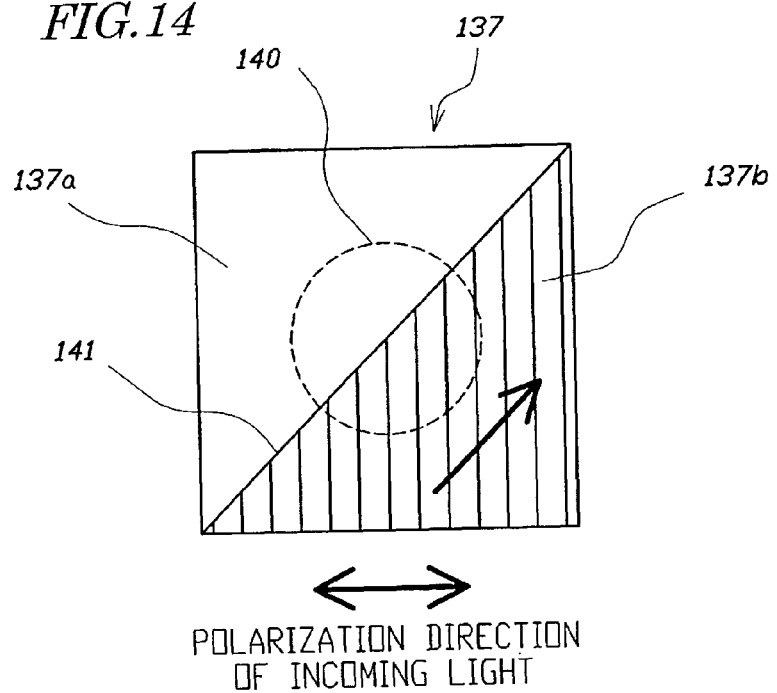
FIG. 14 shows a configuration for the polarization converter 137.

FIG. 14 shows a configuration for the polarization converter 137, which has a transmitting area 137a made of a material that transmits light and a polarization rotating area 137b shadowed. The polarization rotating area 137b functions as a half-wave plate. In FIG. 14, also shown are an incoming light beam 140 and a boundary that defines the areas 137a and 137b. The arrow shown in the area 137b indicates the direction of the optic axis of the half-wave plate, which is defined so as to form an angle of 45 degrees with respect to the polarization direction of the incoming light beam.

Figure 15:
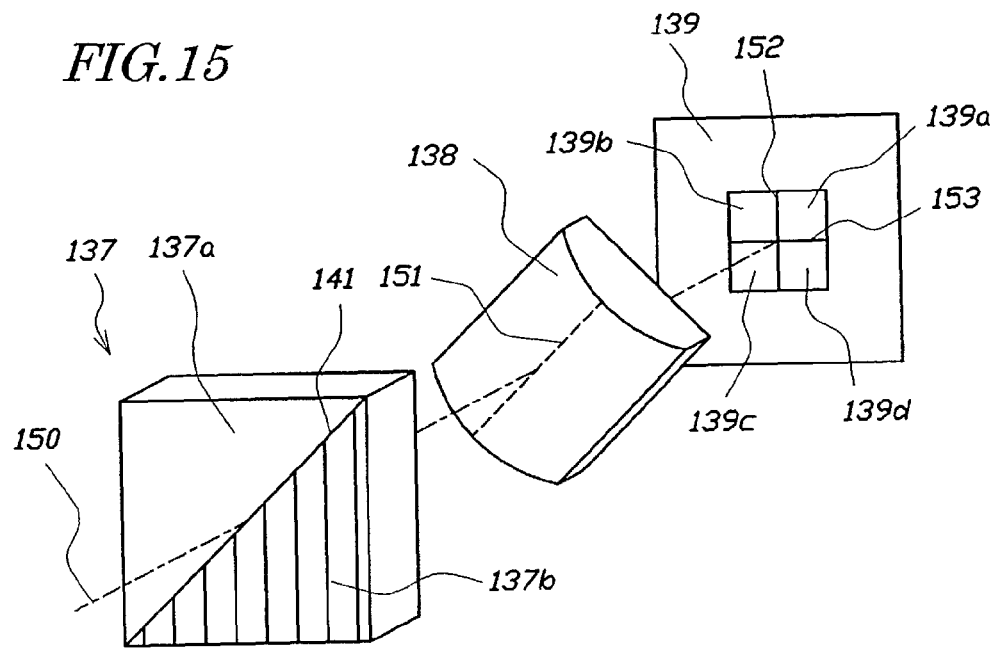
FIG. 15 is a perspective view illustrating an arrangement of the polarization converter 137, the cylindrical lens 138 and the photodetector 139.

FIG. 15 is a perspective view illustrating an arrangement of the polarization converter 137, the cylindrical lens 138 and the photodetector 139. In FIG. 15, also shown are the generator 151 of the cylindrical lens 138, the division lines 152 and 153 that define the photosensitive areas of the photodetector 139, the photosensitive areas 139a through 139d and the optical axis 150.

In FIG. 15, the division line 152 on the photodetector 139 is drawn in a direction optically corresponding to the direction in which the information track runs on the optical disc 2. The division line 153 crosses the division line 152 at right angles. Also, the cylindrical lens 138 is arranged such that its generator 151 defines an angle of approximately 45 degrees with respect to one of the division lines 152 and 153. And these members are arranged such that the boundary 141 on the polarization converter 137 and the generator 151 of the cylindrical lens 138 both run in the same direction.

Although not shown, the photodetector 139 is connected to not only a calculator for generating an FE signal by calculating FE=(9a+9c)−(9b+9d) but also another calculator for generating a read signal by calculating RF=9a+9b+9c+9d.

Also, although not shown and not described in detail, the tracking error signal is generated based on light beams that have been split by inserting a hologram element, for example, into the optical path of the light reflected from the optical disc.

Hereinafter, it will be described with reference to FIG. 13 again where the light passes when the optical head 130 with such a configuration is reading information from the multilayer optical disc 2.

The light emitted from the semiconductor laser 3 passes through the polarization beam splitter 4, the collimator lens 6, the quarter-wave plate 5, and the objective lens 8 to be converged on a target information storage layer of the multilayer optical disc 2. Next, the light reflected from the multilayer optical disc 2 goes through the objective lens 8, the quarter-wave plate 5, and the collimator lens 6 again to be incident on the polarization beam splitter 4. At this point in time, the polarization direction of the reflected light defines an angle of 90 degrees with respect to that of the light emitted from the semiconductor laser 3. That is why the reflected light is reflected from the polarization beam splitter 4 toward the polarization converter 137.

Supposing the polarization direction of the light that is going to enter the polarization converter 137 is the horizontal direction on the paper, the polarization direction of the light transmitted through the area 137a shown in FIG. 14 does not change. On the other hand, the polarization direction of the light transmitted through the area 137b rotates 90 degrees to change into the direction perpendicular to the paper (i.e., the direction coming out of the paper).

Then, the light beam, a part of which has had its polarization direction rotated by the polarization converter 137, is given astigmatism by the cylindrical lens 138 and then led to the photodetector 139, where a differential calculation is performed based on the intensities of the light received, thereby generating an FE signal by the astigmatism method and also generating a read signal as the sum signal.

In this case, not only the light reflected from the read layer 2a of the multilayer optical disc 2 but also the light reflected from the shallower layer 2b thereof and the light reflected from the deeper layer 2c thereof are all incident on the photodetector 139 through the same optical path. As a result, these light beams superpose one upon the other on the photosensitive areas.

In the optical head of this preferred embodiment, however, the light reflected from the read layer 2a and the light reflected from the shallower layer 2b never interfere with each other. The reason will be described with reference to FIG. 16.

Figure 16:
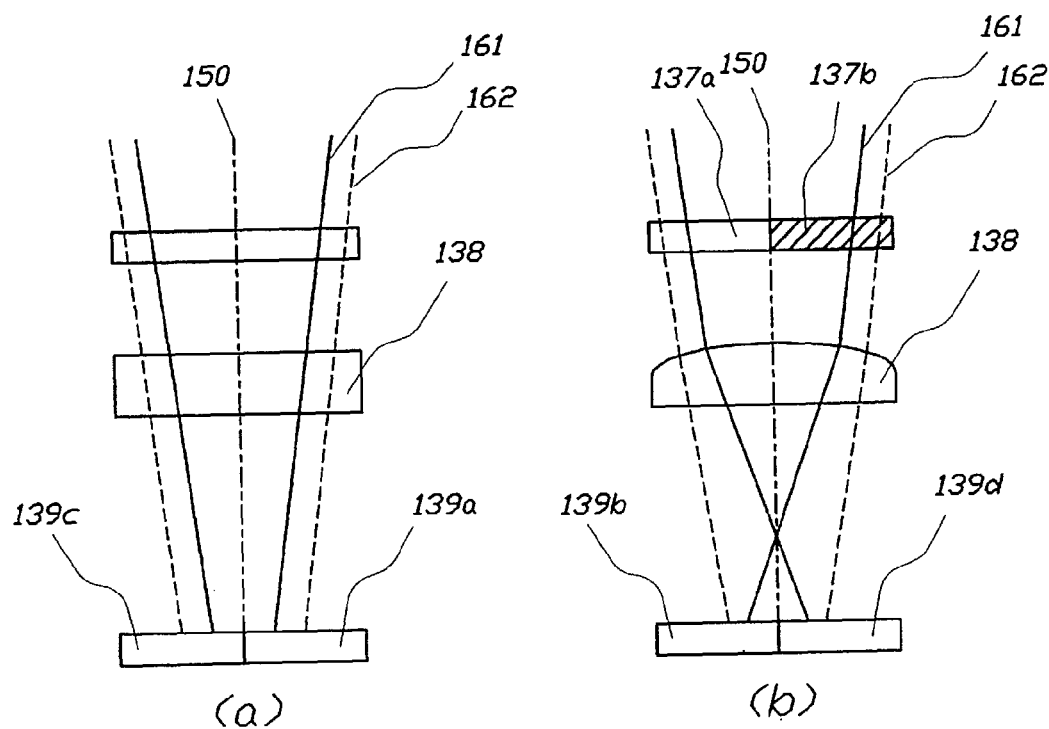
FIG. 16 shows an optical path through which the light reflected from the read layer 2a and the light reflected from the shallower layer 2b are received at the photodetector 139.

FIG. 16 shows an optical path through which the light reflected from the read layer 2a and the light reflected from the shallower layer 2b are received at the photodetector 139. Specifically, FIG. 16(a) shows the light reflected from the optical disc on a cross section A that includes the optical axis 150 and the generator 151 of the cylindrical lens. On the other hand, FIG. 16(b) shows the light reflected from the optical disc on another cross section B that also includes the optical axis 150 and that intersects with the cross section A at right angles. In FIG. 16, each member also shown in FIG. 15 is identified by the same reference numeral. FIGS. 16(a) and 16(b) show the read layer reflected light 161 and the shallower layer reflected light 162.

On both of the cross sections A and B, the shallower layer reflected light 162 focuses behind the photodetector 139. On the other hand, the read layer reflected light 161 focuses at the rear focal line behind the photodetector 139 on the cross section A, but focuses at the front focal line ahead of the photodetector 139 on the cross section B.

Look at the cross section B more closely. The light beams reaching the photosensitive area 139b are the read layer reflected light 161, which has had its polarization direction rotated by being transmitted through the area 137b, and the shallower layer reflected light 162 that has been transmitted through the area 137a. On the other hand, the light beams reaching the photosensitive area 139d are the read layer reflected light 161 that has been transmitted through the area 137a and the shallower layer reflected light 162 that has had its polarization direction rotated by being transmitted through the area 137b.

Generally speaking, interference is a physical phenomenon induced by the waving property of light. Since two linearly polarized light, of which the oscillation planes intersect with each other at right angles, never interfere with each other, the read layer reflected light 161 and the shallower layer reflected light 162, which superpose one upon the other in the photosensitive areas 139b and 139d, do not interfere with each other.

The same statement applies to an arbitrary cross section that is parallel to the cross section B. That is to say, on the photodetector 139, the read layer reflected light 161 and the shallower layer reflected light 162 have polarization directions that are perpendicular to each other, and therefore, do not interfere with each other.

Consequently, no bright and dark distributions of light are produced due to the interference, and good FE signal and read signal can be obtained with the generation and variation of the offset eliminated.

As described above, the optical head of the present invention would eliminate the production of interference even if the light reflected from the shallower layer 2b entered the photodetector when information is being read from a multilayer optical disc. As a result, the present invention provides an optical head that can perform a servo operation with good stability using an FE signal with little variation in offset and that can generate a good read signal.

The same effect will be achieved as long as the polarization directions of the light beams that have been transmitted through the areas 137a and 137b of the polarization converter 137 shown in FIG. 14 are different from each other by 90 degrees. That is why the converter 137 may also be an element having the function of rotating the polarization direction of the light passing through the area 137a −45 degrees and that of the light passing through the area 137b +45 degrees, respectively.

Also, the most significant effect is achieved in a situation where the polarization directions of the light beams that have been transmitted through the areas 137a and 137b of the polarization converter 137 are different from each other by 90 degrees. However, even if the difference is not 90 degrees, some effect will be achieved accordingly.

It should be noted that the structure of the polarization converter 137 shown in FIG. 14 is just an example. The same effect is achieved as long as the polarization converter 137 is designed such that the polarization directions of light beams passing through two areas that are symmetrical to each other with respect to the boundary 141 are perpendicular to each other.

Figure 26:
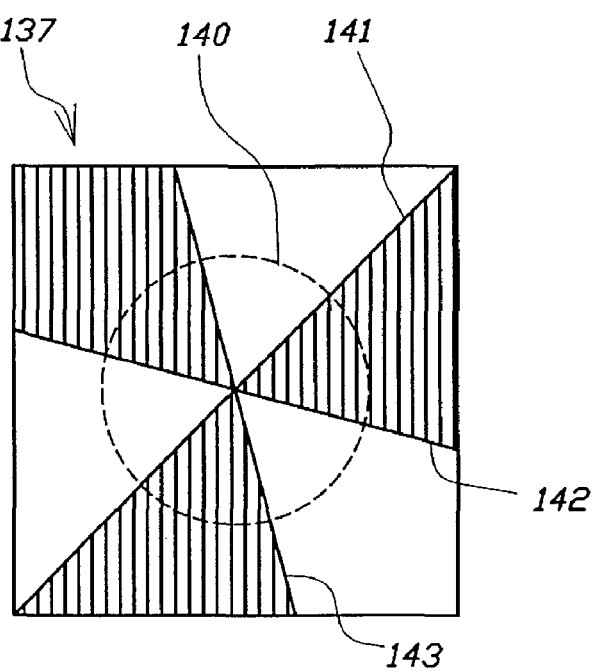
FIG. 26 illustrates another example of the polarization converter 137.

For instance, FIG. 26 illustrates another example of the polarization converter 137. In FIG. 26, when passing through a shadowed portion, the light has its polarization direction rotated. Two more folded boundaries 142 and 143, which are symmetrical with respect to the boundary 141, are newly defined. The six areas defined by the boundaries 141 through 143 are grouped into three pairs, each of which is symmetrical to each other with respect to the boundary 141. The polarization directions of light beams transmitted through each pair of areas are perpendicular to each other, thus achieving the effect described above. These boundaries 141 through 143 are defined so as to intersect with the optical axis of the incoming light beam 140. For that reason, even if stray light is defocused to superpose on the incoming light beam 140 while keeping a relatively large beam diameter, the polarization direction conversion boundaries of the read layer reflected light (i.e., signal light) and the stray light still agree with each other.

Optionally, the polarization converter 137 may be a polarizing hologram, which has multiple areas. By defining those areas, the polarization components of the light to be diffracted can be changed. For example, by defining an area that diffracts the +45 degree component of the incoming polarized light and an area that diffracts the −45 degree component of the incoming polarized light for the polarizing hologram, the interference between the diffracted light beams can be eliminated. In addition, since the transmitted light also has a polarization distribution, the effect of the interference can be minimized.

Also, since the structure of an optical isolator is adopted in the preferred embodiment described above, the polarization converter is arranged between the polarization beam splitter and the photodetector. In an arrangement that does not use a polarization beam splitter, however, the polarization converter may also be arranged on the optical path of the outgoing light between the semiconductor laser and the objective lens.

Embodiment 4

The only difference between this preferred embodiment and the third preferred embodiment described above is the polarization converter. The other members are quite the same between these two preferred embodiments, and therefore, each member of this preferred embodiment and its counterpart of the third preferred embodiment are identified by the same reference numeral and the description thereof will be omitted herein.

Figure 17:
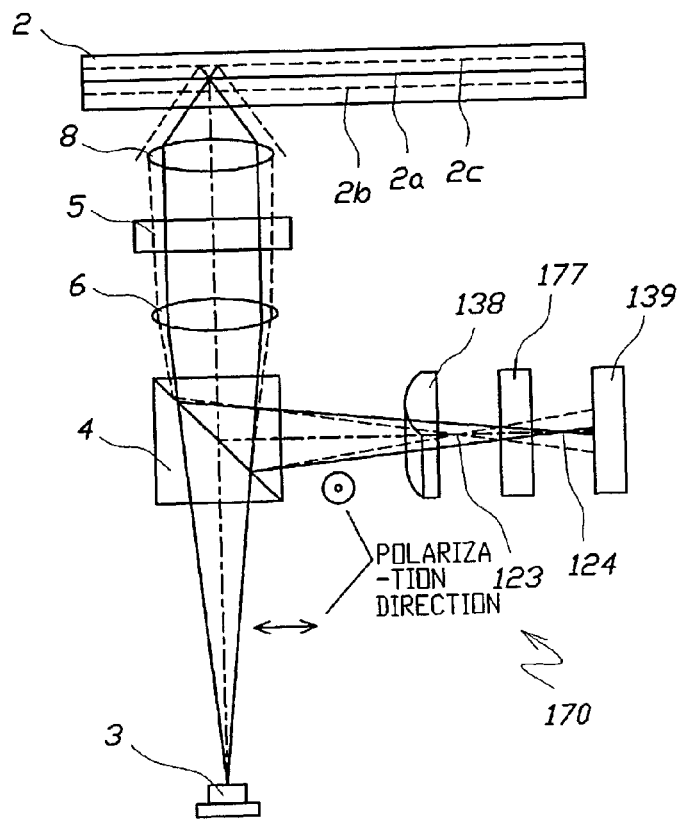
FIG. 17 illustrates an arrangement for an optical head 170 according to a fourth preferred embodiment of the present invention.

FIG. 17 illustrates an arrangement for an optical head 170 according to this preferred embodiment. This optical head is also built in an optical disc drive and used to perform a read/write operation. In FIG. 17, the light beam reflected from the deeper layer 2c is indicated by the dashed line, and the focal points 123 and 124 of the respective front focal lines of the deeper layer reflected light and the read layer reflected light are also shown.

The polarization converter 177 is arranged between these two focal points 123 and 124.

Figure 18:
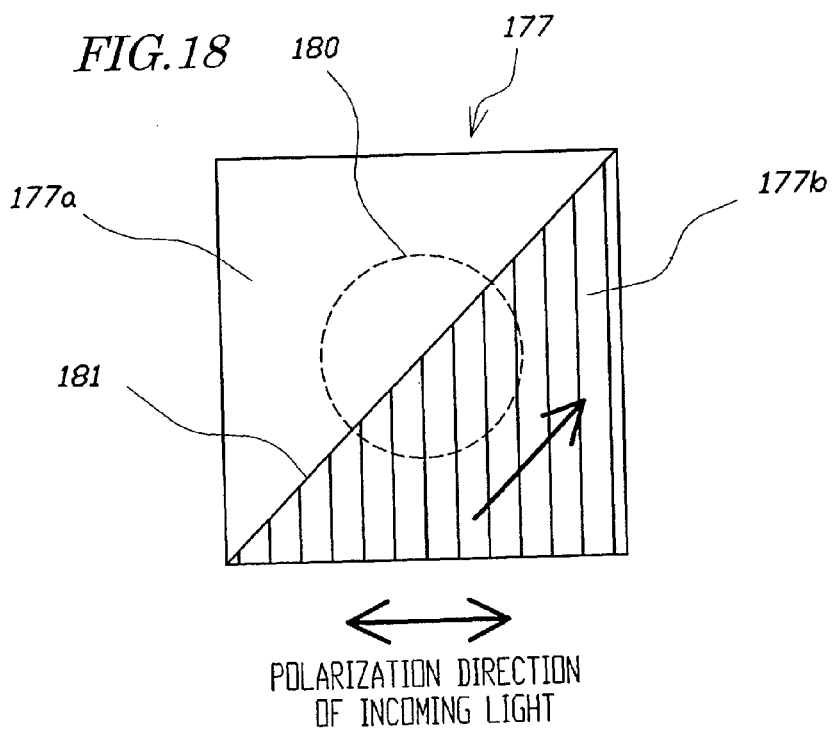
FIG. 18 shows a configuration for the polarization converter 177.

FIG. 18 shows a configuration for the polarization converter 177, which has a transmitting area 177a made of a material that transmits light and a polarization rotating area 177b shadowed. The polarization rotating area 177b functions as a half-wave plate. In FIG. 18, also shown are an incoming light beam 180 and a boundary 181 that defines the areas 177a and 177b. The arrow shown in the area 177b indicates the direction of the optic axis of the half-wave plate, which is defined so as to form an angle of 45 degrees with respect to the polarization direction of the incoming light beam.

Figure 19:
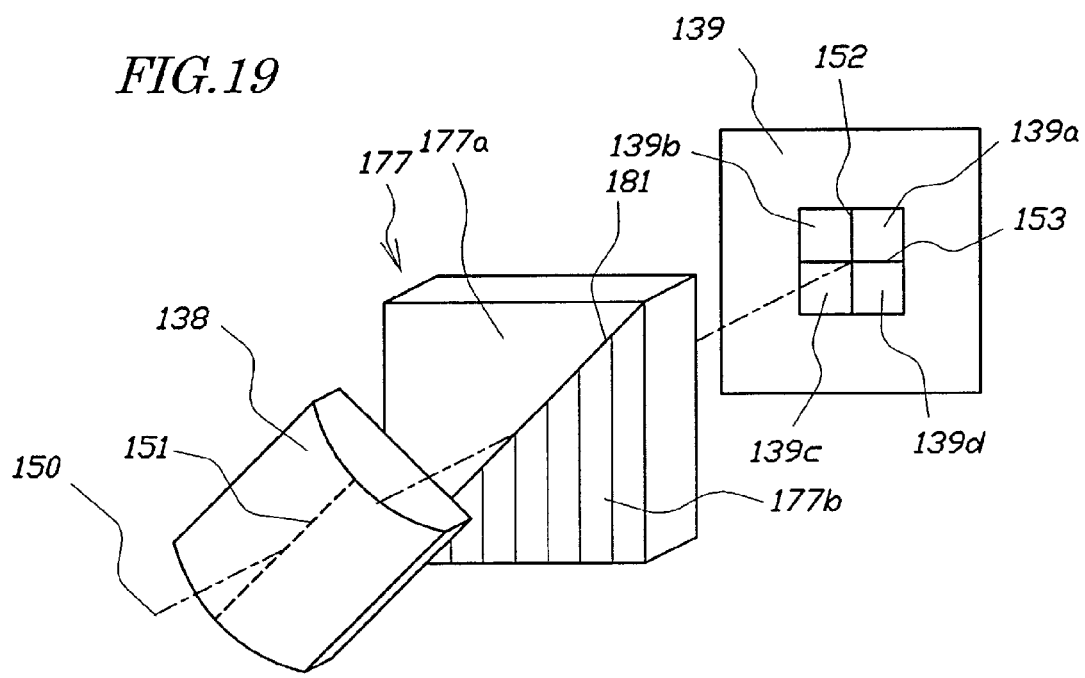
FIG. 19 is a perspective view illustrating an arrangement of the polarization converter 177, the cylindrical lens 138 and the photodetector 139.

FIG. 19 is a perspective view illustrating an arrangement of the polarization converter 177, the cylindrical lens 138 and the photodetector 139. The cylindrical lens 138 is arranged such that its generator 151 defines an angle of approximately 45 degrees with respect to one of the division lines 152 and 153 of the photodetector 139. And these members are arranged such that the boundary 181 on the polarization converter 177 and the generator 151 of the cylindrical lens 138 both run in the same direction.

Hereinafter, it will be described with reference to FIG. 17 again where the light passes when the optical head 170 with such a configuration is reading information from the multilayer optical disc 2. However, the path from the light source 3 to the optical disc 2 and the path of the light reflected from the optical disc 2 until it is reflected from the polarization beam splitter 4 are the same as those already described with reference to FIG. 17 and the description thereof will be omitted herein.

The light reflected from the optical disc 2 is reflected by the polarization beam splitter 4 to be incident on the cylindrical lens 138. Then, the light is given astigmatism by the cylindrical lens 138 and then enters the polarization converter 177. A portion of the light that has been incident on the polarization converter 177 enters the polarization rotating area 177b, which is defined by the boundary 181 parallel to the generator of the cylindrical lens 138, and has its polarization direction rotated 90 degrees. The light that has been transmitted through the polarization converter 177 is then led to the photodetector 139, where a differential calculation is performed based on the intensities of the light received at the photodetector 139, thereby generating an FE signal by the astigmatism method and also generating a read signal as the sum signal.

Figure 20:
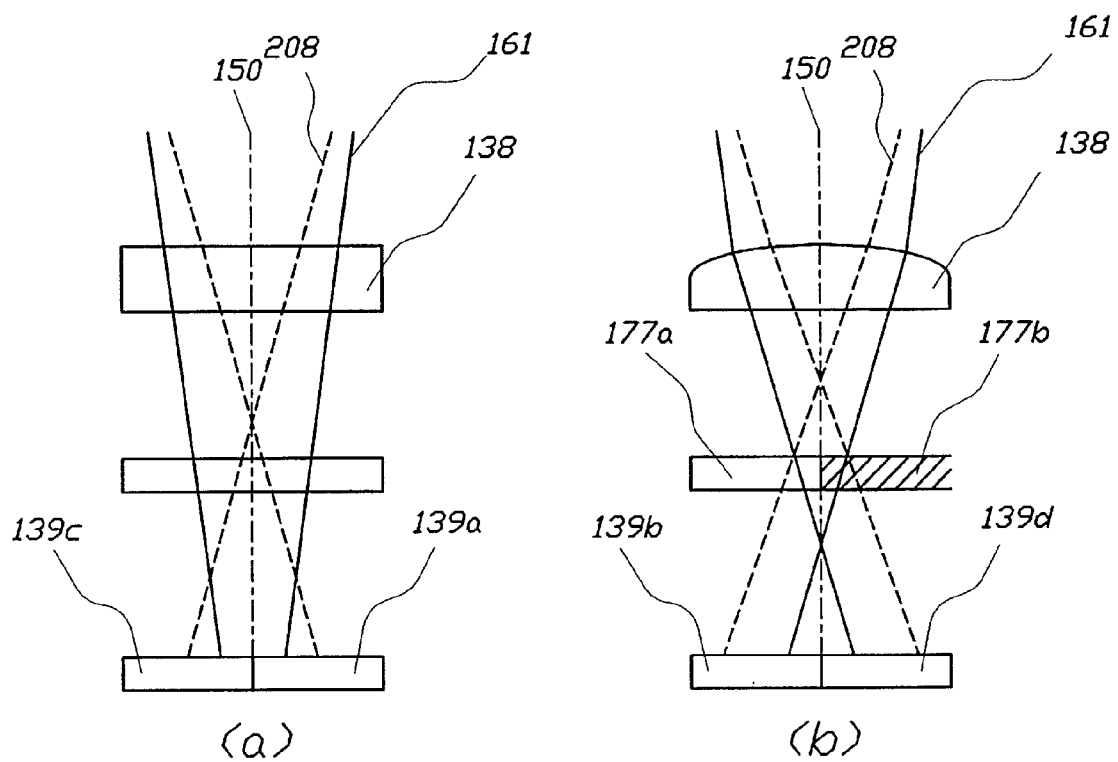
FIG. 20 shows an optical path through which the light reflected from the read layer 2a and the light reflected from the deeper layer 2c are received at the photodetector 139.

FIG. 20 shows an optical path through which the light reflected from the read layer 2a and the light reflected from the deeper layer 2c are received at the photodetector 139. Specifically, FIG. 20(a) shows the light reflected from the optical disc on a cross section A that includes the optical axis 150 and the generator 151 of the cylindrical lens. On the other hand, FIG. 20(b) shows the light reflected from the optical disc on another cross section B that also includes the optical axis 150 and that intersects with the cross section A at right angles. In FIG. 20, each member also shown in FIG. 19 is identified by the same reference numeral. FIGS. 20(a) and 20(b) show the read layer reflected light 161 and the shallower layer reflected light 208.

On both of the cross sections A and B, the deeper layer reflected light 208 focuses ahead of the photodetector 139. On the other hand, the read layer reflected light 161 focuses at the rear focal line behind the photodetector 139 on the cross section A, but focuses at the front focal line ahead of the photodetector 139 on the cross section B.

Look at the cross section B more closely. The light beams reaching the photosensitive area 139b are the read layer reflected light 161, which has had its polarization direction rotated by being transmitted through the area 177b, and the deeper layer reflected light 208 that has been transmitted through the area 177a. On the other hand, the light beams reaching the photosensitive area 139d are the read layer reflected light 161 that has been transmitted through the area 177a and the deeper layer reflected light 208 that has had its polarization direction rotated by being transmitted through the area 177b. Among these light beams, the read layer reflected light 161 and the deeper layer reflected light 208, which superpose one upon the other in the photosensitive areas 139b and 139d, have polarization directions that are perpendicular to each other, and therefore, do not interfere with each other.

The same statement applies to an arbitrary cross section that is parallel to the cross section B. That is to say, on the photodetector 139, the read layer reflected light 161 and the deeper layer reflected light 208 have polarization directions that are perpendicular to each other, and therefore, do not interfere with each other.

In addition, in this arrangement, the read layer reflected light 161 and the shallower layer reflected light also have polarization directions that are perpendicular to each other, and therefore, do not interfere with each other for the same reason as that already described for the third preferred embodiment.

Consequently, no matter whether the shallower layer reflected light or the deeper layer reflected light has entered as stray light, that stray light never interferes with the read layer reflected light, and therefore, and good FE signal and read signal can be obtained with the generation and variation of the offset eliminated.

As described above, the optical head of the present invention eliminates the offset of the FE signal that would have been produced if the light reflected from the shallower layer and the light reflected from the deeper layer entered the photodetector and interfered with each other there when information is being read from a multilayer optical disc. As a result, the present invention provides an optical head that can perform a servo operation with good stability and that can generate a good read signal.

The same effect will be achieved as long as the polarization converter 177 is arranged between the respective focal points of the deeper layer reflected light and the read layer reflected light. For that reason, the cylindrical lens 138 may be arranged either ahead of or behind the polarization converter 177 on the optical path.

Embodiment 5

The only difference between this preferred embodiment and the third preferred embodiment described above is the polarization converter. The other members are quite the same between these two preferred embodiments, and therefore, each member of this preferred embodiment and its counterpart of the third preferred embodiment are identified by the same reference numeral and the description thereof will be omitted herein.

Figure 21:
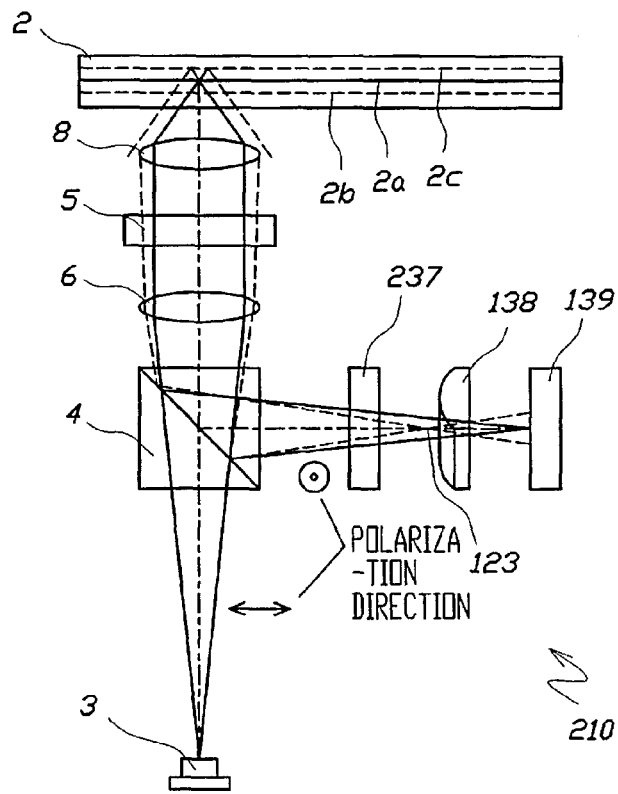
FIG. 21 illustrates an arrangement for an optical head 210 according to a fifth preferred embodiment of the present invention.

FIG. 21 illustrates an arrangement for an optical head 210 according to this preferred embodiment. This optical head is also built in an optical disc drive and used to perform a read/write operation. In FIG. 21, the light beam reflected from the deeper layer 2c is indicated by the dashed line, and the polarization converter 237 is arranged farther away from the photodetector 139 than the focal point 123 of the deeper reflected light is.

Figure 22:
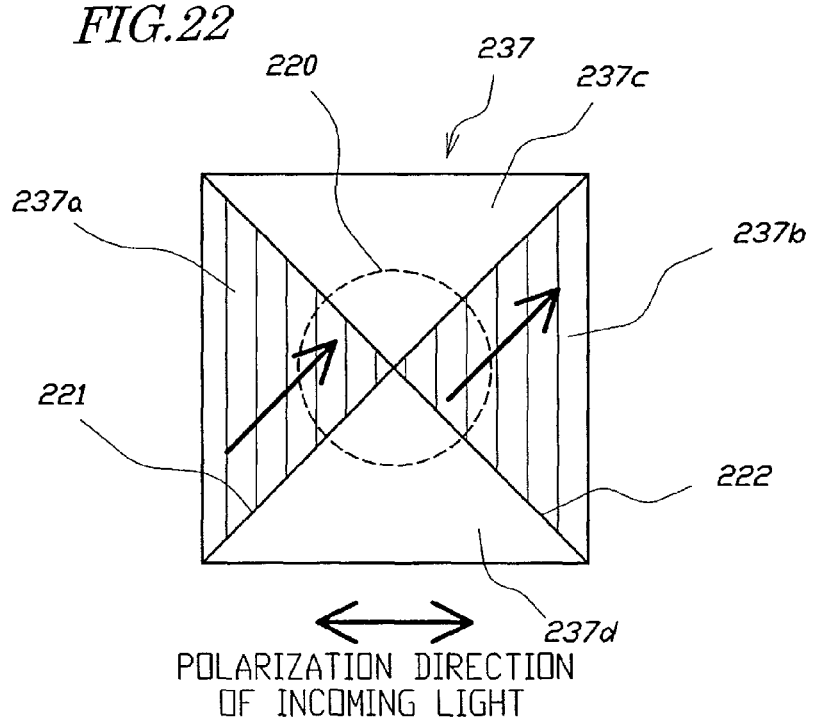
FIG. 22 shows a configuration for the polarization converter 237.

FIG. 22 shows a configuration for the polarization converter 237, which has polarization rotating areas 237a and 237b shadowed and transmitting areas 237c and 237d made of a material that transmits light. The polarization rotating areas 237a and 237b function as a half-wave plate. In FIG. 22, also shown are an incoming light beam 220 and boundaries 221 and 222 that define the areas 237a through 237d. The arrows shown in the areas 237a and 237b indicate the direction of the optic axis of the half-wave plate, which is defined so as to form an angle of 45 degrees with respect to the polarization direction of the incoming light beam.

Each pair of the areas 237a, 237d and 237b, 237c is arranged symmetrically with respect to the boundary 221.

Figure 23:
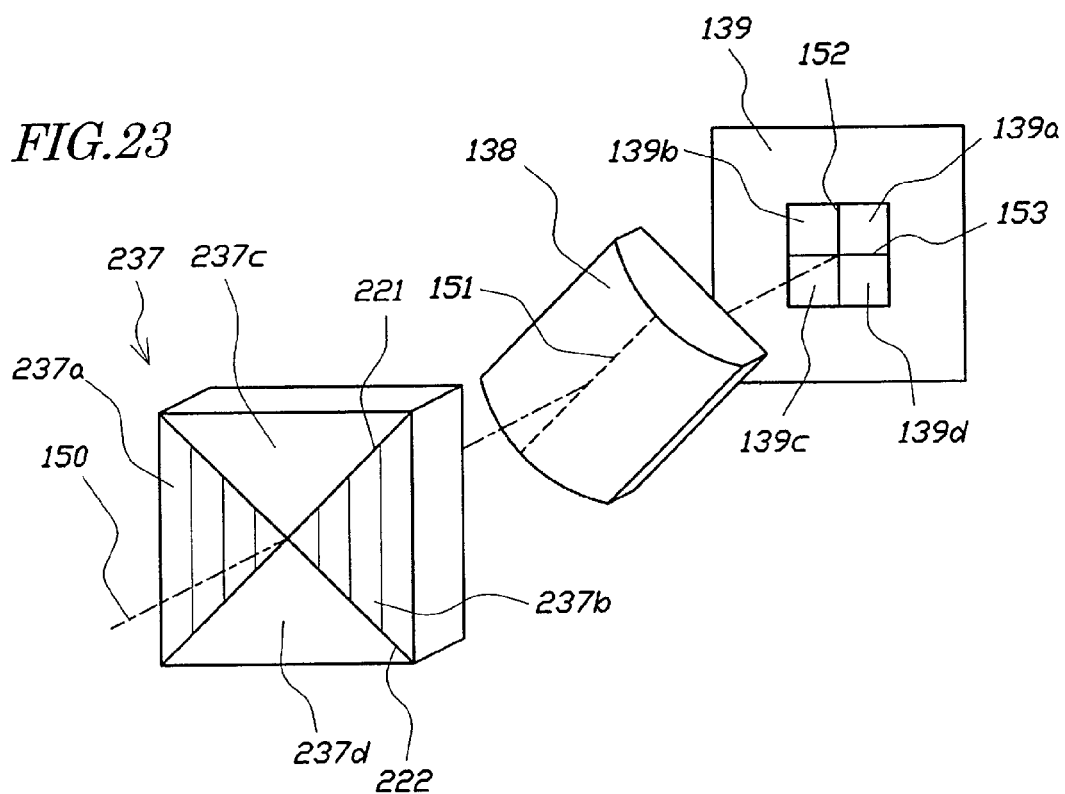
FIG. 23 is a perspective view illustrating an arrangement of the polarization converter 237, the cylindrical lens 138 and the photodetector 139.

FIG. 23 is a perspective view illustrating an arrangement of the polarization converter 237, the cylindrical lens 138 and the photodetector 139. The cylindrical lens 138 is arranged such that its generator 151 defines an angle of approximately 45 degrees with respect to one of the division lines 152 and 153 of the photodetector 139. And these members are arranged such that the boundary 221 on the polarization converter 237 and the generator 151 of the cylindrical lens 138 both run in the same direction.

Hereinafter, it will be described with reference to FIG. 21 again where the light passes when the optical head 210 with such a configuration is reading information from the multilayer optical disc 2. However, the path from the light source 3 to the optical disc 2 and the path of the light reflected from the optical disc 2 until it is reflected from the polarization beam splitter 4 are the same as those already described with reference to FIG. 17 and the description thereof will be omitted herein.

The light reflected from the optical disc 2 is reflected by the polarization beam splitter 4 to be incident on the polarization converter 237. A portion of the light that has been incident on the polarization converter 237 is transmitted through the shadowed area 237a or 237b, and has its polarization direction rotated 90 degrees. The light that has been transmitted through the polarization converter 237 is incident on the cylindrical lens 138, given astigmatism by the cylindrical lens 138 and then led to the photodetector 139, where a differential calculation is performed based on the intensities of the light received at the photodetector 139, thereby generating an FE signal by the astigmatism method and also generating a read signal as the sum signal.

Figure 24:
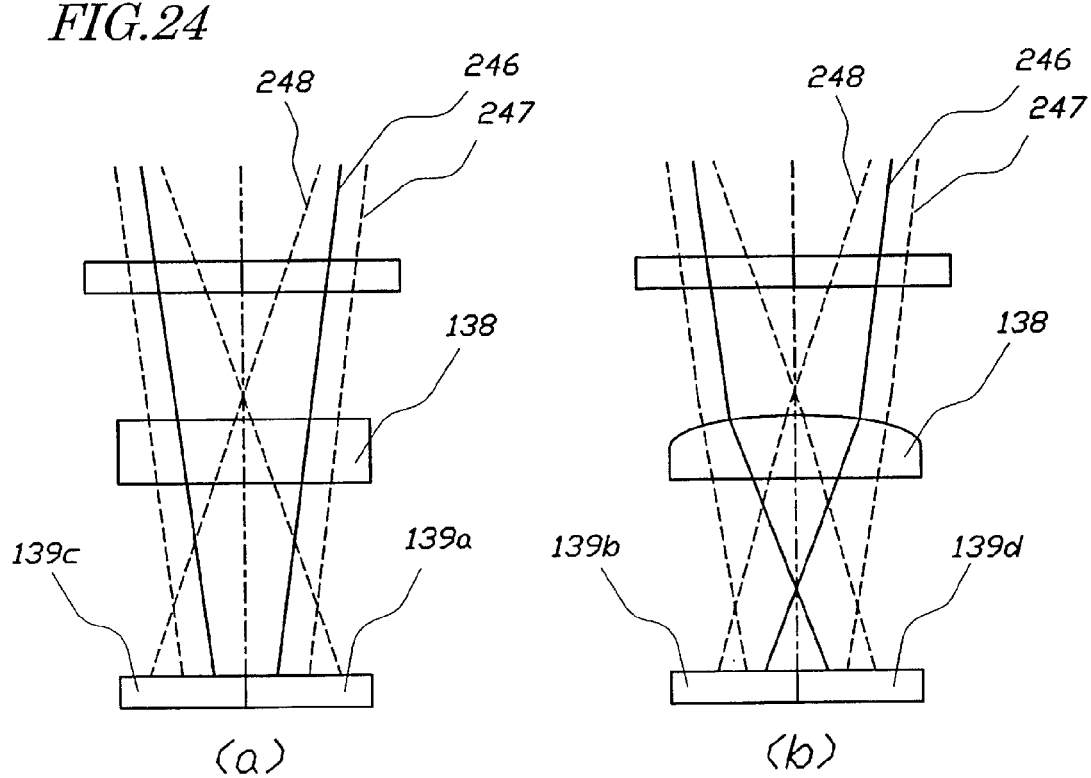
FIG. 24 shows an optical path through which the light reflected from the read layer 2a, the light reflected from the shallower layer 2b, and the light reflected from the deeper layer 2c are received at the photodetector 139.

FIG. 24 shows an optical path through which the light reflected from the read layer 2a, the light reflected from the shallower layer 2b, and the light reflected from the deeper layer 2c are received at the photodetector 139. Specifically, FIG. 24(a) shows the light reflected from the optical disc on a cross section A that includes the optical axis 150 and the generator 151 of the cylindrical lens 138. On the other hand, FIG. 24(b) shows the light reflected from the optical disc on another cross section B that also includes the optical axis 150 and that intersects with the cross section A at right angles. In FIG. 24, each member also shown in FIG. 23 is identified by the same reference numeral. FIGS. 24(a) and 24(b) show the read layer reflected light 46, the shallower layer reflected light 47 and the deeper layer reflected light 48.

Figure 25:
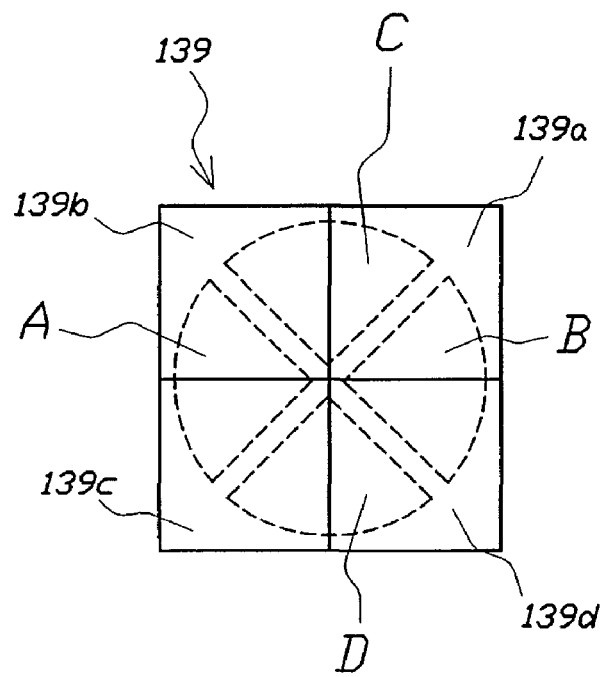
FIG. 25 illustrates the photodetector 139 that receives the light that has been transmitted through the respective areas of the polarization converter 237 and then through the cylindrical lens 138.

FIG. 25 illustrates the photodetector 139 that receives the light that has been transmitted through the respective areas of the polarization converter 237 and then through the cylindrical lens 138. The photodetector 139 is illustrated as having areas A through D, each of which is surrounded with the dashed line. More specifically, the lower left portion of the photosensitive area 139b and the upper left portion of the photosensitive area 139c will be referred to herein as the area A. The lower right portion of the photosensitive area 139a and the upper right portion of the photosensitive area 139d will be referred to herein as the area B. The upper left portion of the photosensitive area 139a and the upper right portion of the photosensitive area 139b will be referred to herein as the area C. And the lower right portion of the photosensitive area 139c and the lower left portion of the photosensitive area 139d will be referred to herein as the area D.

On both of the cross sections A and B shown in FIGS. 24(a) and 24(b), the shallower layer reflected light 247 focuses behind the photodetector 139. On the other hand, the light that has been transmitted through the area 237a of the polarization converter 237 is led to the area A of the photodetector 139. The light that has been transmitted through the area 237b is led to the area B. The light that has been transmitted through the area 237c is led to the area C. And the light that has been transmitted through the area 237d is led to the area D. As a result, the shallower layer reflected light that has had its polarization direction rotated 90 degrees is led to the areas A and B on the photodetector 139. Meanwhile, the shallower layer reflected light that has not had its polarization direction rotated is led to the areas C and D.

Also, on both of the cross sections A and B, the deeper layer reflected light 248 focuses ahead of the photodetector 139. On the other hand, the light that has been transmitted through the area 237a of the polarization converter 237 is led to the area B of the photodetector 139. The light that has been transmitted through the area 237b is led to the area A. The light that has been transmitted through the area 237c is led to the area D. And the light that has been transmitted through the area 237d is led to the area C. As a result, the deeper layer reflected light that has had its polarization direction rotated 90 degrees is led to the areas A and B on the photodetector 139. Meanwhile, the deeper layer reflected light that has not had its polarization direction rotated is led to the areas C and D.

On the other hand, the read layer reflected light 246 focuses behind the photodetector 139 on the cross section A but focuses ahead of the photodetector 139 on the cross section B. The light that has been transmitted through the area 237a of the polarization converter 237 is led to the area D of the photodetector 139. The light that has been transmitted through the area 237b is led to the area C. The light that has been transmitted through the area 237c is led to the area B. And the light that has been transmitted through the area 237d is led to the area A. As a result, the read layer reflected light that has not had its polarization direction rotated is led to the areas A and B on the photodetector 139. Meanwhile, the read layer reflected light that has had its polarization direction rotated 90 degrees is led to the areas C and D.

As can be seen from the foregoing description, in all of the areas A through D, the polarization direction of the read layer reflected light 246 is perpendicular to those of the shallower layer reflected light and the deeper layer reflected light. For that reason, the read layer reflected light 246 never interferes with the shallower layer reflected light or the deeper layer reflected light.

Consequently, no matter whether the shallower layer reflected light or the deeper layer reflected light has entered as stray light, that stray light never interferes with the read layer reflected light, and therefore, and good FE signal and read signal can be obtained according to this preferred embodiment with the generation and variation of the offset eliminated.

As described above, the optical head of the present invention eliminates the offset of the FE signal that would have been produced if the light reflected from the shallower layer and the light reflected from the deeper layer entered the photodetector and interfered with each other there when information is being read from a multilayer optical disc. As a result, the present invention provides an optical head that can perform a servo operation with good stability and that can generate a good read signal.

In addition, since the polarization converter can be arranged far away from the photodetector such that the light beam incident on the converter still has a large beam diameter, there is no need to define the positioning accuracy of the polarization converter so strictly, which is beneficial. Besides, compared to the configuration of the fourth preferred embodiment described above, the elements can be arranged more flexibly, which will make the designing process easier, too.

It should be noted that the structure of the polarization converter 237 shown in FIG. 22 is just an example. The same effect is achieved as long as the polarization converter 237 is designed such that the polarization directions of light beams passing through two areas that are symmetrical to each other with respect to the boundary 221 are perpendicular to each other and that the polarization directions of light beams passing through two areas that are symmetrical to each other with respect to the boundary 222 are also perpendicular to each other.

Figure 27:
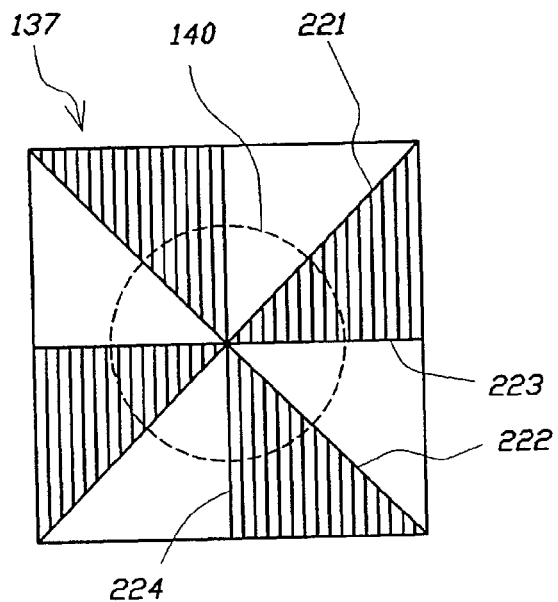
FIG. 27 illustrates another example of the polarization converter 237.

For instance, FIG. 27 illustrates another example of the polarization converter 237. In FIG. 27, when passing through a shadowed portion, the light has its polarization direction rotated. Two more folded boundaries 223 and 224, which are symmetrical with respect to the boundary 221, are newly defined. The eight areas defined by the boundaries 221 through 224 are grouped into four pairs, each of which is symmetrical to each other with respect to the boundary 221. The polarization directions of light beams transmitted through each pair of areas are perpendicular to each other, thus achieving the effect described above. These boundaries 221 through 224 are defined so as to intersect with the center (i.e., the optical axis) of the incoming light beam 140. For that reason, even if stray light is defocused to superpose on the incoming light beam 140 while keeping a relatively large beam diameter, the polarization direction conversion boundaries of the read layer reflected light (i.e., signal light) and the stray light still agree with each other.

Figure 63:
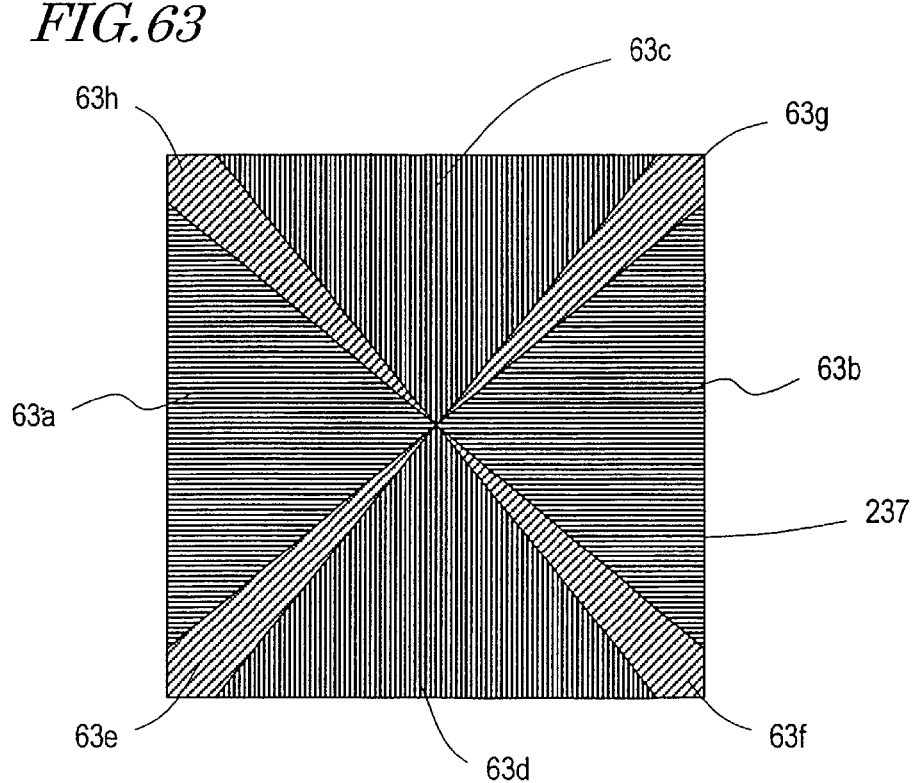
FIG. 63 illustrates still another example of a polarization converter 237 according to the fifth preferred embodiment.
Figure 64:
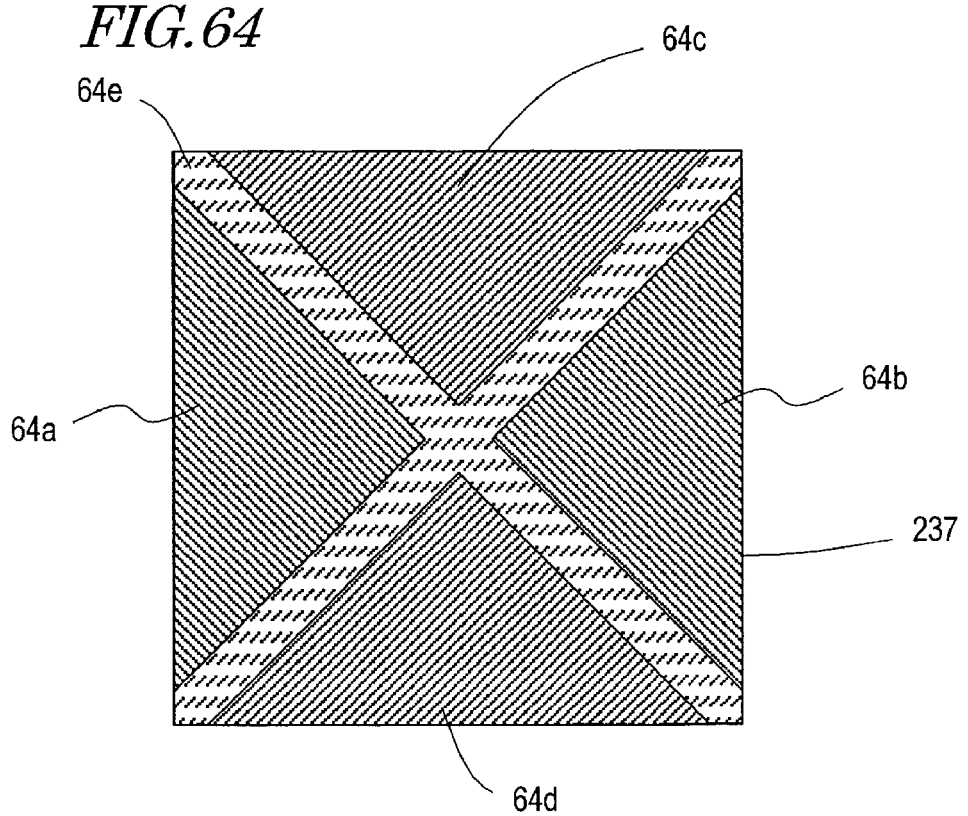
FIG. 64 illustrates yet another example of a polarization converter 237 according to the fifth preferred embodiment.

FIGS. 63 and 64 illustrate still other examples of the polarization converter 237. Specifically, the polarization converter 237 shown in FIG. 63 has areas 63a through 63h. The direction in which the multiple parallel lines are drawn in each of these areas as hatching schematically indicates the polarization direction of that area. Thus, this converter 237 is designed such that the polarization direction of the areas 63a and 63b is perpendicular to that of the areas 63c and 63d. Also, this converter 237 is designed such that the polarization directions of the areas 63e through 63h define an angle of 45 degrees with respect to that of the areas 63a and 63b or that of the areas 63c and 63d.

If two areas, which transmit light beams having polarization directions that are perpendicular to each other, were adjacent to each other, then diffraction to be produced at the boundary would have significant influence. However, by providing buffering areas such as the areas 63e through 63h shown in FIG. 63 that have polarization directions defining angles of 0 through 90 degrees with respect to the polarization directions of their adjacent areas, the influence of the diffraction to be produced at the boundary can be reduced. Considering this principle, the polarization direction of the areas 63e through 63h does not have to be one direction but may vary continuously from 0 degrees through 90 degrees.

The same statement applies to the configuration of the polarization converter 237 shown in FIG. 64 just by replacing the reference numerals 63 something, used in FIG. 63, with 64 something. For example, the area 64a corresponds to the area 63a.

Embodiment 6

The only difference between this preferred embodiment and the fifth preferred embodiment described above is that this preferred embodiment further includes a polarization selector. The other members are quite the same between these two preferred embodiments, and therefore, each member of this preferred embodiment and its counterpart of the fifth preferred embodiment are identified by the same reference numeral and the description thereof will be omitted herein.

Figure 28:
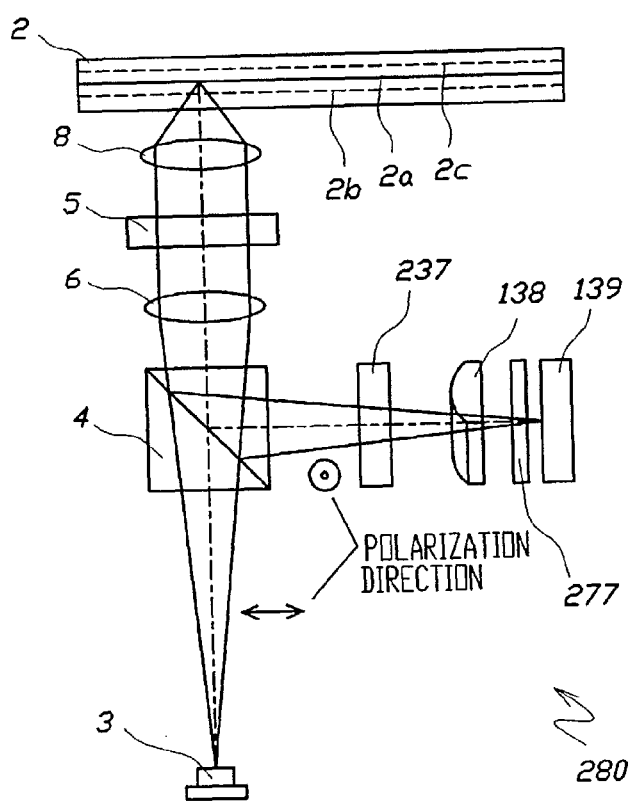
FIG. 28 illustrates an arrangement for an optical head 280 according to a sixth preferred embodiment of the present invention.

FIG. 28 illustrates an arrangement for an optical head 280 according to this preferred embodiment. This optical head is also built in an optical disc drive and used to perform a read/write operation. The optical head 280 is obtained by adding a polarization selector 277 to the optical head 170 of the fifth preferred embodiment described above (see FIG. 17). The polarization selector 277 is arranged between the cylindrical lens 138 and the photodetector 139.

Figure 29:
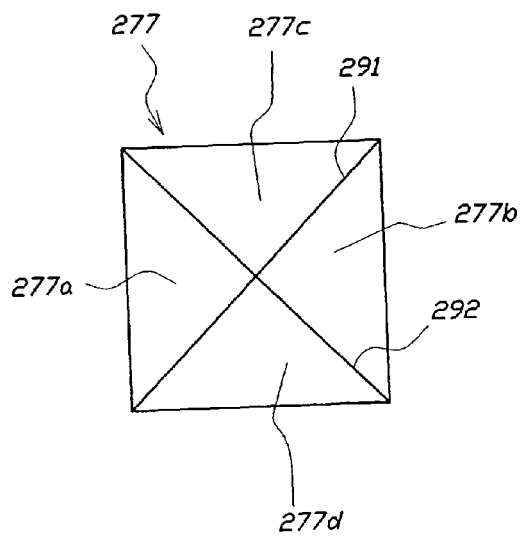
FIG. 29 shows a configuration for the polarization selector 277.

FIG. 29 shows a configuration for the polarization selector 277, which has areas 277a and 277b that transmit horizontally polarized light and areas 277c and 277d that transmit vertically polarized light. In FIG. 29, also shown are boundaries 291 and 292 that define the areas 277a through 277d.

Figure 30:
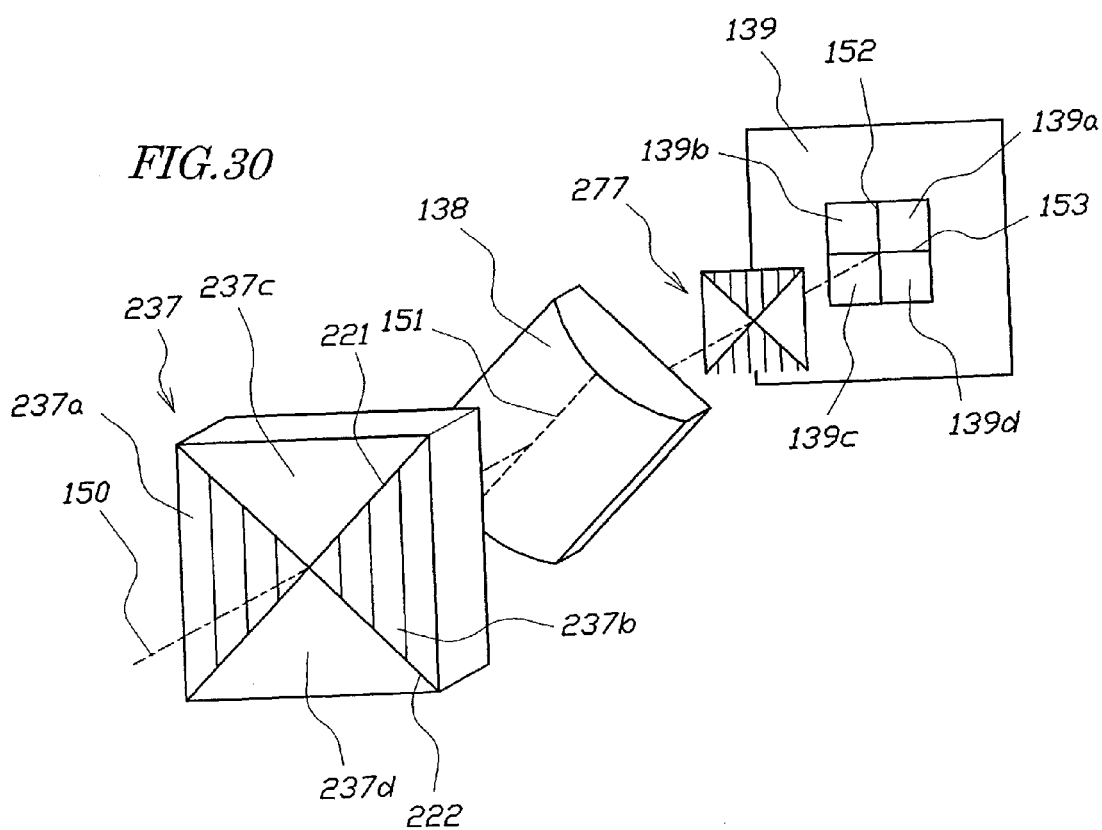
FIG. 30 is a perspective view illustrating an arrangement of the polarization converter 237, the cylindrical lens 138, the polarization selector 277, and the photodetector 139.

FIG. 30 is a perspective view illustrating an arrangement of the polarization converter 237, the cylindrical lens 138, the polarization selector 277, and the photodetector 139. The boundaries 271 and 272 of the polarization selector 277 are defined so as to extend in the same directions as the boundaries 241 and 242 of the polarization converter 237. The two shadowed areas of the polarization converter 277 are the areas 277c and 277d shown in FIG. 29.

Hereinafter, it will be described with reference to FIG. 28 again where the light passes when the optical head 280 with such a configuration is reading information from the multilayer optical disc 2. However, the path from the light source 3 to the optical disc 2 and the path of the light reflected from the optical disc 2 until it is reflected from the cylindrical lens 138 are the same as those already described with reference to FIG. 21 and the description thereof will be omitted herein.

The light that has been given astigmatism by the cylindrical lens 138 is incident on the polarization selector 277. The light that has entered the areas 277a through 277c (see FIG. 29) of the polarization selector 277 is converted by these areas into light consisting essentially of predetermined polarization components and then is led to the photodetector 139, where a differential calculation is performed based on the intensities of the light received at the photodetector 139, thereby generating an FE signal by the astigmatism method and also generating a read signal as the sum signal.

Now let us consider the light reaching the polarization selector 277. According to the description of the fifth preferred embodiment, portions of the read layer reflected light that have not had their polarization directions rotated and portions of the shallower layer reflected light and portions of the deeper layer reflected light that have had their polarization directions rotated are incident as light beams on the areas 277a and 277b of the polarization selector 277. On the other hand, portions of the read layer reflected light that have had their polarization directions rotated and portions of the shallower layer reflected light and portions of the deeper layer reflected light that have not had their polarization directions rotated are incident as light beams on the areas 277c and 277d of the polarization selector 277.

Since the light beams that have not had their polarization directions rotated are horizontally polarized light beams and the light beams that have had their polarization directions rotated are vertically polarized light beams, only the read layer reflected light is transmitted through the polarization selector 77.

According to the arrangement of this preferred embodiment, neither the shallower layer reflected light nor the deeper layer reflected light is incident as stray light on the photodetector. Thus, the offset of the FE signal can be eliminated and good FE signal and read signal can be generated. As a result, the present invention provides an optical head that can perform a servo operation with good stability and that can generate a good read signal.

An optical head according to any of the third through sixth preferred embodiments of the present invention described above can prevent the light reflected from a non-read layer from interfering with the light reflected from the read layer when information is read from a multilayer optical disc and can also prevent an offset with variation components from being produced in the FE signal or the read signal. As a result, the present invention provides an optical head that can perform a servo operation with good stability even if the gap between multiple layers of the multilayer optical disc is narrow and that can generate a good read signal.

Embodiment 7

Figure 31:
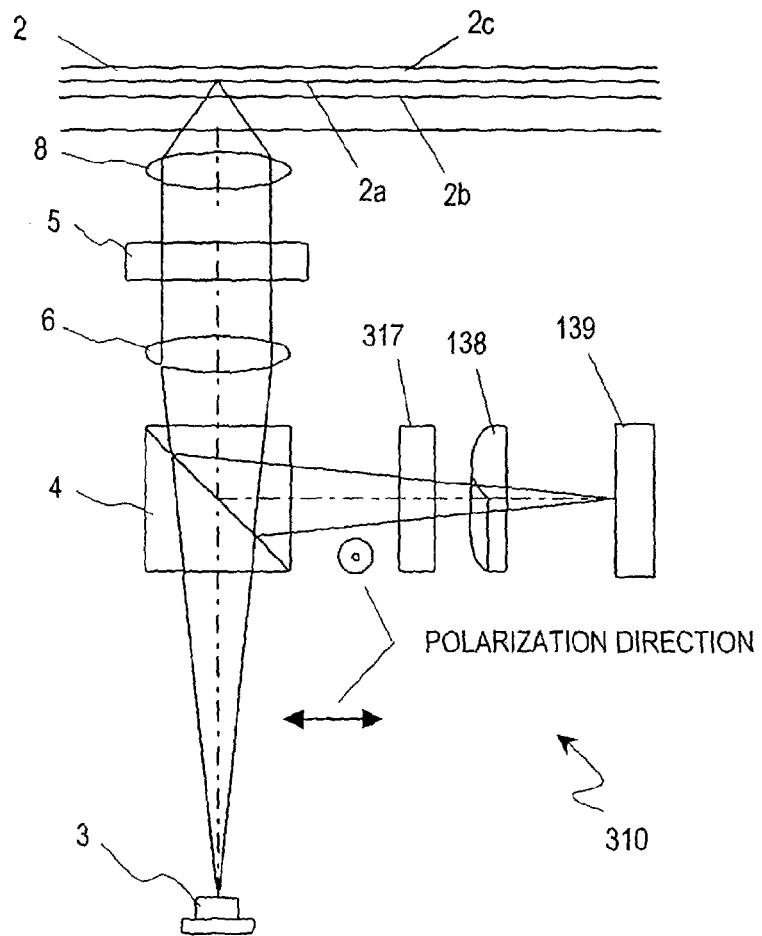
FIG. 31 illustrates an arrangement for an optical head 310 according to a seventh preferred embodiment of the present invention.

FIG. 31 illustrates an arrangement for an optical head 310 according to a seventh preferred embodiment of the present invention. This optical head is also built in an optical disc drive and used to perform a read/write operation. If any component of the optical head 310 has the same function as the counterpart of the optical head 1 shown in FIG. 1, that pair of components is identified by the same reference numeral and the description thereof will be omitted herein.

The optical head 310 includes a polarization converter 317, a cylindrical lens 138, and a quadruple photodetector 139. The polarization converter 317 rotates the polarization direction of the light being transmitted there.

Figure 32:
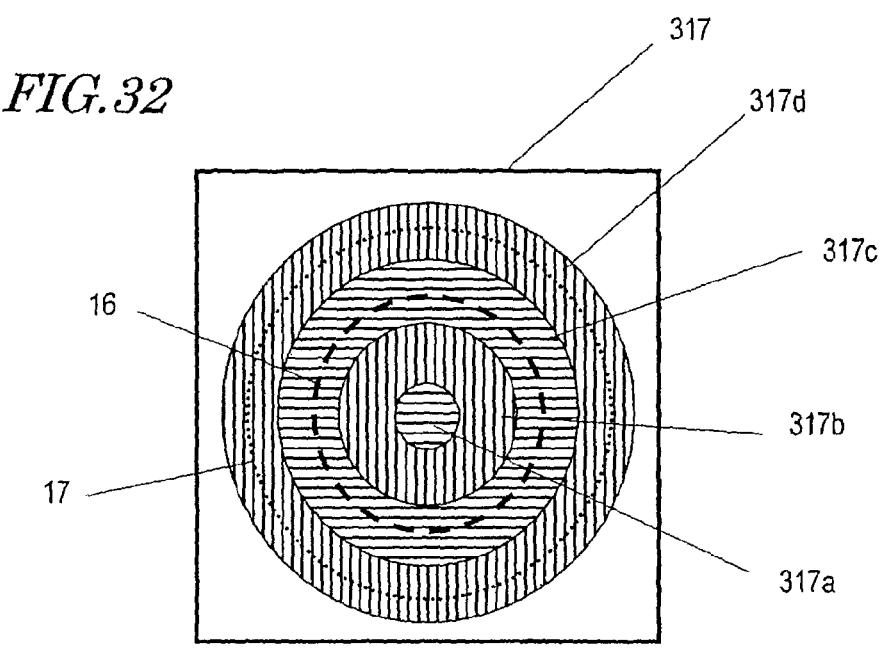
FIG. 32 shows the configuration of the polarization converter 317.

FIG. 32 shows the configuration of the polarization converter 317, which has polarization rotating areas 317a through 317d functioning as a half-wave plate. In FIG. 32, the beam spot 16 of the light reflected from the read layer 2a and the beam spot 17 of the light reflected from the shallower layer 2b are shown. These areas 317a, 317b, 317c and 317d are arranged such that the optic axes of two adjacent ones of these areas define an angle of 45 degrees between them. Supposing the optic axis of the area 317a is horizontal, for example, the optic axis of the area 317b is ±45 degrees, the optic axis of the area 317c is horizontal or vertical, and the optic axis of the area 317d is ±45 degrees.

The arrangement of the polarization converter 317, the cylindrical lens 138 and the photodetector 139 is similar to that shown in FIG. 23, for example. That is to say, the polarization converter 317 may be arranged instead of the polarization converter 237 shown in FIG. 23.

Figure 33:
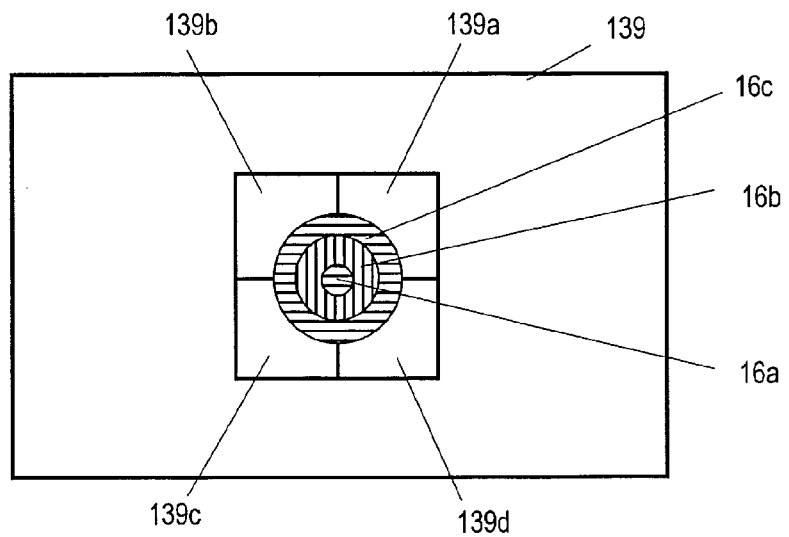
FIG. 33 illustrates where the beam spot 16 of the light reflected from the read layer 2a is formed on the photodetector 139.

FIG. 33 illustrates where the beam spot 16 of the light reflected from the read layer 2a is formed on the photodetector 139. The division line 13 on the photodetector 139 is drawn in the direction in which the information track runs on the optical disc 2. The division line 14 crosses the division line 13 at right angles. Also, the cylindrical lens 138 is arranged such that its generator 151 (see FIG. 23) defines an angle of approximately 45 degrees with respect to one of the division lines 13 and 14. Furthermore, the boundaries on the polarization converter 317 are arranged concentrically with respect to the center of the beam spot of the light reflected from the optical disc 2.

A calculator (not shown) for generating an FE signal generates the FE signal by calculating FE=(139a+139c)−(139b+139d). The calculator may be a differential calculator connected to the photosensitive areas 511a through 511d shown in FIG. 57, for example. On the other hand, a calculator (not shown) for generating a read signal generates the read signal by calculating RF=139a+139b+139c+139d. It should be noted that the reference numerals 139a, 139d and so on used in these equations denote the signals representing the intensities of the light that has been received at the photosensitive areas 139a, 139d, etc. Furthermore, a calculator (not shown, either) for generating a tracking error signal generates the tracking error signal based on a light beam that has been produced by splitting the light reflected from the optical disc with a hologram element (not shown), for example, inserted into the optical path of the reflected light.

Hereinafter, it will be described where the light passes when the optical head 310 with such a configuration is reading information from the multilayer optical disc 2. However, the path from the light source 3 to the optical disc 2 and the path of the light reflected from the optical disc 2 until it is reflected from the polarization beam splitter 4 are the same as those already described with reference to FIG. 17 and the description thereof will be omitted herein.

As shown in FIG. 31, the light reflected from the optical disc 2 is further reflected from the polarization beam splitter 4 to be incident on the polarization converter 317. Supposing the polarization direction of the light that is going to enter the polarization converter 317 is the horizontal direction on the paper, the polarization direction of the light transmitted through the areas 317a and 317c shown in FIG. 32 does not change. On the other hand, the polarization direction of the light transmitted through the areas 317b and 317d rotates 90 degrees to change into the direction perpendicular to the paper (i.e., the direction coming out of the paper).

Then, the light beam, a part of which has had its polarization direction rotated by the polarization converter 317, is given astigmatism by the cylindrical lens 138 and then led to the photodetector 139, where a differential calculation is performed based on the intensities of the light received, thereby generating an FE signal by the astigmatism method and also generating a read signal as the sum signal.

In this case, not only the light reflected from the read layer 2a but also the light reflected from the shallower layers 2b and 2c are both incident on the photodetector 139 through the same optical path. As a result, these light beams superpose one upon the other in the photosensitive areas.

FIG. 33, which has already been referred to, illustrates the beam spot shape of the light reflected from the read layer 2a and incident on the photodetector 139. The beam spot of the light reflected from the read layer 2a is indicated by the dashed circle 16 in FIG. 32. As shown in FIG. 33, the beam spot 16 of the reflected light on the photodetector 139 includes horizontally polarized light beams 16a and 16c (which are polarized in the direction in which the photosensitive areas 139a and 139b are arranged) and a vertically polarized light beam 16b (which is polarized in the direction in which the photosensitive areas 139a and 139d are arranged).

Figure 34:
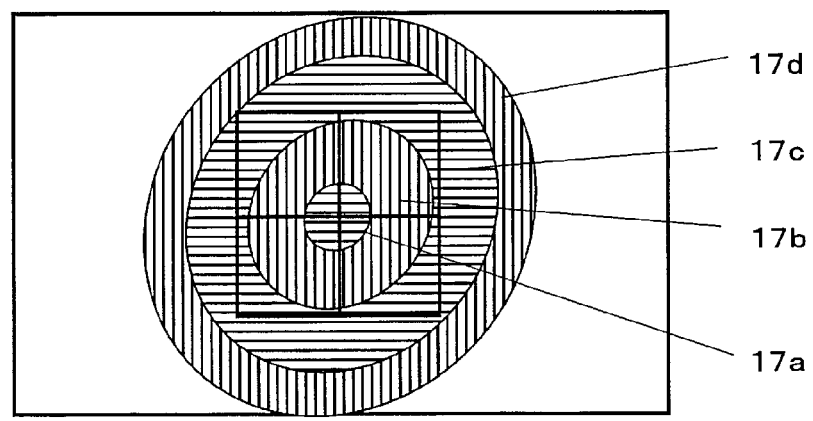
FIG. 34 illustrates the beam spot shape of the light reflected from the layer 2b, which is shallower than the read layer 2a, on the photodetector 139.

FIG. 34 illustrates the beam spot shape of the light reflected from the layer 2b, which is shallower than the read layer 2a, on the photodetector 139. The light reflected from the shallower layer 2b is indicated by the dotted circle 17 in FIG. 32. As shown in FIG. 34, the beam spot of the reflected light 16 on the photodetector 139 includes the horizontally polarized light beams 17a and 17c and the vertically polarized light beams 17b and 17d.

Figure 35:
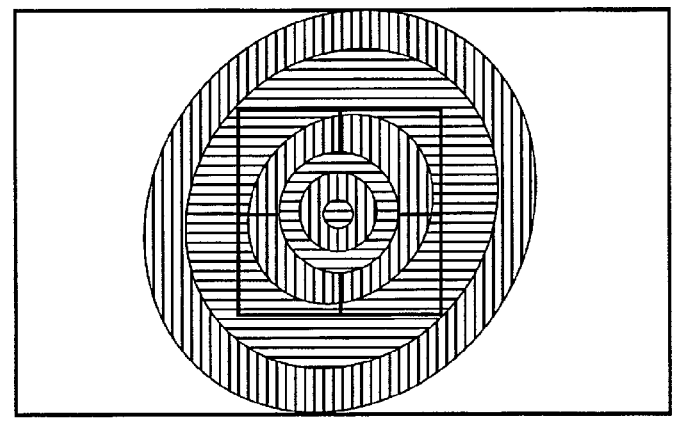
FIG. 35 illustrates a state where the beam spots of the reflected light beams 16 and 17 are superposed one upon the other.

FIG. 35 illustrates a state where the beam spots of the reflected light beams 16 and 17 are superposed one upon the other. The area pattern of the polarization converter 317 is defined such that the beam spots of the polarized light beams 16a, 16b and 17a are superposed one upon the other and that the beam spots of the polarized light beams 16c and 17b are superposed one upon the other.

Since the polarization direction of the light beams 16b and 16c reflected from the read layer 2a is perpendicular to that of the light reflected from the layer 2b that is shallower than the read layer 2a, no interference is produced anymore. That is to say, as the interference is produced in much smaller areas, good signals can be obtained with the intensity of the RF signal reduced and with the generation and variation of the offset in the FE signal cut down.

As described above, the optical head of this preferred embodiment would eliminate the production of interference even if the light reflected from the shallower layer 2b entered the photodetector when information is being read from a multilayer optical disc. As a result, the present invention provides an optical head that can perform a servo operation with good stability using an FE signal with little variation in offset and that can generate an even better read signal as an RF signal with little variation in light intensity.

In the preferred embodiment described above, the polarization converter 317 is supposed to be divided into the four areas 317a through 317d. However, the converter 317 may be divided into any other arbitrary number of areas. The numbers may be changed according to the layer-to-layer distance of the disc or the optical zoom power of the optical head.

Figure 36:
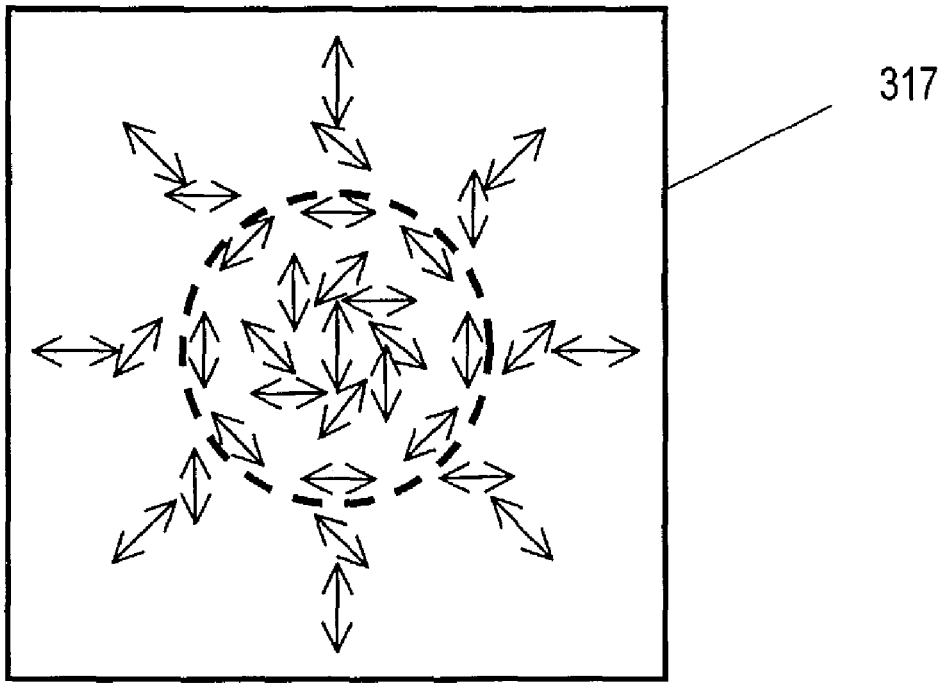
FIG. 36 illustrates another example of the polarization converter 317.

FIG. 36 illustrates another example of the polarization converter 317. In FIG. 36, the arrows indicate the polarization directions of light that have been transmitted through the polarization converter and the dashed circle indicates the beam spot of the light 16 reflected from the read layer 2a described above. As indicated by the arrows in FIG. 36, the polarization converter 317 may have such an optical property as changing its polarization directions from the center toward the outer periphery thereof following a predetermined rule.

Figure 37:
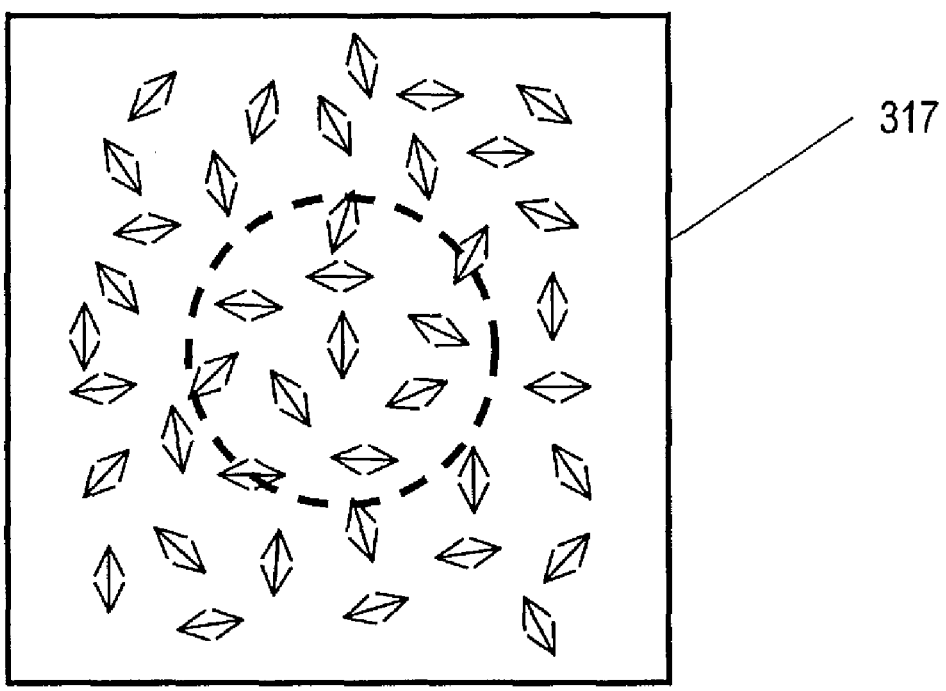
FIG. 37 illustrates still another example of the polarization converter 317.

FIG. 37 illustrates still another example of the polarization converter 317. The arrows and the dashed circle have the same meanings as their counterparts shown in FIG. 36. However, contrary to the example shown in FIG. 36, the polarization converter 317 may have such an optical property as changing its optic axes irregularly.

Figure 65:
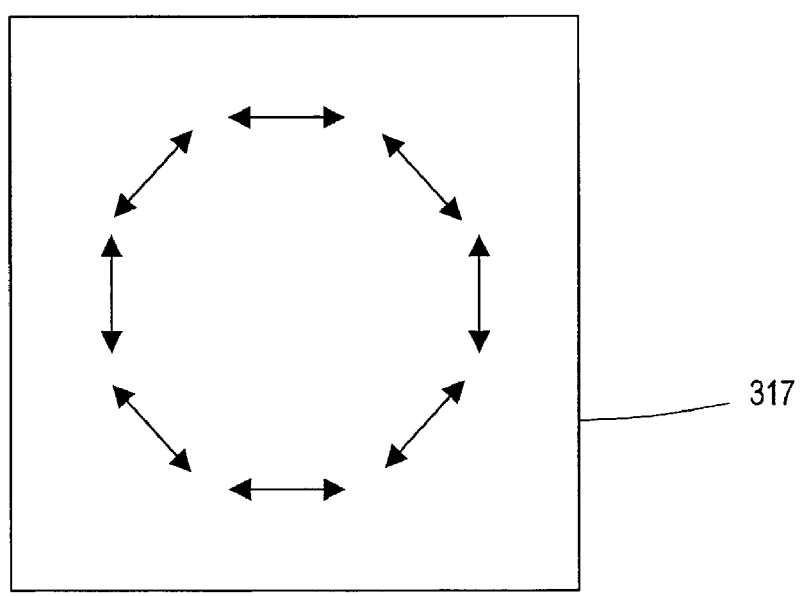
FIG. 65 illustrates still another example of a polarization converter 317 according to the seventh preferred embodiment.
Figure 66:
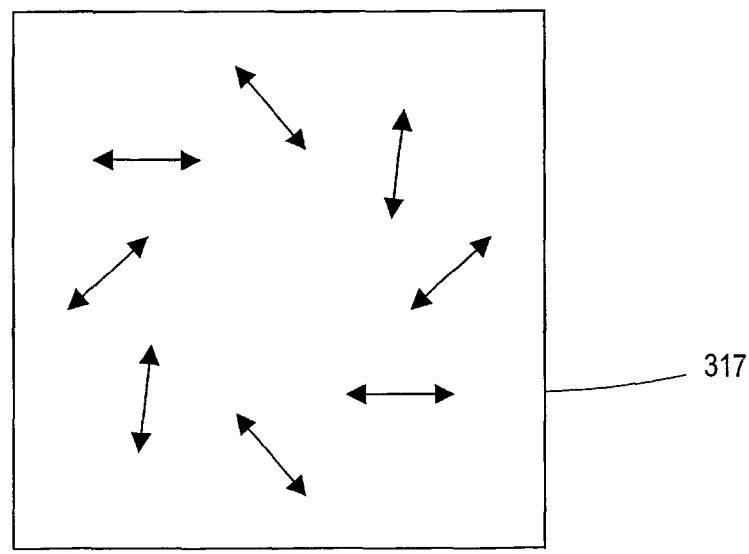
FIG. 66 illustrates yet another example of a polarization converter 317 according to the seventh preferred embodiment.

FIGS. 65 and 66 illustrate still other examples of the polarization converter 317. In these two drawings, the arrows also indicate the polarization directions of the polarization converter 317.

Unlike the polarization converter 317 shown in FIG. 36, the polarization converter 317 shown in FIG. 65 does not change its polarization directions according to the radial location of the point of incidence of the incoming reflected light. In other words, in the radial direction of the beam spot of the reflected light, there is no boundary on which the polarization directions change.

On the other hand, the polarization converter 317 shown in FIG. 65 changes its polarization directions on a 45 degree basis around the optical axis of the reflected light. In FIG. 65, if astigmatism is given from the lower left corner (which is supposed to be a −135 degree direction) toward the upper right corner (which is supposed to be a +45 degree direction), then the polarization direction in the areas in the ±90 degree direction is perpendicular to that in the areas in the 0 degree and 180 degree directions, provided that all of these directions are defined with respect to the center of the polarization converter 317. And in the areas interposed between those areas (i.e., in the areas adjacent to those areas), the polarization direction also has an intermediate value (e.g., an intermediate value of 45 degrees in FIG. 65). The same statement applies to the polarization converter 317 shown in FIG. 66, too. That is to say, the polarization directions of two adjacent areas change on a 45 degree basis around the optical axis of the reflected light.

In the polarization converters 317 shown in FIGS. 65 and 66, however, the polarization direction in each of those adjacent areas is not always a single direction. Optionally, the polarization directions may change continuously in the tangential direction along the outer circumference of the beam spot of the reflected light.

Embodiment 8

The only difference between this preferred embodiment and the seventh preferred embodiment described above is that this preferred embodiment includes an interference suppressor instead of the polarization converter. The other members are quite the same between these two preferred embodiments, and therefore, each member of this preferred embodiment and its counterpart of the seventh preferred embodiment are identified by the same reference numeral and the description thereof will be omitted herein.

Figure 38:
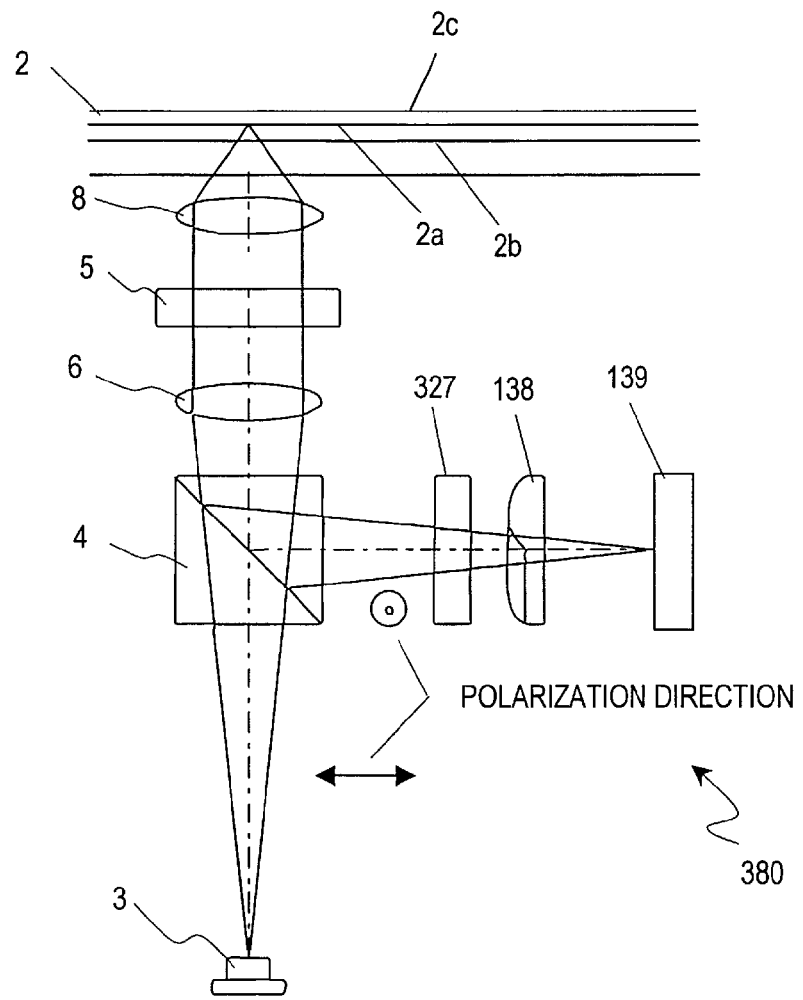
FIG. 38 illustrates an arrangement for an optical head 380 according to an eighth preferred embodiment of the present invention.

FIG. 38 illustrates an arrangement for an optical head 380 according to this preferred embodiment. This optical head is also built in an optical disc drive and used to perform a read/write operation. The optical head 380 includes an interference suppressor 327, which is different from the polarization converter 317 of the optical head 310 shown in FIG. 31.

Figure 39:
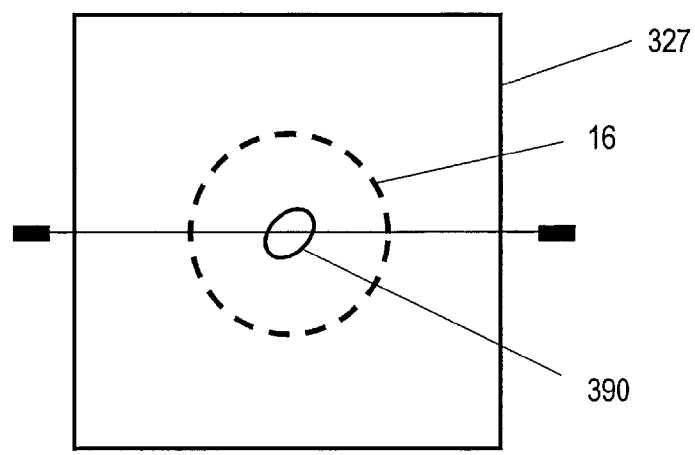
FIG. 39 is a top view illustrating the configuration of an interference suppressor 327 according to the eighth preferred embodiment.
Figure 40:
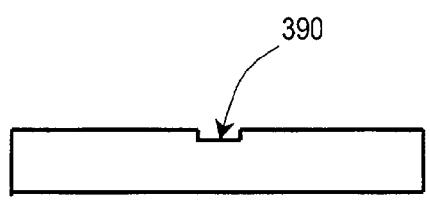
FIG. 40 is a cross-sectional view of the interference suppressor 327.

FIG. 39 is a top view illustrating the configuration of an interference suppressor 327 according to this preferred embodiment. The interference suppressor 327 includes a level difference portion 390 to change the optical path lengths. FIG. 40 is a cross-sectional view of the interference suppressor 327. The level difference portion 390 has been formed as a physical recess. As shown in FIG. 39, the size of the level difference portion 390 is smaller than the beam spot size of the light 16 reflected from the read layer 2a as indicated by the dashed circle.

Figure 41:
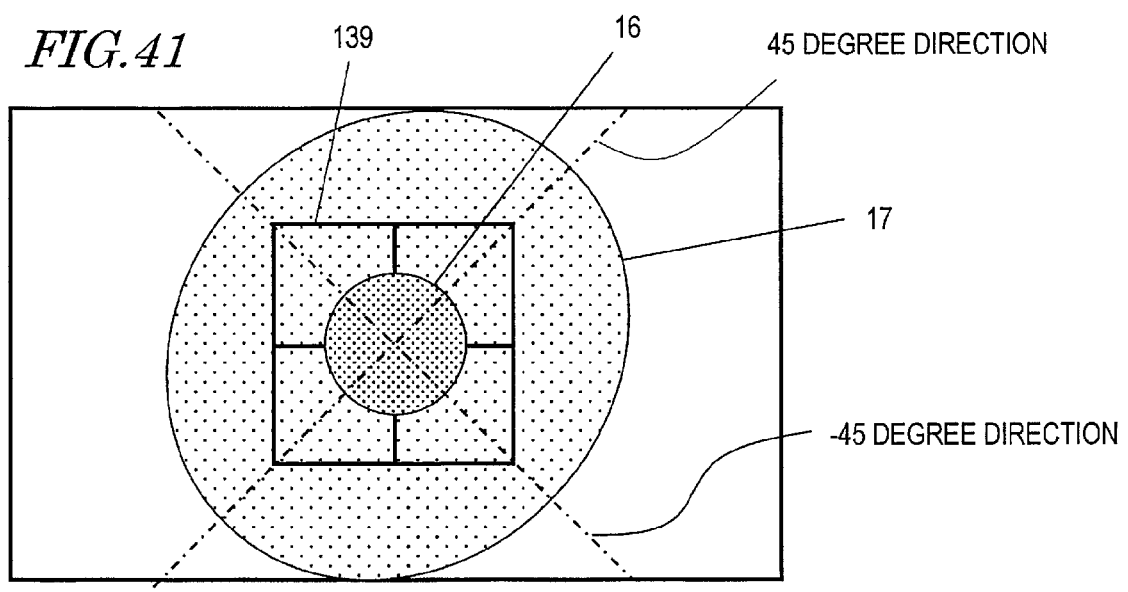
FIG. 41 illustrates the beam spot shape of the light 16 reflected from the read layer 2a and that of the light 17 reflected from the layer 2b, shallower than the read layer, on the photodetector 139.

FIG. 41 illustrates the beam spot shape of the light 16 reflected from the read layer 2a and that of the light 17 reflected from the layer 2b, shallower than the read layer, on the photodetector 139.

Figure 42:
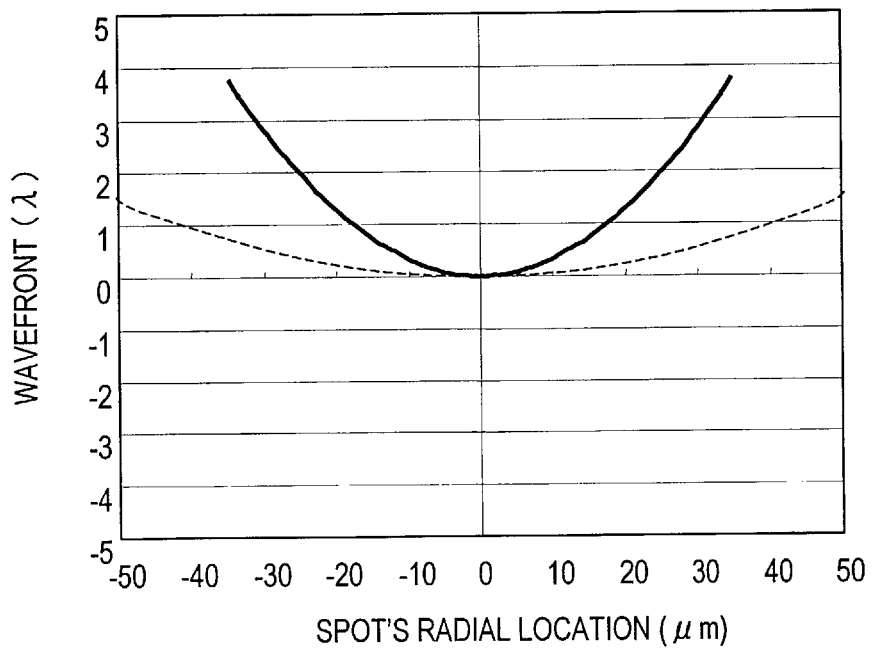
FIG. 42 shows the wavefront of a spot that was detected without using the interference suppressor 327.
Figure 43:
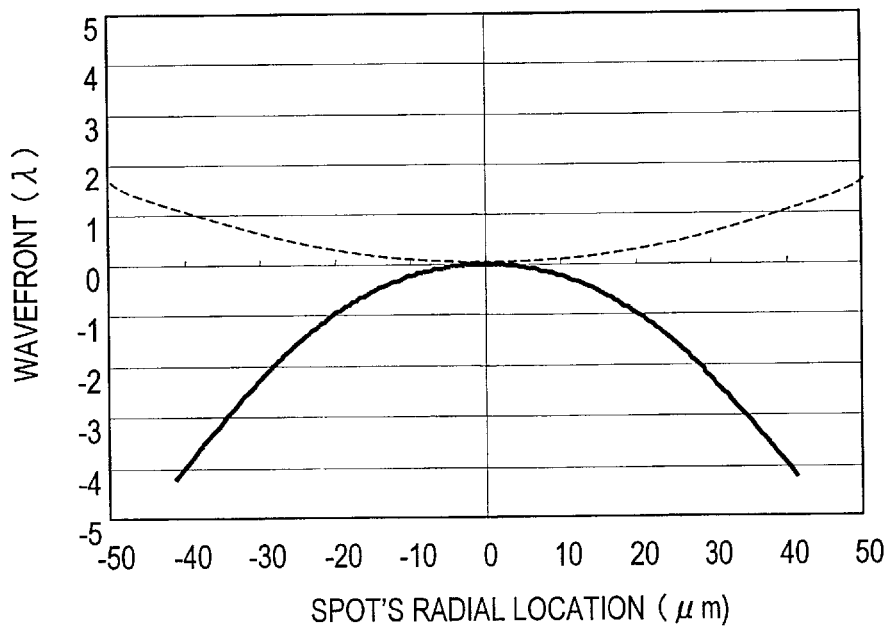
FIG. 43 shows the wavefront of a spot that was detected without using the interference suppressor 327.

FIGS. 42 and 43 show the wavefronts of spots that were detected without using the interference suppressor 327.

Figure 44:
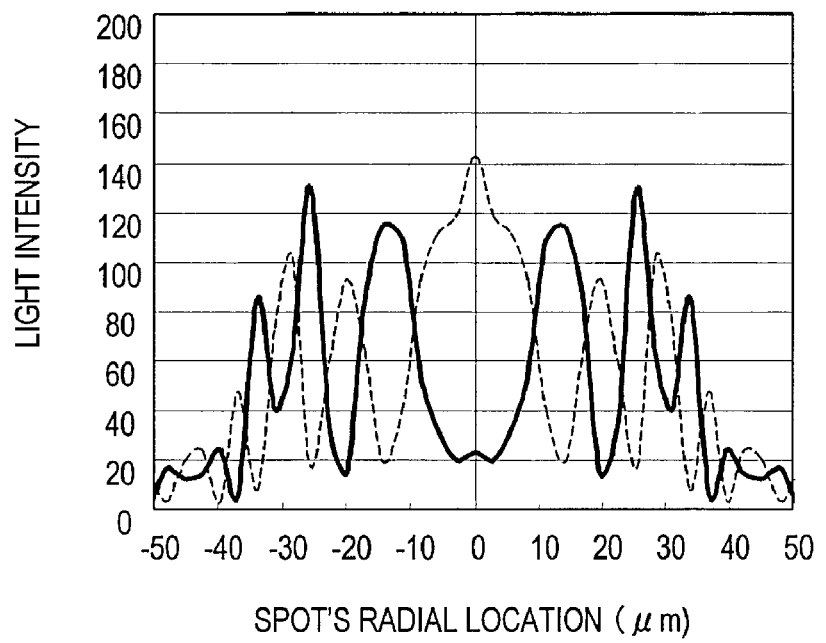
FIG. 44 shows a light intensity distribution on the photodetector 139 in a situation where the interference suppressor 327 was not used.
Figure 45:
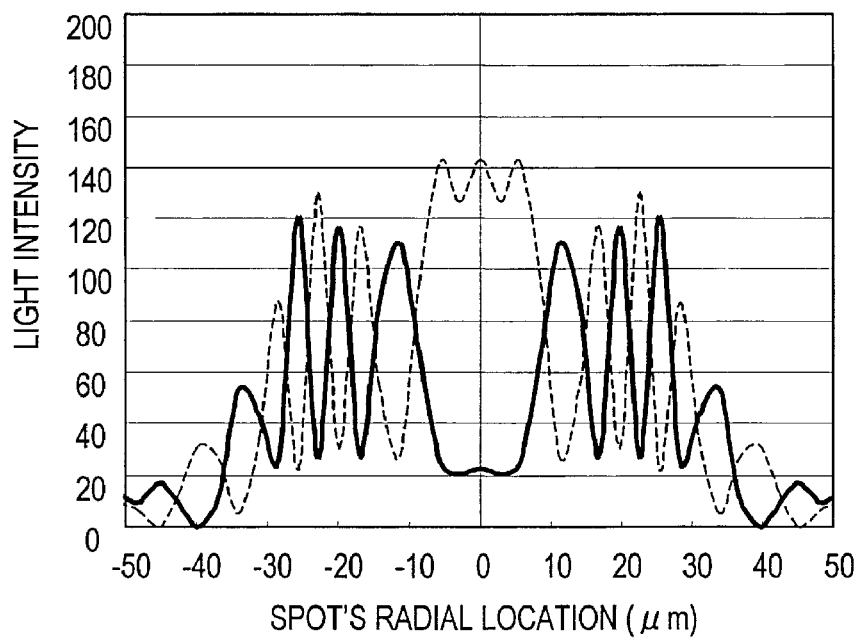
FIG. 45 shows a light intensity distribution on the photodetector 139 in a situation where the interference suppressor 327 was not used.

FIGS. 44 and 45 show light intensity distributions on the photodetector 139 in a situation where the interference suppressor 327 was not used.

Figure 46:
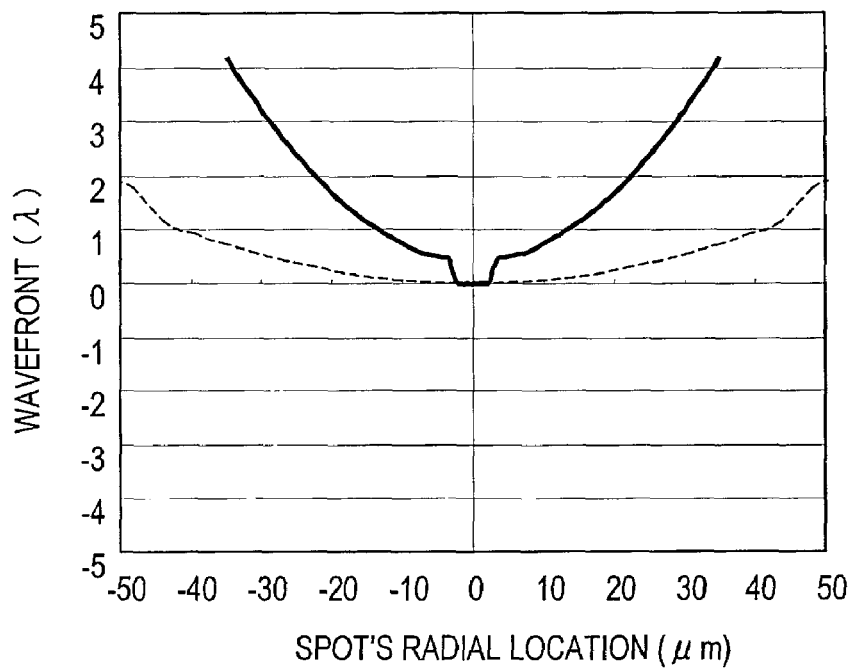
FIG. 46 shows the wavefront of a spot that was detected using the interference suppressor 327 of the eighth preferred embodiment.
Figure 47:
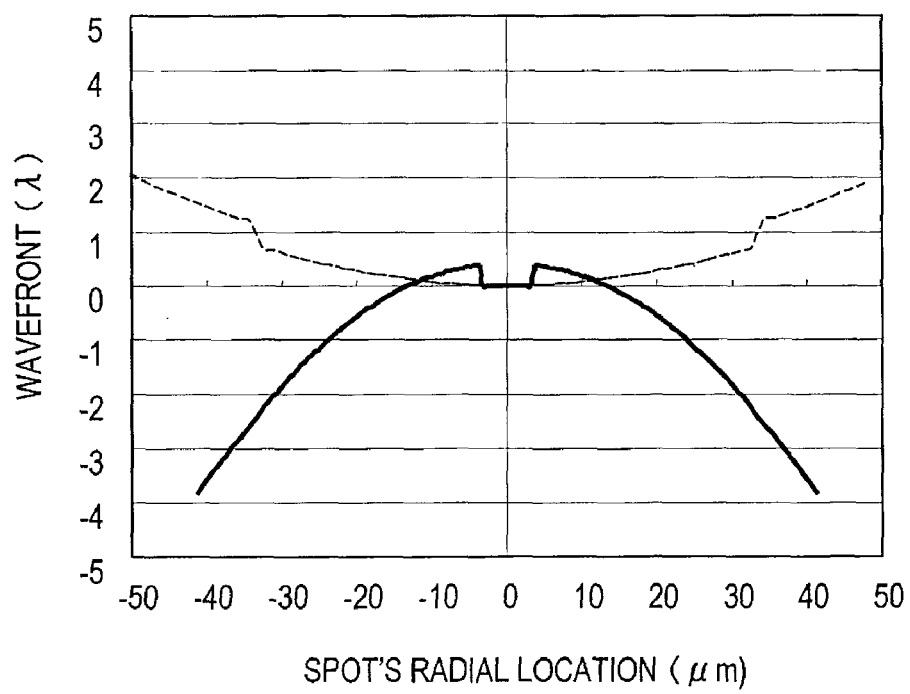
FIG. 47 shows the wavefront of another spot that was detected using the interference suppressor 327 of the eighth preferred embodiment.

FIGS. 46 and 47 show the wavefronts of spots that were detected using the interference suppressor 327 of this preferred embodiment.

Figure 48:
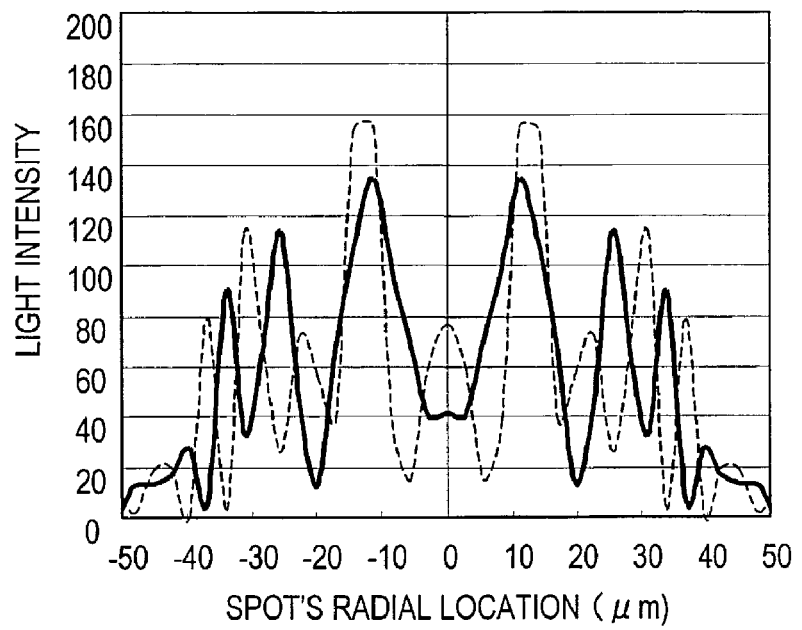
FIG. 48 shows a light intensity distribution on the photodetector 139 in a situation where the interference suppressor 327 of the eighth preferred embodiment was used.
Figure 49:
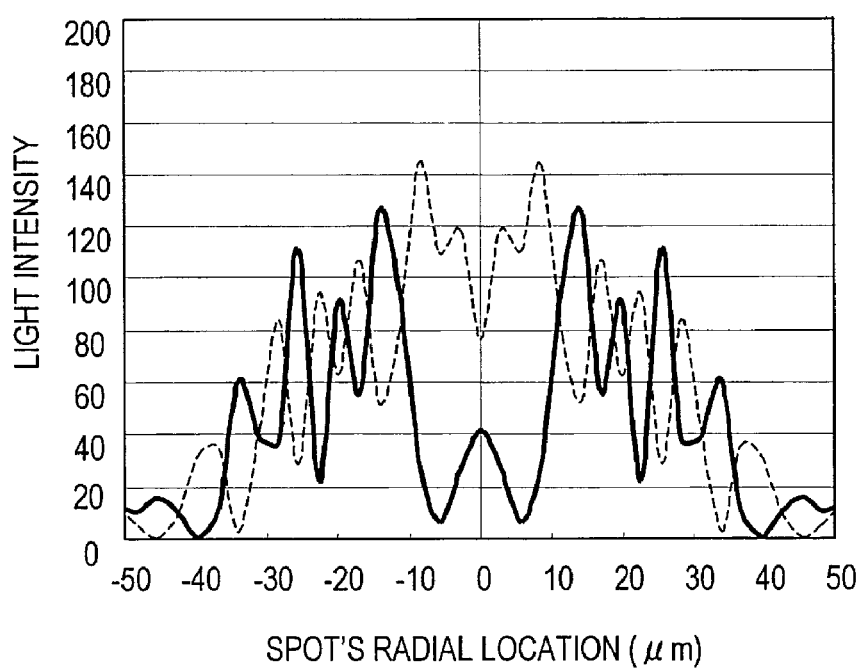
FIG. 49 shows a light intensity distribution on the photodetector 139 in a situation where the interference suppressor 327 of the eighth preferred embodiment was used.

FIGS. 48 and 49 show light intensity distributions on the photodetector 139 in a situation where the interference suppressor 327 of this preferred embodiment was used.

First of all, it will be described with reference to the accompanying drawings how the interference problem arises unless the interference suppressor 327 is used.

The light 16 reflected from the read layer 2a and the light 17 reflected from the layer 2b that is shallower than the read layer are transmitted through the cylindrical lens 138 shown in FIG. 38 and then incident on the photodetector 139, thereby leaving detected spots 16 and 17 as shown in FIG. 41. In this case, the wavefronts of the detected spots in the 45 degree direction and in the −45 degree direction on the photodetector 139 have shapes such as those shown in FIGS. 42 and 43. Since these two wavefronts are superposed one upon the other to form a single detected spot on the photodetector 139, the light intensity distributions on the photodetector 139 will be as shown in FIGS. 44 and 45.

In this case, the maximum and minimum curves shown in FIGS. 44 and 45 are light intensity distributions representing integral values of light intensities that are detected by the photodetector 139 and that vary with the layer-to-layer distance between the read layer 2a and the shallower layer 2b. Supposing one side of each photosensitive area of the photodetector 139 has a length of 100 μm, the difference between the integral value of the curve representing the maximum value and that of the curve representing the minimum value in FIGS. 44 and 45 is the variation in the intensity of the light received. That is to say, that is the variation of an RF signal as the read signal. On the other hand, the difference between the integral value of the curve representing the maximum value in FIG. 44 and that of the curve representing the maximum value in FIG. 45 is focus offset (1) when the intensity of the light received at the photodetector 139 is the maximum. Also, the difference between the integral value of the curve representing the minimum value in FIG. 44 and that of the curve representing the minimum value in FIG. 45 is focus offset (2) when the intensity of the light received at the photodetector 139 is the minimum. And the difference between these offsets (1) and (2) is the variation in focus offset caused by the rotation of the disc, for example.

By using the interference suppressor 327 of this preferred embodiment, the difference between the maximum and minimum values of such a light intensity distribution can be narrowed and the variation in light intensity due to the interference can be reduced.

The interference suppressor 327 of this preferred embodiment may be provided as a white phase difference plate. As shown in FIGS. 39 and 40, the interference suppressor 327 has an elliptical level difference portion 390, which is tilted in the same direction as the generator of the cylindrical lens 138, around the center of the beam spot of the light 16 reflected from the read layer.

For example, supposing the beam spot of the reflected light 16 on the interference suppressor 327 has a diameter of 1.2 mm, the elliptical level difference portion 390 may have a minor axis size of 60 µm, a major axis size of 120 µm and a level difference of 0.3 µm.

The properties of the reflected light that has been transmitted through such an interference suppressor 327 will be described. First, the wavefront of the light 16 reflected from the read layer 2*a* and that of the light 17 reflected from the shallower layer 2*b* on the photodetector 139 will be described. In the 45 degree direction and the −45 degree direction shown in FIG. 41, the reflected light beams 16 and 17 have wavefronts such as those shown in FIGS. 46 and 47. The curves having a level difference on the wavefront in the vicinity of a spot radial location of zero in FIGS. 46 and 47 represent the wavefront of the reflected light 16. As can be seen from FIGS. 46 and 47, by shifting the wavefront at the center portion to be seriously affected by interference, the effect of reducing the variation in intensity distribution was achieved after the interference has been produced.

FIGS. 48 and 49 show the intensity distributions of the light received at the photodetector 139 in a situation where the interference suppressor 327 was used. It can be seen that compared to FIGS. 44 and 45 representing light intensity distributions in a situation where the interference suppressor 327 was not used, the difference in light intensity around the center between when the intensity of light detected at the photodetector 139 was maximum and when that of light detected at the photodetector 139 was minimum decreased. As a result, the difference between the maximum and minimum intensities of light detected at the photodetector 139 decreases. In addition, by cutting the level difference portion 390 in an elliptical shape, it is possible to minimize the variation in light intensity due to a difference in interference pattern caused by a difference in wavefront between the 45 degree and −45 degree directions on the photodetector 139. To achieve this effect, the ellipticity preferably falls within the range of 1:5 to 4:5.

Since the variation in light intensity can be reduced after the interference has been produced, good signals can be obtained with the intensity of the RF signal reduced and with the generation and variation of the offset in the FE signal cut down.

As described above, even if the light reflected from the shallower layer 2*b* entered the photodetector when information is being read from a multilayer optical disc, the optical head of this preferred embodiment could prevent the reflected light from interfering with the light reflected from the read layer 2*a*. As a result, the present invention provides an optical head that can perform a servo operation with good stability using an FE signal with little variation in offset and that can generate an even better read signal as an RF signal with little variation in light intensity.

Figure 50:
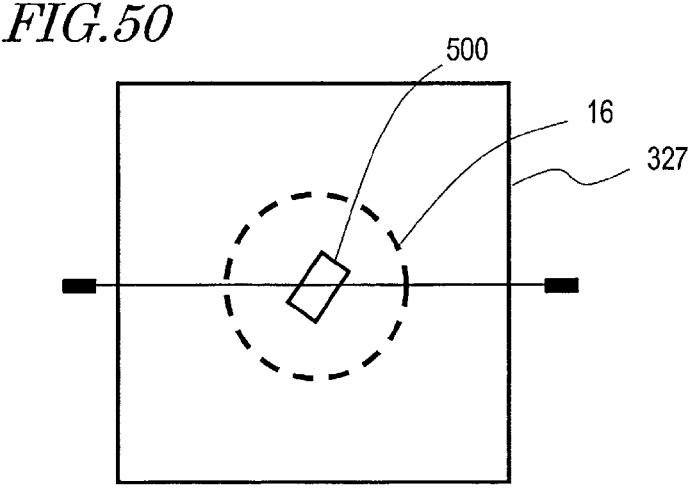
FIG. 50 is a top view illustrating the structure of an interference suppressor 327 with a rectangular level difference portion 500.
Figure 51:
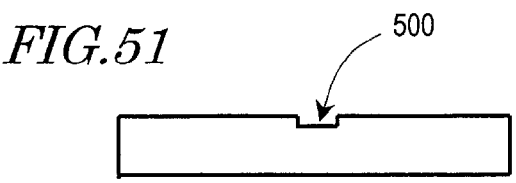
FIG. 51 is a cross-sectional view of the interference suppressor 327 with such a rectangular level difference portion 500.
Figure 52:
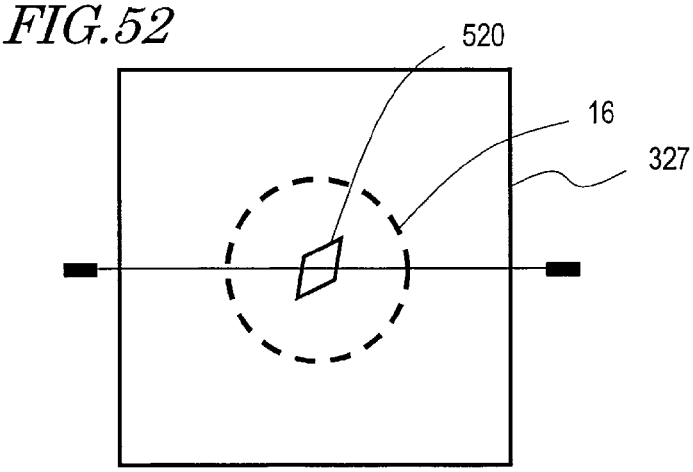
FIG. 52 is a top view illustrating the structure of an interference suppressor 327 with a diamond level difference portion 520.
Figure 53:
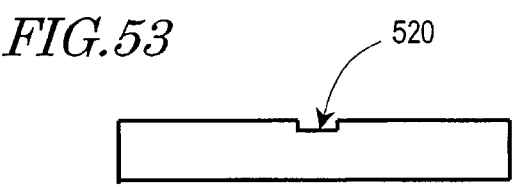
FIG. 53 is a cross-sectional view of the interference suppressor 327 with such a diamond level difference portion 520.

It should be noted that the elliptical level difference portion of the interference suppressor 327 of this preferred embodiment could have its sizes adjusted flexibly according to its depth. Also, in the preferred embodiment described above, the interference suppressor 327 is supposed to have an elliptical level difference portion. However, the same effect would be achieved even by providing a rectangular level difference portion 500 as shown in FIGS. 50 and 51 or a diamond level difference portion 520 as shown in FIGS. 52 and 53. The relative sizes of the rectangular level difference portion 500 with respect to the beam spot size of the light 16 reflected from the read layer 2*a* and those of the diamond level difference portion 520 with respect to the beam spot size of the light 16 reflected from the read layer 2*a* are as shown in FIGS. 50 and 52, respectively.

Embodiment 9

As already described with reference to FIGS. 33 through 35, if the polarization converter 317 of the seventh preferred embodiment is used, the polarization direction of the light 16 reflected from the read layer 2*a* is perpendicular to that of the light 17 reflected from the shallower layer 2*b* except the area around the center, thus producing no interference. Around the center, however, those two light beams have the same polarization direction, and therefore, will produce interference, thus possibly causing some variation in light intensity at the photodetector 139.

To overcome such a problem, an optical head according to a ninth preferred embodiment of the present invention minimizes such a variation in light intensity by combining the features of the seventh and eighth preferred embodiments described above. The only difference between this preferred embodiment and the seventh preferred embodiment described above lies in the structure of the interference suppressor. The other members are quite the same between these two preferred embodiments, and therefore, each member of this preferred embodiment and its counterpart of the seventh preferred embodiment are identified by the same reference numeral and the description thereof will be omitted herein.

Figure 54:
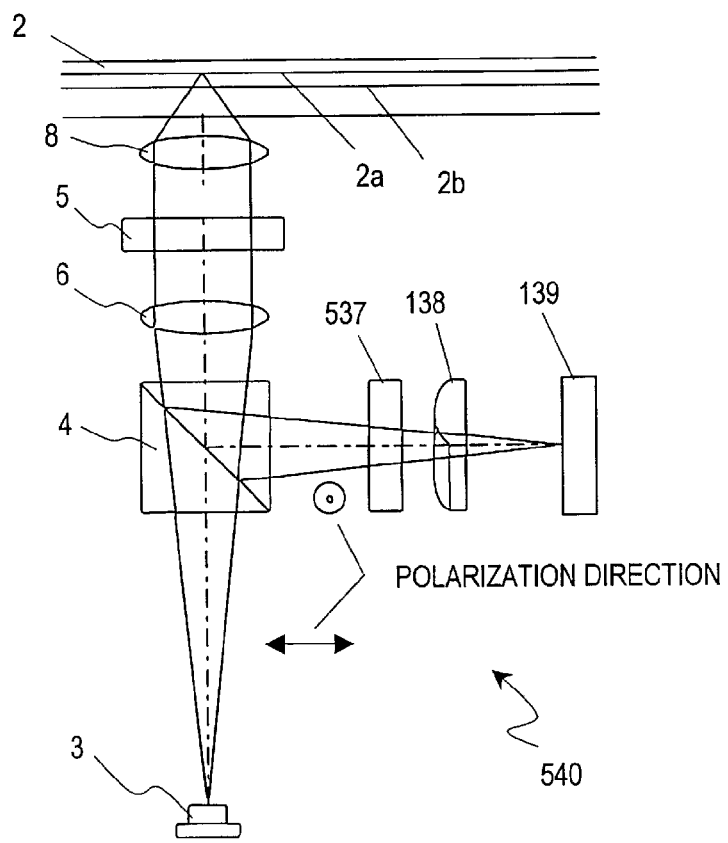
FIG. 54 illustrates an arrangement for an optical head 540 according to a ninth preferred embodiment of the present invention.

FIG. 54 illustrates an arrangement for an optical head 540 according to this preferred embodiment. This optical head is also built in an optical disc drive and used to perform a read/write operation. The optical head 540 includes an interference suppressor 537, which is different from the polarization converter 317 of the optical head 310 shown in FIG. 31.

Figure 55:
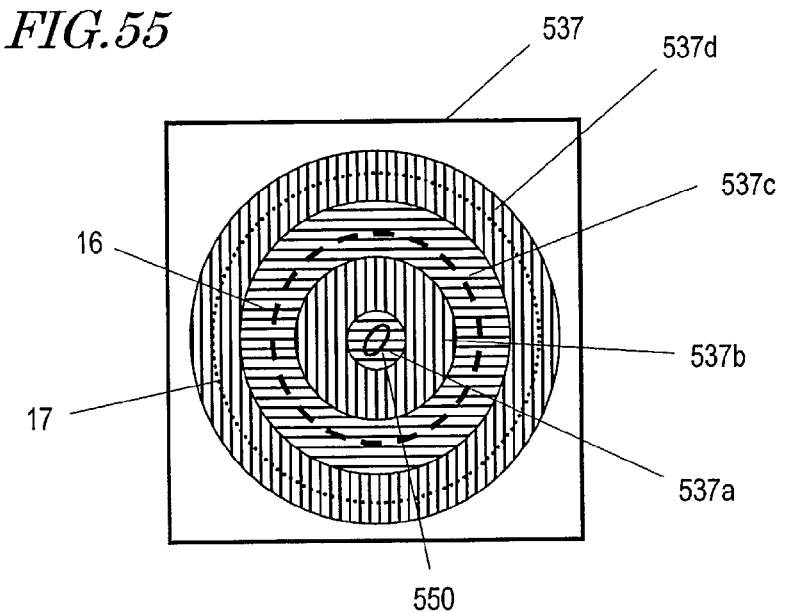
FIG. 55 illustrates the structure of the interference suppressor 537 of the ninth preferred embodiment.

FIG. 55 illustrates the structure of the interference suppressor 537 of this preferred embodiment. The interference suppressor 537 has an elliptical level difference portion 550, which is tilted in the same direction as the generator of the cylindrical lens 138, around the center of the polarization converter 317 of the seventh preferred embodiment. The cross section of the interference suppressor 537 is the same as that shown in FIG. 40.

According to this preferred embodiment, by getting a phase difference in wavefront (that has already been described for the eighth preferred embodiment) caused by the level difference portion 550, the variation in light intensity that would have been caused due to the interference can be reduced around the center. As a result, good signals can be obtained with the intensity of the RF signal reduced and with the generation and variation of the offset in the FE signal cut down.

As described above, the optical head of this preferred embodiment would eliminate the production of interference even if the light reflected from the shallower layer 2*b* entered the photodetector when information is being read from a multilayer optical disc. As a result, the present invention provides an optical head that can perform a servo operation with good stability using an FE signal with little variation in offset and that can generate an even better read signal as an RF signal with little variation in light intensity.

It should be noted that the interference suppressor 537 of this preferred embodiment could be formed by arbitrarily combining the structures that have already been described for the seventh and eighth preferred embodiments and would achieve the same effect.

An optical head according to any of the seventh through ninth preferred embodiments of the present invention described above can prevent the light reflected from a non-read layer from interfering with the light reflected from the read layer when information is read from a multilayer optical disc and can also prevent an offset with variation components from being produced in the FE signal or the read signal. As a result, the present invention provides an optical head that can perform a servo operation with good stability and can generate a good read signal even if the gap between multiple layers of the multilayer optical disc is narrow.

Embodiment 10

Figure 56:
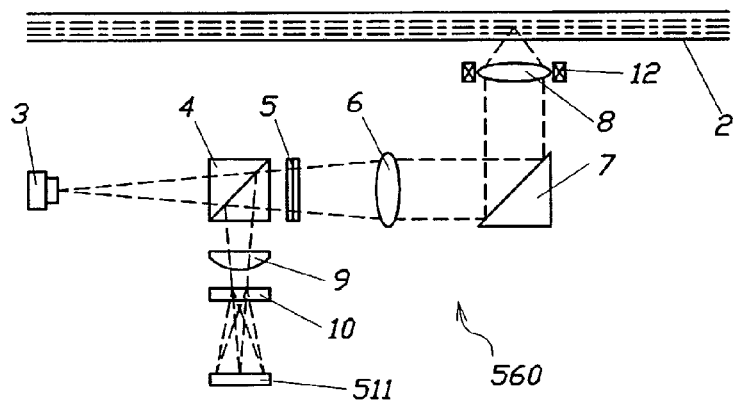
FIG. 56 illustrates an arrangement for an optical head 560 according to a tenth preferred embodiment of the present invention.

FIG. 56 illustrates an arrangement for an optical head 560 according to a tenth preferred embodiment of the present invention. This optical head is also built in an optical disc drive and used to perform a read/write operation. If any component of the optical head 560 has the same function as the counterpart of the optical head 1 shown in FIG. 1, that pair of components is identified by the same reference numeral and the description thereof will be omitted herein.

The optical head 560 of this preferred embodiment includes a photodetector 511, which has a plurality of photosensitive areas.

Figure 57:
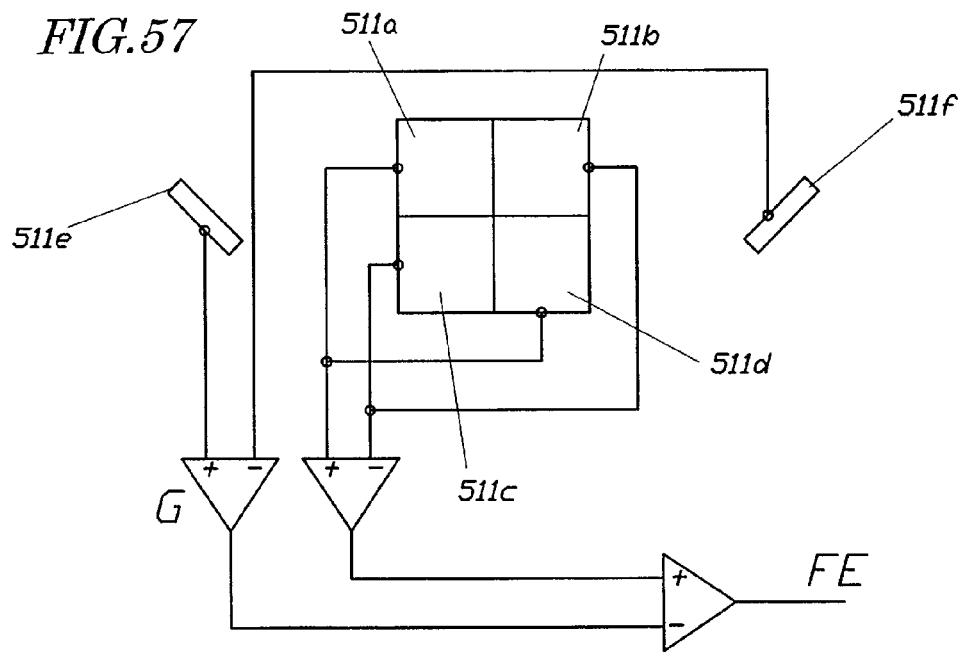
FIG. 57 illustrates a configuration for a photodetector 511.

FIG. 57 illustrates a configuration for the photodetector 511. By drawing two division lines that cross each other at right angles as boundaries at the point of incidence of the zero-order light that has been transmitted through the diffraction element 10, quadruple photosensitive areas 511a through 511d are defined. On the other hand, at the points of incidence of the ±first-order diffracted light beams that have come from the diffraction element 10, rectangular photosensitive areas 511e and 511f are defined so as to form angles of ±45 degrees with respect to the division lines between the photosensitive areas 511a through 511d. And the photodetector 511 is connected to a calculator that figures out an FE signal by:

$$FE=(511a+511d)-(511b+511c)-G(511e-511f)$$

where G is a coefficient.

The sizes of the photosensitive areas 511e and 511f are defined so as to be smaller than the beam spot size of the ±first-order diffracted light and to receive the light beam at the center of the ±first-order diffracted light as will be described later more fully with reference to FIG. 58.

To reduce the influence of bright and dark light distribution that would have been produced due to the interference of light beams reflected from multiple storage layers while an FE signal is generated by the normal astigmatism method, the signals obtained from the photosensitive areas 511e and 511f are used as additional signals to figure out the signal according to this preferred embodiment.

Hereinafter, it will be described where the light passes when the optical head 560 with such a configuration is reading information from the multilayer optical disc 2. However, the path from the light source 3 to the optical disc 2, the path of the light reflected from the optical disc 2 until it is reflected from the polarization beam splitter 4 and the path leading to the diffraction element 10 after that are the same as those already described with reference to FIG. 1 and the description thereof will be omitted herein.

As shown in FIG. 56, the light that has entered the diffraction element 10 is split by the diffraction element 10 into zero-order and ±first-order light beams, which will be received at their respective photosensitive areas on the photodetector 511.

In this case, not just the light reflected from the read layer of the optical disc 2 but also light reflected from a non-read layer thereof are incident on the photosensitive areas on the photodetector 511 through the same path. That is why the beam spot of the received light will have bright and dark light distribution due to the interference.

Figure 58:
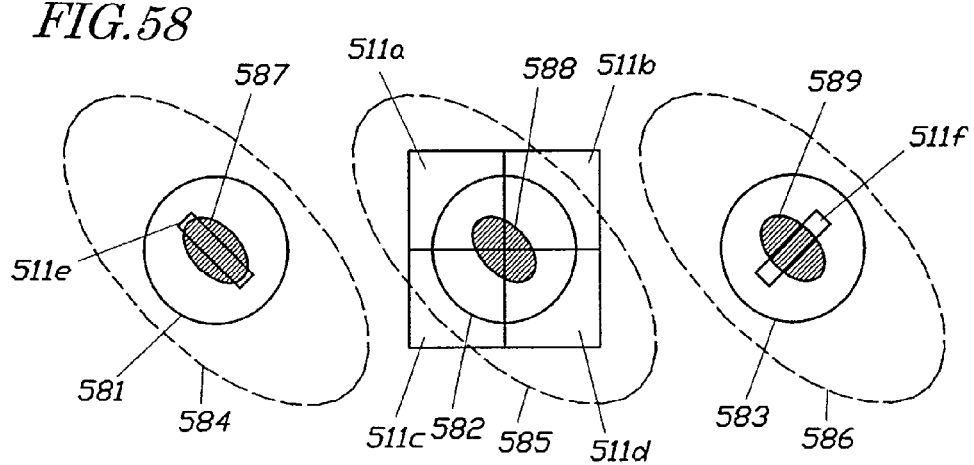
FIG. 58 illustrates where beam spots of the received light are formed on the photosensitive areas on the photodetector 511.

FIG. 58 illustrates where beam spots of the received light are formed on the photosensitive areas on the photodetector 511. The light reflected from the read layer forms beam spots 581, 582 and 583. On the other hand, the light reflected from the non-read layer forms beam spots 584, 585 and 586. Each reflected light has been split by the diffraction element 10 into the three light beams, consisting of the zero-order light beam and the ±first-order light beams, thus forming those three light beam spots.

As the light reflected from the read layer and the light reflected from the non-read layer interfere with each other, bright and dark patterns 587, 588 and 589, having increasing or decreasing light intensities, appear.

Since the focal point of the light reflected from the non-read layer has shifted by the gap between the read layer and itself, the beam spots 584, 585 and 586 of the light reflected from the non-read layer come to have an elliptical shape that is elongated in the 45 degree direction, so do the bright and dark patterns 587, 588 and 589 that have been produced by the interference.

Also, both the light reflected from the read layer and the light reflected from the non-read layer have little phase variation at the center of the light beam (i.e., around the optical axis thereof). That is why each of the bright and dark patterns is produced by the interference in a relatively broad area around the center of the light beam. On the outer periphery of the light beam, on the other hand, an interference pattern with a relatively narrow interval is produced due to the interference. However, since the interference is substantially averaged, its influence is limited.

If the light is split into three light beams as is done in this preferred embodiment, the brightness and darkness of the bright and dark patterns 587, 588 and 589 are determined by the layer-to-layer interval between the read layer and the non-read layer. That is why the brightness and darkness of the bright and dark patterns 587, 588 and 589 agree with each other.

If an FE signal to be calculated as:

$$FE=(511a+511d)-(511b+511c)$$

by the normal astigmatism method were applied to the beam spots with such bright and dark light distributions, then the bright and dark pattern 588 would be left a lot in the areas 511a and 511d. As a result, brightness and darkness produced by the interference would be left as an offset.

On the other hand, in this preferred embodiment, the photosensitive areas 511e and 511f have their shapes and arrangements adjusted so as to detect the bright and dark patterns 587 and 589 to appear at the center of the ±first-order diffracted light. More specifically, the planar area A of the bright and dark pattern 587 to be detected in the photosensitive area 511e substantially corresponds to the total planar area B of the bright and dark pattern 588 on the photosensitive areas 511a and 511d. Also, the planar area C of the bright and dark pattern 589 to be detected in the photosensitive area 511*f* substantially corresponds to the total planar area D of the bright and dark pattern 588 on the photosensitive areas 511*b* and 511*c*. These planar areas A through D satisfy the equation A:B=C:D. That is why the difference between the signals detected in the photosensitive areas 511*e* and 511*f* corresponds to the offset described above.

For that reason, an FE signal to be affected less by the offset that has been produced by the interference can be figured out by the following equation.

$$FE=(511a+511d)-(511b+511c)-G(511e-511f)$$

By getting the objective lens 8 moved perpendicularly to the optical disc 2 (i.e., along the optical axis) by the actuator 12 according to the level and polarity of this FE signal, a focus servo control can be performed so as to get the light emitted from the semiconductor laser 3 converged on the target storage layer.

In this manner, the optical head of the present invention can reduce not only the offset that would have been produced in the FE signal if the light reflected from the non-read layer entered the photodetector and interfered with the light reflected from the read-layer when a read operation is performed on a multilayer optical disc but also a variation in that offset.

In the preferred embodiment described above, the two light beams that have been split by the diffraction grating 10 are detected and used to correct the offset produced by the interference. However, as only the center portion of each light beam need to be used, a diffraction grating that splits only the light beam corresponding to the center portion may be provided.

Figure 59:
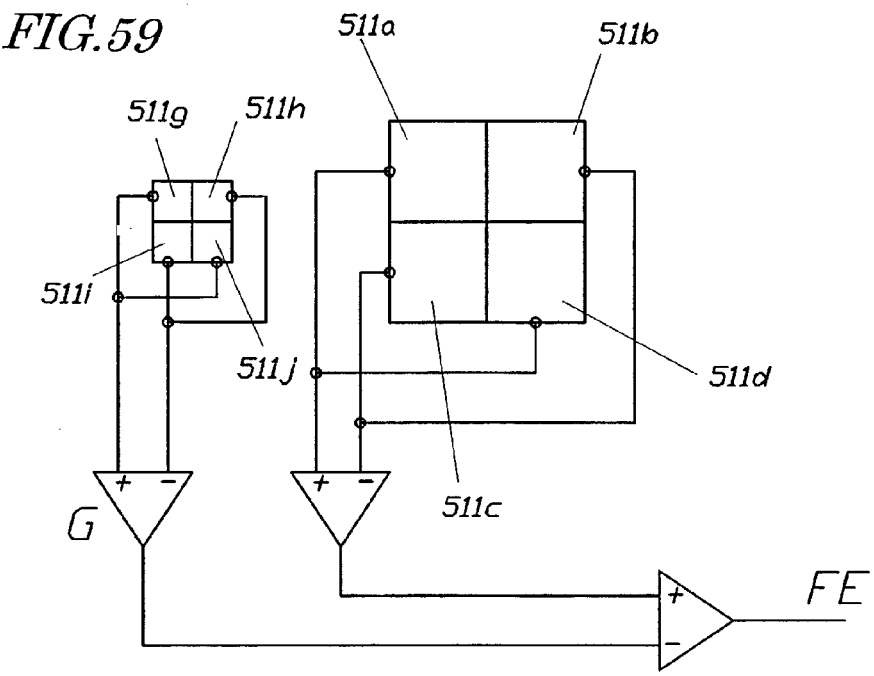
FIG. 59 shows the shapes and arrangements of photosensitive areas according to another example.

Also, the shapes and arrangements of the respective photosensitive areas of the photodetector that detects the two light beams that have been split are not limited to the example described above. For example, to detect only one split light beam and correct the offset produced by the interference, the photodetector shown in FIG. 59 may be used. FIG. 59 shows the shapes and arrangements of photosensitive areas according to another example. One split light beam is incident on photosensitive areas 511*g* through 511*j*. In this case, the beam spot shape of the light received at the photosensitive areas 511*g* through 511*j* is similar to, or the same as, that of the light received at the photosensitive areas 511*a* through 511*d*. Furthermore, the ratio of the total planar area of the light beam spot on the photosensitive areas 511*g* and 511*j* to that of the light beam spot on the photosensitive areas 511*h* and 511*i* is equal to the ratio of the total planar area of the light beam spot on the photosensitive areas 511*a* and 511*d* to that of the light beam spot on the photosensitive areas 511*b* and 511*c*.

That is why an FE signal to be affected less by the offset that has been produced by the interference can be figured out by the following equation.

$$FE=(511a+511d)-(511b+511c)-G(511g+511j-511h-511i)$$

Embodiment 11

Figure 60:
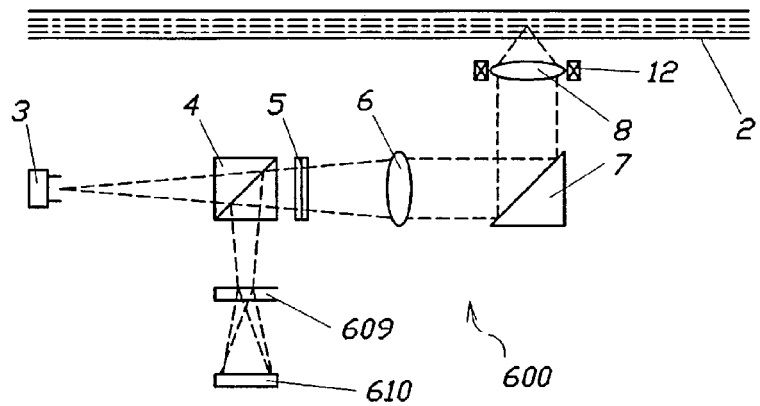
FIG. 60 illustrates an arrangement for an optical head 600 according to an eleventh preferred embodiment of the present invention.

FIG. 60 illustrates an arrangement for an optical head 600 according to an eleventh preferred embodiment of the present invention. This optical head is also built in an optical disc drive and used to perform a read/write operation. If any component of the optical head 600 has the same function as the counterpart of the optical head 1 shown in FIG. 1, that pair of components is identified by the same reference numeral and the description thereof will be omitted herein.

The optical head 600 includes a hologram element 609 and a photodetector 610.

The hologram element 609 has a lens effect that produces eccentricity with respect to the optical axis, and is designed so as to work as a convex lens or a concave lens for one of ±first-order light beams.

Figure 61:
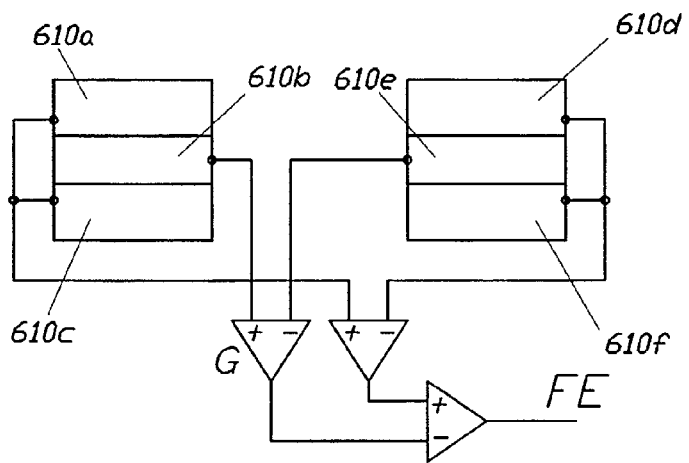
FIG. 61 illustrates the configuration of the photodetector 610.

FIG. 61 illustrates the configuration of the photodetector 610, which has a plurality of photosensitive areas 610*a* through 610*f* that are arranged so as to receive the ±first-order diffracted light beams coming from the hologram element 39.

The photosensitive areas 610*a* through 610*f* are connected to a calculator (not shown) that generates an FE signal by performing the following calculation.

$$FE=(610a+610c+610e)-(610b+610d+610f)$$

Hereinafter, it will be described where the light passes when the optical head 600 with such a configuration is reading information from the multilayer optical disc 2. However, the path from the light source 3 to the optical disc 2, and the path of the light reflected from the optical disc 2 until it is reflected from the polarization beam splitter 4 are the same as those already described with reference to FIG. 1 and the description thereof will be omitted herein.

As shown in FIG. 60, the light reflected from the optical disc 2 is further reflected by the polarization beam splitter 4 to be incident on the hologram element 609, which splits the incoming light into ±first-order light beams. The hologram element 609 produces such a lens effect that focuses one of the two light beams split by the hologram element 609 ahead of the photodetector 610 and the other light beam behind the photodetector 610, respectively. Then, those light beams are received at predetermined photosensitive areas on the photodetector 610.

In this case, not just the light reflected from the read layer of the optical disc 2 but also light reflected from a non-read layer thereof are incident on the photosensitive areas on the photodetector 610 through the same path. That is why the beam spot of the received light will have bright and dark light distribution due to the interference.

Figure 62:
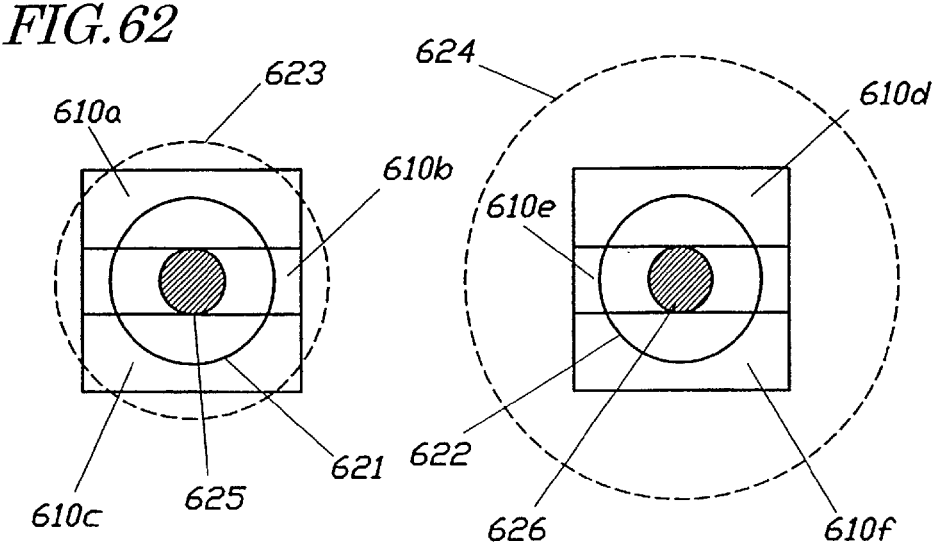
FIG. 62 illustrates where light beam spots are formed on the photosensitive areas on the photodetector 610.

FIG. 62 illustrates where light beam spots are formed on the photosensitive areas on the photodetector 610. The light reflected from the read layer forms light beam spots 621 and 622. The light beam forming the light beam spot 621 is focused ahead of the photodetector 610, while the light beam forming the light beam spot 622 is focused behind the photodetector 610.

The light reflected from the non-read layer (i.e., the layer shallower than the read layer as viewed from under the surface of the optical disc) forms light beam spots 623 and 624. The sizes of these light beam spots 623 and 624 are different due to the lens effect of the hologram element 609.

As the light reflected from the read layer and the light reflected from the non-read layer interfere with each other, bright and dark patterns 625 and 626, having increasing or decreasing light intensities, appear.

As in the tenth preferred embodiment described above, both the light reflected from the read layer and the light reflected from the non-read layer have little phase variation at the center of the light beam (i.e., around the optical axis thereof). That is why each of the bright and dark patterns is produced by the interference in a relatively broad area around the center of the light beam. On the outer periphery of the light beam, on the other hand, an interference pattern with a relatively narrow interval is produced due to the interference.

Also, the brightness and darkness of the bright and dark patterns 625 and 626 are determined by the layer-to-layer interval between the read layer and the non-read layer. That is why the brightness and darkness of the bright and dark patterns 625 and 626 agree with each other.

In this preferred embodiment, the FE signal is generated by the so-called spot size detection (SSD) method. In this case, the width w of the middle one of the three divided photosensitive areas is defined to be 0.25 to 0.6 times as large as the diameter of the light beam spots 621 and 622 that are in focus with the read layer.

This condition can be represented as:

$$0.25 < w/(2NA \cdot d \cdot \beta) < 0.6$$

where $\beta$ is the zoom power of the detection optical system, d is the amplitude of the S-curve, and NA is the numerical aperture of the objective lens.

With respect to the light beam spots with such bright and dark distributions, the offset to be produced in an FE signal can be reduced, if the FE signal is calculated by the following equation.

$$FE = (610a + 610c + 610e) - (610b + 610d + 610f)$$

The offset can be reduced because most of the bright and dark patterns 625 and 626 is included in the middle ones 610b and 610e of the two sets of three divided photosensitive areas and the influence of the bright and dark light distributions can be canceled by making this calculation.

By getting the objective lens 8 moved perpendicularly to the optical disc 2 (i.e., along the optical axis) by the actuator 12 according to the level and polarity of this FE signal, a focus servo control can be performed so as to get the light emitted from the semiconductor laser 3 converged on the target storage layer.

In this manner, the optical head of the present invention can reduce not only the offset that would have been produced in the FE signal if the light reflected from the non-read layer entered the photodetector and interfered with the light reflected from the read-layer when a read operation is performed on a multilayer optical disc but also a variation in that offset.

The broader the shorter side width of the middle ones 610b and 610e of the two sets of three divided photosensitive areas, the more significantly the influence of the interference can be reduced. Nevertheless, if that width were too broad, then the S-curve of the FE signal would have insufficient amplitude. For that reason, the appropriate width w is approximately 0.4 times as large as $2NA \cdot d \cdot \beta$.

On the other hand, if that width were reduced, then the bright and dark patterns 625 and 626 would exceed the middle photosensitive areas 610b and 610e to reach their adjacent photosensitive areas 610a, 610c and 610d, 610f, respectively. However, the influence of the exceeding light on those marginal portions can still be canceled by the subtraction included in the equation described above. That is why if the width w is approximately 0.25 times as large as $2NA \cdot d \cdot \beta$, the resultant FE signal will be hardly affected by the interference.

It should be noted that if the width of the middle one of the three divided photosensitive areas is relatively narrow, the offset variation could be reduced more effectively by making the following calculation. The gain G may be determined appropriately.

$$FE = (610a + 610c) - (610d + 610f) - G(610b - 610e) \ (G: \text{coefficient}).$$

An optical head according to the tenth or eleventh preferred embodiment of the present invention described above can prevent the light reflected from a non-read layer from interfering with the light reflected from the read layer when information is read from a multilayer optical disc and can also reduce the offset in the FE signal and a variation in the offset.

As a result, even in a multilayer optical disc that has a narrower layer-to-layer interval to reduce the magnitude of spherical aberration, the amplitude of the S-curve of the FE signal can be determined with a relatively big margin, thus realizing a highly stabilized servo operation.

Various preferred embodiments of the present invention described above use polarization converters with a number of polarization directions. Those polarization converters can be roughly classified into ones to convert the polarization direction into a regular direction (such as 45 degree or 90 degree direction) and ones to convert the polarization direction into an irregular direction. Those converters may be fabricated by various methods.

There are the following three imaginable methods for fabricating a polarization converter that converts the polarization direction regularly. One is a process in which an artificial crystal is cleaved on a plane that is parallel to its crystal axis to make the same number of polarizers as that of the polarization directions and then those polarizers are bonded together such that the crystal axis faces a desired direction on an area-by-area basis. According to another method, a mixture of a liquid crystal material and a curable compound that has not been cured yet is put on a substrate, subjected to a rubbing treatment on an area-by-area basis to align the orientation directions of liquid crystal molecules, and then the curable compound is cured. And a third method is a process in which a high precision grating pattern is formed on a substrate and thin films with a high refractive index and thin films with a low refractive index are alternately stacked one upon the other by a sputtering process.

On the other hand, the following two methods may be adopted to make a polarization converter that converts the polarization direction irregularly. One is a process in which a mixture of a liquid crystal material and a curable compound that has not been cured yet is put on a substrate, and then subjected to a rubbing treatment irregularly, thereby curing the curable compound. The other is a process in which a mixture of a liquid crystal material and a curable compound that has not been cured yet is interposed between two glass substrates and supplied with a voltage through one or both of the glass substrates to align the orientation directions of liquid crystal molecules so as to achieve desired polarization properties and then the curable compound is cured.

By adopting one of these manufacturing processes, the polarization converter that has already been described for any of the preferred embodiments of the present invention can be obtained.

The optical heads that have been described as preferred embodiments of the present invention are supposed to be built in an optical disc drive. Thus, a general configuration for an optical disc drive including such an optical head will be described with reference to FIG. 67.

Figure 67:
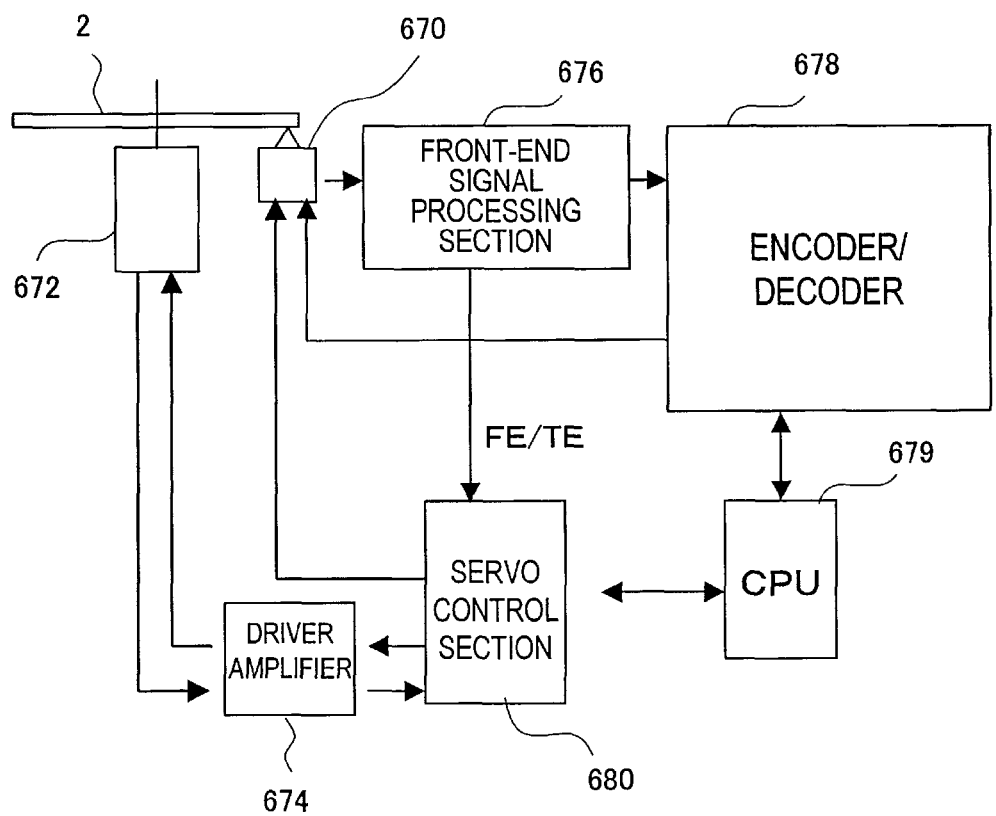
FIG. 67 schematically illustrates a configuration for an optical disc drive according to the present invention.
Figure 68:
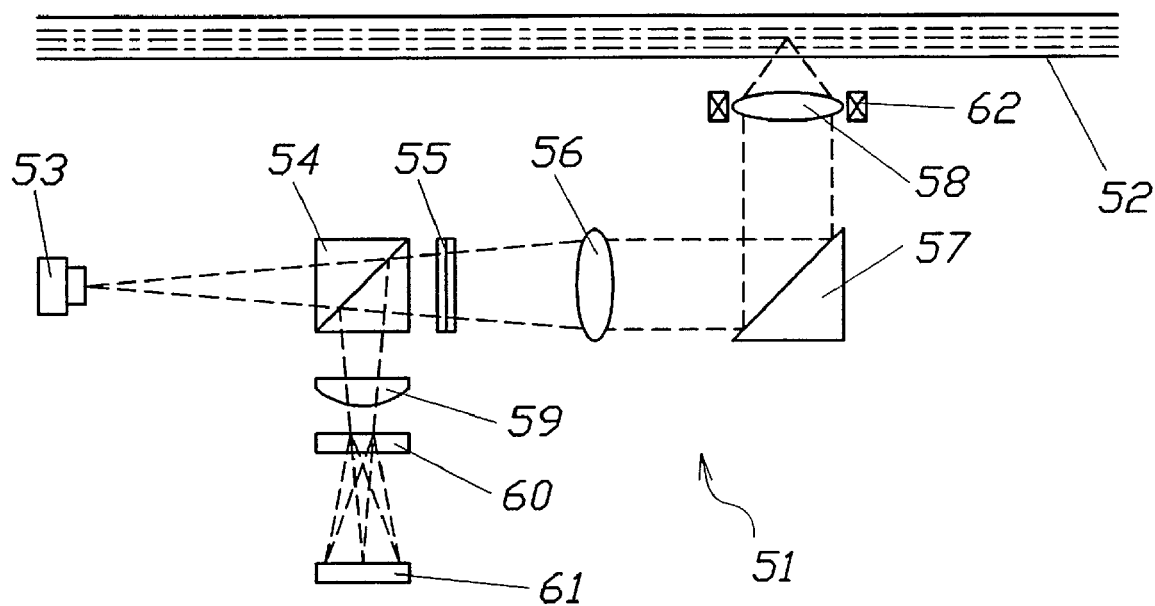
FIG. 68 illustrates a configuration for a normal optical head 51.
Figure 69:
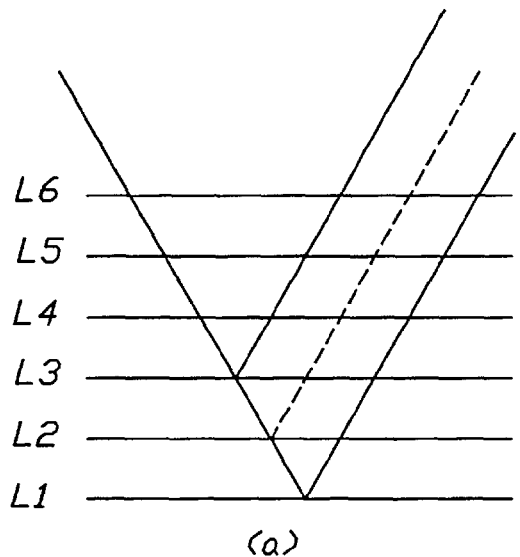
FIGS. 69(a) through 69(e) illustrate exemplary paths of light that interferes with the light that has been reflected from the read layer L2 of a six-layer optical disc.
Figure 69:
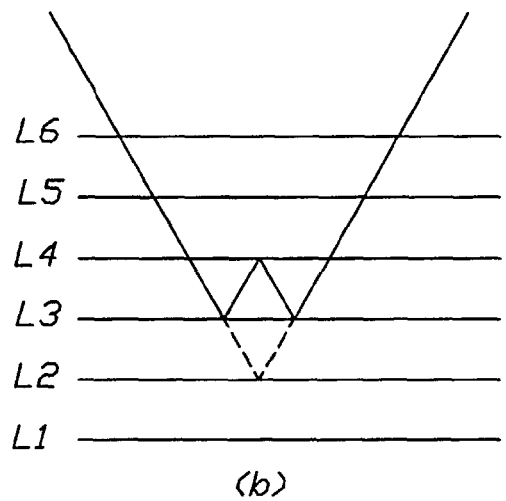
Figure 69:
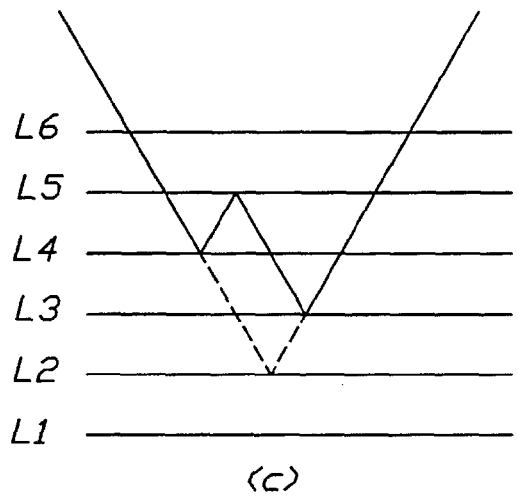
Figure 69:
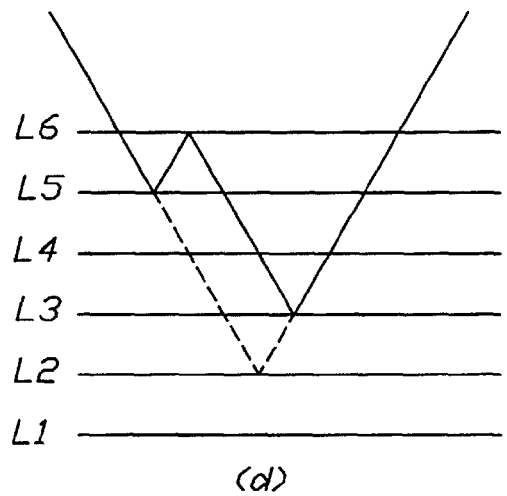
Figure 69:
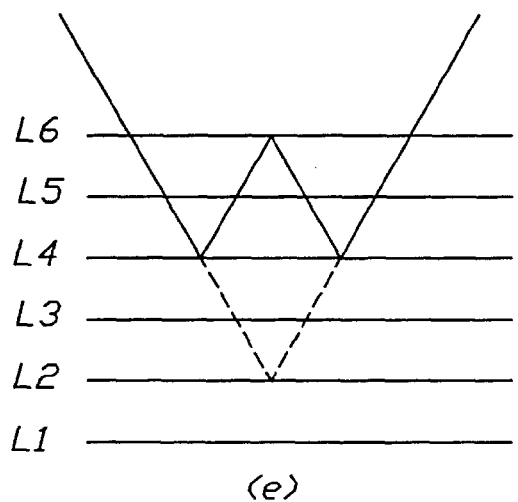
Figure 70:
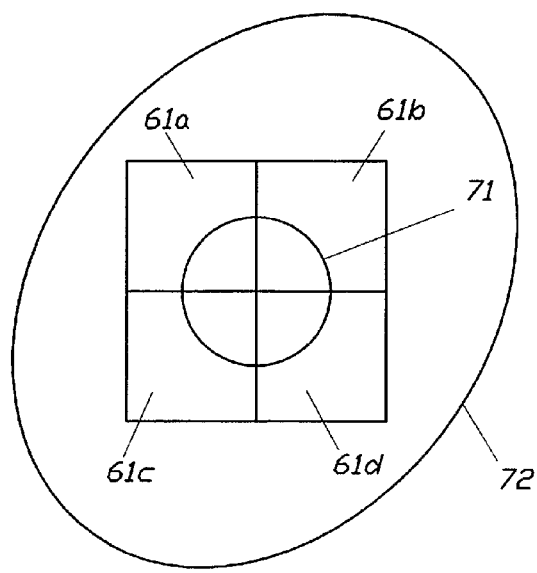
FIG. 70 shows a relation between photosensitive areas 61a through 61d on the photodetector 61 and light beam spots 71 and 72.
Figure 71:
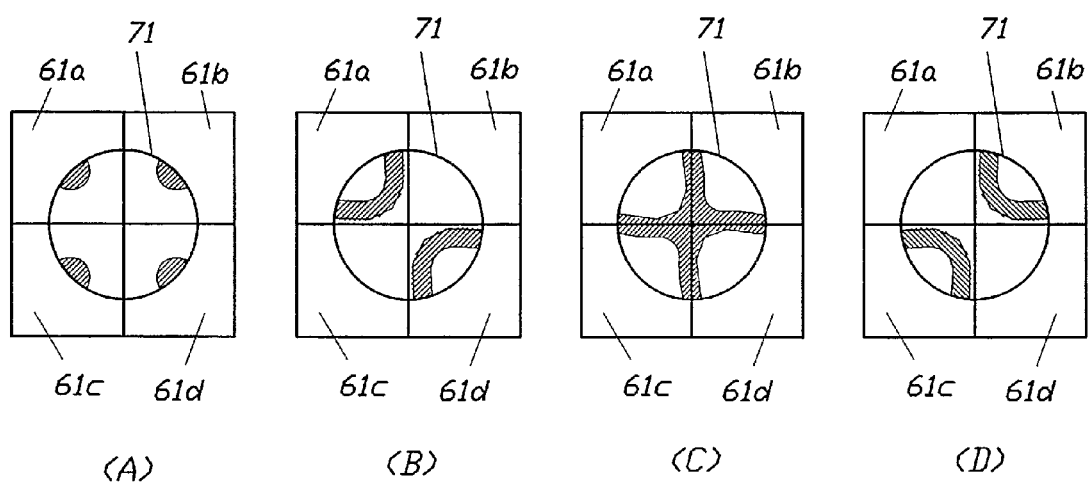
FIGS. 71(A) through 71(D) schematically illustrate interference patterns when light beam spots 71 and 72 with phase distributions interfere with each other.

FIG. 67 shows a general configuration for an optical disc drive according to the present invention. This optical disc drive includes an optical head 670 according to any of the first through eleventh preferred embodiments of the present invention described above, a disc motor 672 to rotate the optical disc 2, and other sections to perform various types of signal processing.

In the exemplary configuration shown in FIG. 67, the output of the optical head 670 is supplied to an encoder/decoder 678 by way of a front-end signal processing section 676. In reading data, the encoder/decoder 678 decodes the data that is stored on the optical disc 2 based on the signals that have been generated by the optical head 670. On the other hand, in writing data, the encoder/decoder 678 encodes user data, generates a signal to be written on the optical disc 2, and supplies it to the optical head 670.

The front-end signal processing section 676 generates a read signal based on the output of the optical head 670 and also generates a focus error signal FE and a tracking error signal TE, which are supplied to a servo control section 680. The servo control section 680 controls not only the disc motor 672 via a driver amplifier 674 but also the position of the objective lens via the actuator in the optical head 670. More specifically, the servo control section 680 controls the position of the objective lens perpendicularly to the information storage layer of the optical disc 2 based on the focus error signal FE. As a result, the focal point of the light continues to be located right on the information storage layer to read data from or write data on. In addition, the servo control section 680 also controls the position of the objective lens in the radial direction of the optical disc 2 based on the tracking error signal TE. Thus, the focal point of the light can continue to follow the target track on the information storage layer to read data from or write data on. The encoder/decoder 678, the servo control section 680 and other components of the optical disc drive are controlled by a CPU 679. It should be noted that the optical disc drive of the present invention does not have to have the configuration shown in FIG. 67.

INDUSTRIAL APPLICABILITY

An optical head according to the present invention can reduce the offset that would have been produced in a focus error signal if the light reflected from a non-read layer entered a photodetector and caused interference when information is being read from a multilayer optical storage medium. Thus the present invention provides a device that can perform a servo operation with good stability even if the gap between multiple information storage layers of an optical information storage medium is narrow.

The invention claimed is:

1. An optical head for performing reading and/or writing on an optical disc that has a plurality of storage layers including a first storage layer and a second storage layer, the optical head comprising:
   a light source;
   a first optical system for converging light emitted from the light source on either the first storage layer or the second storage layer;
   a second optical system for receiving and transmitting light reflected from the first storage layer and stray light reflected from the second storage layer when the light is converged on the first storage layer;
   a photodetector that has a plurality of photosensitive areas, which output respective signals representing intensities of the light that has been incident there by way of the second optical system; and
   a calculating section for calculating the difference between sum of a first group of signals that have been supplied from a first group of photosensitive areas among the plurality of photosensitive areas and that of a second group of signals that have been supplied from a second group, thereby generating a focus error signal,
   wherein the reflected light and the stray light that have been incident on the second optical system interfere with each other, and the first and second groups of photosensitive areas are arranged so as to be equally affected by a variation in light intensity caused by the interference,
   wherein the second optical system includes an astigmatism element,
   wherein the astigmatism element gives the reflected light and the stray light astigmatism in a predetermined direction on a photosensitive plane of the photodetector,
   wherein the photosensitive areas are arranged asymmetrically with respect to the predetermined direction, and
   wherein the first group of photosensitive areas consists of at least two photosensitive areas that are arranged in the predetermined direction, while the second group of photosensitive areas consists of at least two photosensitive areas that are arranged perpendicularly to the predetermined direction.

2. The optical head of claim 1, wherein the second optical system includes a polarization converter, and
   wherein the polarization converter has a plurality of areas to transmit the reflected light and the stray light, two adjacent ones of the areas having the optical property of changing the polarization directions of the transmitted light into a different direction.

3. An optical head for performing reading and/or writing on an optical disc that has a plurality of storage layers including a first storage layer and a second storage layer, the optical head comprising:
   a light source;
   a first optical system for converging light emitted from the light source on either the first storage layer or the second storage layer;
   a second optical system for receiving and transmitting light reflected from the first storage layer and stray light reflected from the second storage layer when the light is converged on the first storage layer;
   a photodetector that has a plurality of photosensitive areas, which output respective signals representing intensities of the light that has been incident there by way of the second optical system; and
   a calculating section for calculating the difference between sum of a first group of signals that have been supplied from a first group of photosensitive areas among the plurality of photosensitive areas and that of a second group of signals that have been supplied from a second group, thereby generating a focus error signal,
   wherein the reflected light and the stray light that have been incident on the second optical system interfere with each other, and the first and second groups of photosensitive areas are arranged so as to be equally affected by a variation in light intensity caused by the interference,
   wherein the second optical system further includes an astigmatism element, and
   wherein the astigmatism element gives the reflected light and the stray light astigmatism in a predetermined direction on a photosensitive plane of the photodetector, and
   wherein the plurality of areas are arranged so as to have a plurality of division lines that are symmetrical with respect to the predetermined direction.

4. The optical head of claim 3, wherein the division lines are arranged so as to intersect with an optical axis.

5. The optical head of claim 3, wherein the plurality of areas include at least two areas, which are arranged such that the polarization directions of the light transmitted through the areas are perpendicular to each other, and an area interposed between the at least two areas, the interposed area being arranged so as to change continuously polarization directions of the light transmitted through that area.

6. The optical head of claim 2, wherein the two adjacent areas are arranged in a ring around an optical axis.

7. The optical head of claim 2, wherein the areas have the optical property of changing the polarization directions of the transmitted light into an arbitrary direction.

8. An optical head for performing reading and/or writing on an optical disc that has a plurality of storage layers including a first storage layer and a second storage layer, the optical head comprising:
- a light source;
- a first optical system for converging light emitted from the light source on either the first storage layer or the second storage layer;
- a second optical system for receiving and transmitting light reflected from the first storage layer and stray light reflected from the second storage layer when the light is converged on the first storage layer;
- a photodetector that has a plurality of photosensitive areas, which output respective signals representing intensities of the light that has been incident there by way of the second optical system; and
- a calculating section for calculating the difference between sum of a first group of signals that have been supplied from a first group of photosensitive areas among the plurality of photosensitive areas and that of a second group of signals that have been supplied from a second group, thereby generating a focus error signal,
- wherein the reflected light and the stray light that have been incident on the second optical system interfere with each other, and the first and second groups of photosensitive areas are arranged so as to be equally affected by a variation in light intensity caused by the interference,
- wherein the second optical system includes an interference suppressor, and
- wherein the interference suppressor has a first optical path that passes through a center portion including the respective optical axes of the reflected light and the stray light and a second optical path that passes through a peripheral portion surrounding the center portion, the first and second optical paths having mutually different optical path lengths.

9. The optical head of claim 8, wherein the interference suppressor has an optical thickness difference on its plane to receive the reflected light and the stray light, the optical path lengths of the first and second optical paths being different from each other due to the optical thickness difference.

10. An optical head for performing reading and/or writing on an optical disc that has a plurality of storage layers including a first storage layer and a second storage layer, the optical head comprising:
- a light source;
- a first optical system for converging light emitted from the light source on either the first storage layer or the second storage layer;
- a second optical system for receiving and transmitting light reflected from the first storage layer and stray light reflected from the second storage layer when the light is converged on the first storage layer;
- a photodetector that has a plurality of photosensitive areas, which output respective signals representing intensities of the light that has been incident there by way of the second optical system; and
- a calculating section for calculating the difference between sum of a first group of signals that have been supplied from a first group of photosensitive areas among the plurality of photosensitive areas and that of a second group of signals that have been supplied from a second group, thereby generating a focus error signal,
- wherein the reflected light and the stray light that have been incident on the second optical system interfere with each other, and the first and second groups of photosensitive areas are arranged so as to be equally affected by a variation in light intensity caused by the interference,
- wherein the second optical system includes an optical branching element, and
- wherein the optical branching element splits a center portion, including the respective optical axes of the reflected light and the stray light, into at least two light beams, and
- wherein the first and second groups of photosensitive areas receive the at least two light beams, thereby outputting the first and second groups of signals, respectively.

11. An optical disc drive comprising:
the optical head of claim 1;
a motor for rotating an optical disc; and
a control section for controlling the optical head and the motor,
wherein in response to the focus error signal supplied from the optical head, the control section controls the optical head such that the light is continuously converged on the first storage layer of the optical disc.

12. An optical disc drive comprising:
the optical head of claim 3;
a motor for rotating an optical disc; and
a control section for controlling the optical head and the motor,
wherein in response to the focus error signal supplied from the optical head, the control section controls the optical head such that the light is continuously converged on the first storage layer of the optical disc.

13. An optical disc drive comprising:
the optical head of claim 8;
a motor for rotating an optical disc; and
a control section for controlling the optical head and the motor,
wherein in response to the focus error signal supplied from the optical head, the control section controls the optical head such that the light is continuously converged on the first storage layer of the optical disc.

14. An optical disc drive comprising:
the optical head of claim 10;
a motor for rotating an optical disc; and
a control section for controlling the optical head and the motor,
wherein in response to the focus error signal supplied from the optical head, the control section controls the optical head such that the light is continuously converged on the first storage layer of the optical disc.

* * * * *